(12) United States Patent
Martinello et al.

(10) Patent No.: US 10,531,064 B2
(45) Date of Patent: Jan. 7, 2020

(54) SHAPE RECONSTRUCTION USING ELECTRONIC LIGHT DIFFUSING LAYERS (E-GLASS)

(71) Applicant: CANON KABUSHIKI KAISHA, Tokyo (JP)

(72) Inventors: Manuel Martinello, Mountain View, CA (US); Mahdi Nezamabadi, San Jose, CA (US); Evan Levine, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 15/460,075

(22) Filed: Mar. 15, 2017

(65) Prior Publication Data

US 2017/0302902 A1    Oct. 19, 2017

Related U.S. Application Data

(60) Provisional application No. 62/367,591, filed on Jul. 27, 2016, provisional application No. 62/367,600, (Continued)

(51) Int. Cl.
*H04N 7/18* (2006.01)
*H04N 9/47* (2006.01)
(Continued)

(52) U.S. Cl.
CPC ....... *H04N 13/122* (2018.05); *G02F 1/13476* (2013.01); *H04N 13/207* (2018.05); *G02F 2203/01* (2013.01); *G02F 2203/03* (2013.01)

(58) Field of Classification Search
None
See application file for complete search history.

(56) References Cited

U.S. PATENT DOCUMENTS

2015/0304531 A1* 10/2015 Rodriguez Garcia ...................... H04N 5/2224 345/419
2016/0076878 A1   3/2016 Tin et al. ............ 348/135
(Continued)

OTHER PUBLICATIONS

Laurentini, A., "The visual hull concept for silhouette-based image understanding", Pattern Analysis and Machine Intelligence (IEEE Transactions on), vol. 16, No. 2, pp. 150-162 (1994).
(Continued)

*Primary Examiner* — Talha M Nawaz
(74) *Attorney, Agent, or Firm* — Venable LLP

(57) ABSTRACT

Shape measurement of a specular object even in the presence of multiple intra-object reflections such as those at concave regions of the object. Silhouettes of the object are extracted, by positioning the object between a camera and a background. A visual hull of the object is reconstructed based on the extracted silhouettes, such as by image capture of shadows of the object projected onto a screen, and image capture of reflections by the surface of the object of coded patterns onto the screen. The visual hull is used to distinguish between direct (single) reflections of the coded patterns at the surface of the object and multiple reflections. Only the direct (single) reflections are used to triangulate camera rays and light rays onto the surface of the object, with multiple reflections being excluded. The 3D surface shape may be derived by voxel carving of the visual hull, in which voxels along the light path of direct reflections are eliminated. For surface reconstruction of heterogeneous objects, which exhibit both diffuse and specular reflectivity, variations in the polarization state of polarized light may be used to separate between a diffuse component of reflection and a specular component.

20 Claims, 30 Drawing Sheets

Related U.S. Application Data filed on Jul. 27, 2016, provisional application No. 62/361,415, filed on Jul. 12, 2016, provisional application No. 62/323,531, filed on Apr. 15, 2016.

(51) Int. Cl.
*H04N 13/122* (2018.01)
*G02F 1/1347* (2006.01)
*H04N 13/207* (2018.01)

(56) References Cited

U.S. PATENT DOCUMENTS

| | | | | |
|---|---|---|---|---|
| 2016/0231579 A1* | 8/2016 | Borovkov | | B41M 3/06 |
| 2016/0301910 A1* | 10/2016 | Lucas | | G06T 17/00 |
| 2017/0013247 A1* | 1/2017 | Kim | | G06T 1/20 |
| 2017/0046868 A1* | 2/2017 | Chernov | | H04N 13/221 |
| 2017/0085867 A1* | 3/2017 | Baran | | H04N 13/122 |
| 2017/0244956 A1* | 8/2017 | Stiglic | | H04N 13/156 |

OTHER PUBLICATIONS

Matusik, W., et al., "Image-based 3D photography using opacity hulls", ACM Transactions on Graphics (TOG), vol. 21, No. 3, pp. 427-437 (2002).

O'Toole, M., et al., "3D Shape and Indirect Appearance by Structured Light Transport" including Supplemental Document, Computer Vision and Pattern Recognition (CVPR) (IEEE Conference on), pp. 3246-3253 (2014).

U.S. Appl. No. 14/489,008, filed Sep. 17, 2014.
U.S. Appl. No. 15/072,101, filed Mar. 16, 2016.
U.S. Appl. No. 15/072,116, filed Mar. 16, 2016.
U.S. Appl. No. 62/309,897, filed Mar. 17, 2016.
U.S. Appl. No. 15/359,404, filed Nov. 22, 2016.

\* cited by examiner

SHAPE RECONSTRUCTION USING ELECTRONIC LIGHT DIFFUSING LAYERS (E-GLASS)

CROSS REFERENCE TO RELATED APPLICATIONS

This application claims benefit of priority from the following U.S. provisional applications, the contents of all of which are incorporated by reference as if set forth here in full: U.S. Provisional Application No. 62/323,531 filed Apr. 15, 2016; U.S. Provisional Application No. 62/361,415 filed Jul. 12, 2016; U.S. Provisional Application No. 62/367,591 filed Jul. 27, 2016; U.S. Provisional Application No. 62/367,600 filed Jul. 27, 2016.

FIELD

The present disclosure relates to silhouette extraction and shape reconstruction of physical objects using multiple electronically-controllable light diffusing layers, and is particularly well-suited for shape reconstruction of specular and diffuse objects in the presence of multiple intra-object reflections.

RELATED ART 3D reconstruction of a specular object remains a challenging task. While there are several techniques capable of accurate reconstruction of objects with a diffuse (also called Lambertian) surface, the 3D reconstruction of an object with a specular (or non-Lambertian) surface is still an open problem.

One challenge is due to the fact that the appearance of a specular object, or a highly glossy object, depends on the viewpoint and on the surrounding environment.

In addition, for specular and highly glossy objects, reflection by the object may be quite complicated, and in general may involve multiple reflections by the object itself, in the path of reflection from a light source to image capture. These multiple reflections violate underlying assumptions of conventional reconstruction techniques on the nature of reflections by the surface of the object, which typically assume only a single reflection at the surface of the object. Thus, the multiple reflections destabilize and otherwise invalidate calculations based on ray tracing or triangulation, at least to the extent that such calculations rely on the assumption of only a single reflection at the surface of the object.

The following documents may be helpful to those of ordinary skill:

Laurentini, A., "The visual hull concept for silhouette-based image understanding", Pattern Analysis and Machine Intelligence (IEEE Transactions on), vol. 16, no. 2, pages 150-162 (1994).

Matusik, W., et al., "Image-based 3D photography using opacity hulls", ACM Transactions on Graphics (TOG), vol. 21, no. 3, pages 427-437 (2002).

O'Toole, M., et al., "3D Shape and Indirect Appearance by Structured Light Transport", Computer Vision and Pattern Recognition (CVPR) (IEEE Conference on), pages 3246-3253 (2014).

Many techniques for identifying and reconstructing 3D objects are based on 2D silhouettes of the object. In the afore-mentioned paper by Laurentini, he introduced the concept of a visual hull of an object. According to Laurentini, a visual hull is the maximal object silhouette-equivalent to the object, i.e., which can be substituted for the object without affecting any silhouette.

A visual hull is thus a geometric entity created by shape from silhouette 3D reconstruction techniques. In many techniques for generating a visual hull from silhouettes, the foreground object in an image is assumed to be separable from the background. Under this assumption, a threshold can be used on the original image in order to create a foreground/background binary image, which is called silhouette image. The foreground mask, known as a silhouette, is the 2D projection of the corresponding 3D foreground object.

SUMMARY

Previous applications by the applicant herein have considered techniques for shape measurement and reconstruction. As examples:

U.S. patent application Ser. No. 14/489,008, filed Sep. 17, 2014 by Siu-Kei Tin et al., "Depth Value Measurement Using Illumination by Pixels", now published at U.S. Patent Application Publication No. 2016/0076878. This application in general describes reconstruction of the shape of a specular object by using a system with multiple LCD display layers.

U.S. application Ser. No. 15/072,101, filed Mar. 16, 2016 by Mahdi Nezamabadi, "3D Shape Reconstruction Using Projection Onto Electronic Light Diffusing Layers"; and U.S. patent application Ser. No. 15/072,116, filed Mar. 16, 2016 by Mahdi Nezamabadi et al., "3D Shape Reconstruction Using Reflection Onto Electronic Light Diffusing Layers. These applications in general also describe reconstruction of the shape of a specular object by using E-glass screens where each panel can be set to either diffuse or transparent. One advantage of an E-glass based system is the possibility to project a pattern directly onto the object (to reconstruct diffuse surfaces) when both screens are set to transparent.

U.S. application Ser. No. 62/309,897, filed Mar. 17, 2016 by Manuel Martinello et al., "Separating Diffuse and Specular Components of a Glossy Object for Shape Reconstruction Using Electronic Light Diffusing Layers (E-Glass) and Polarized Light"; and U.S. application Ser. No. 15/359,404, filed Nov. 22, 2016 by Manuel Martinello et al., "Separating Diffuse and Specular Components of a Glossy Object for Shape Reconstruction Using Electronic Light Diffusing Layers (E-Glass) and Polarized Light". These applications describe the use of polarized light to separate diffuse and specular components of reflection from a heterogeneous object whose surface may include specular or highly glossy areas as well as diffuse areas, so as to permit more accurate shape reconstruction for such objects.

The contents of these applications are incorporated herein by reference as if set forth in full.

Turning to the concept of silhouettes of an object, a silhouette is usually extracted by comparing two images: one captured without the foreground object, so as to produce a known background, and one captured with the foreground object. The known background can be represented by a pattern shown on a display, in order to be more robust to shadows or light changes.

The background pattern can be uniform or can vary spatially. An example of spatial variation is explained in the afore-mentioned paper by Matusik.

Recent applications assigned to the same assignee as that herein, such as those mentioned above, have introduced the use of multiple layers of E-glass. Multiple layers, and in particular E-glass layers, are not known to have been used before for silhouette extraction or for visual hull construction.

According to one aspect described herein, a background for silhouette extraction comprises a background pattern, a light projector projecting the background pattern, and at least two transparency-controllable layers where the background pattern is projected. A silhouette is extracted of a foreground object by positioning the foreground object against the background, between a camera and the background, wherein the silhouette of the foreground object is extracted using an image or images captured by the camera.

According to another aspect described herein, a background for silhouette extraction comprises first and second transparency-controllable layers, and a projector positioned and configured to project one or more background patterns toward the first and second layers so as to illuminate the background with patterned light. The first and second layers are positioned in spaced-apart relation relative to each other, wherein both of the first and second layers are controllably switchable between a transparent mode in which the layer is transparent, and a diffuse mode in which the layer diffuses light. A silhouette is extracted of a foreground object by positioning the foreground object against the background, between a camera and the background, controlling transparency of the first and second layers, controlling projection of background patterns by the projector, capturing an image or images of the foreground object against the background, and extracting a silhouette of the foreground object by calculations using the captured images of the foreground object.

By virtue of the foregoing, advantageous effects are obtained, such as addressing pattern ambiguities in silhouette extraction for both specular and transparent objects, ordinarily without changing the projected pattern or making use of moving parts.

In addition, in arrangements where the transparency-controllable layers are controlled to be semi-transparent, a unique pattern (a light-field, composed by the combination of all the layers) can be displayed at the background, and a single captured image is often enough for silhouette extraction.

Further, a more accurate silhouette extraction is ordinarily obtained as compared to conventional techniques for silhouette extract, thereby improving methods that make use of silhouettes, such as visual hull reconstruction and 3D shape reconstruction.

For example, according to further aspects described herein, a visual hull may be constructed from the extracted silhouette. Depth of the surface of the foreground object may be estimated by calculations using images of the foreground object captured under controlled transparency of the first and second layers and controlled projection of patterned light by the projector. Such calculations to estimate depth may use the visual hull as a filter to exclude regions of the captured images that do not correspond to the constructed visual hull.

Further aspects include shape reconstruction using the estimated depth.

The extracted silhouette as described above, and silhouettes in general, together with the camera viewing parameters (e.g., focal length, image sensor size, pixels size, camera pose), defines a back-projected cone that contains the actual object; such cone is called silhouette cone. The intersection of two or more cones (captured from different viewpoints) formed the visual hull, which is a bounding geometry of the actual 3D object. Some examples of visual hulls are shown in FIGS. 7A and 7B. FIG. 7A is a plan view showing a representative 2D slice of a 3D object, specifically, a 2D visual hull reconstruction (also called convex hull) from 1D profiles from 3 cameras. FIG. 7B is a perspective view showing a 3D object, specifically, a 3D visual hull reconstruction of a person using silhouettes from 4 different viewpoints.

The visual hull of an object is the intersection of silhouette cones from different viewpoints. The accuracy of the estimation of a silhouette cone depends on the silhouette extraction as well as on the camera settings estimation, which indicate the starting point of the cone.

One of the main problem challenges for silhouette extraction is being able to have the texture of the foreground object different from the background pattern. Diffuse objects can have any type of texture and in some areas it can match the background pattern; similar problem can also happen when objects are transparent (camera rays can be deflected to a similar background pattern) or have a specular surface that reflects the surrounding environment.

According to one aspect described herein, the visual hull of a foreground object at an inspection station is reconstructed using one or more transparency-controllable layers, a projector positioned across the inspection station from the transparency-controllable layer for projecting a shadow of the object onto the transparency-controllable layer, a camera for capturing an image of the shadow, and a movable stage for movably supporting the inspection station. A controller may control the projector and the camera and the movable stage, wherein the controller is configured to reconstruct the visual hull of the object based on images of the shadow of the object captured by the camera.

According to further aspects described herein, there may be at least two of the transparency-controllable layers. The controller may further be configured to control transparency of the transparency-controllable layers such that one of the transparency-controllable layers is diffuse and all others of the transparency-controllable layers are transparent, and to reconstruct the visual hull by triangulating on extreme points in captured images of the shadow of the object using extreme points on respective ones of the transparency-controllable layers.

The transparency-controllable layer(s) may be calibrated relative to optical characteristics of the camera, by controlling the projector to project a predetermined pattern onto the transparency-controllable layer(s) and by analysis of a captured image of the predetermined pattern. Reconstruction of the visual hull may use the calibration in conjunction with the captured images of the shadows of the object.

According to a further aspect described herein, for reconstruction of the visual hull of an object moved into multiple different orientations at an inspection station, a shadow of the object is projected onto a first transparency-controllable screen and onto a second transparency-controllable screen that is spaced apart from the first transparency-controllable screen, images are captured of the shadows projected onto the transparency-controllable screens, extreme points of each shadow are estimated, the extreme points of the shadows from the first and second transparency-controllable screens are linked, a center of projection is estimated based on the linked extreme points, and a silhouette cone is estimated for each orientation of the object by combining the information from the extreme points of the shadows and the center of projection. The visual hull is reconstructed from the silhouette cones from each orientation.

According to certain embodiments described herein, the shadow may be represented by darker areas of the screen, where projected light is completely or partially blocked, as in the case of diffuse, specular, and some transparent objects.

The shadow may be represented by areas of the screen where a projected pattern is deformed, as in the case of some transparent objects.

The extreme points may be extracted at each screen from corners of bonding boxes that contain the shadow.

In some embodiments, the center of projection may be calibrated by projecting a checkerboard on the screens, and triangulating rays from the corresponding corners using their 3D locations. The center of projection may be estimated at each position using the extreme points from at least two screens. The center of projection may be estimated using the shadows of at least two screens from all positions.

Further aspects include shape reconstruction using the reconstruction of the visual hull.

By virtue of the foregoing, advantageous effects are obtained, such as reconstruction of the visual hull of any object (diffuse, specular, transparent). In addition, there is robust estimation of the silhouette cone, at least in part because (i) the center of projection can be estimated using all the rotations and/or orientations, (ii) multiple screens give multiple estimates of the same silhouette cone, and (iii) in using shadows of the object, the shadows are less affected by highlights when transparent or specular objects are involved.

Further consideration is given to the possibility of multiple intra-object reflections by the object itself.

In more detail, in arrangements considered herein, the object reflects a coded pattern, and every camera pixel reads a code reflected by the object, which identifies a pixel on one of the screens or on one of the E-glass layers. This is done for each layer in the system. By triangulating the ray of the camera pixel and the light ray (given by the coded points on the E-glass layers), the 3D location is obtained for the object point and its normal.

FIG. 16 shows an example of this triangulation, in the context of the afore-mentioned U.S. application Ser. No. 15/072,101. In this figure, given a light ray 3021 defined by the coded points on a pair of E-glass layers, and a camera ray 3022 at a given pixel of the camera, triangulation yields a point of the surface of specular object 3023.

However, this simple triangulation fails when the object has concave areas and light rays are reflected more than once by the object's surface before reaching the camera. For example, for a light ray having two reflections as shown at 3024a and 3024b, simple triangulation which assumes only a single reflection will yield a point far different from any point on the surface of object 3023.

A further issue arises in the context of specular objects, for which those of ordinary skill might also conclude that only a small part of the specular object can be reconstructed at each re-positioning of the object. In particular, as shown at 3025 in FIG. 16, only those areas of the object that reflect the screens into the camera can be viewed by the camera, leaving most of the camera pixels unused. Thus, pixels that do not "see" the reflections of the screens are wasted since they provide little or no information.

It is further observed that even with an accurate reconstruction of the visual hull, it is still difficult to reconstruct the actual shape of the object since concave areas cannot be reconstructed from a visual hull alone.

The description herein describes an E-glass-based system and a method based on such system that uses the information of all camera pixels at each view to reconstruct the shape of specular objects even in the presence of concave areas and multi-reflection.

Thus, according to one aspect described herein, for reconstruction of the 3D shape of an object, images are captured of background patterns forming a background of the object, silhouettes of the object are extracted at each view by calculations using the images of the background patterns, a visual hull of the object is reconstructed by calculations using the extracted silhouettes, images are captured of reflected patterns of coded light patterns reflected from the object, light paths are determined in the images of the reflected patterns by decoding the coded light patterns, and light paths having direct single reflections are separated from those having indirect multi-reflections in the images of the reflected patterns, by calculations using the visual hull. Voxels from the visual hull are eliminated only along light paths of direct reflections, yielding the 3D reconstruction of the object.

The captured background patterns may be obtained with the same images as the captured reflected patterns. The images of the reflected patterns may be captured after reconstructing the visual hull, and the coded patterns may be selected based on the spatial extent of the visual hull.

The object may be heterogeneous, exhibiting both spectral and diffuse reflections, and the diffuse and specular components in the captured images of the reflected patterns may accordingly be separated, such as by separation using variations in the polarization state of polarized light.

In further aspects described herein, first and second transparency-controllable layers are provided, the first and second layers being positioned in spaced-apart relation relative to each other, wherein both of the first and second layers are controllably switchable between a transparent mode in which the layer is transparent, and a diffuse mode in which the layer diffuses light. A first camera is positioned along a first optical axis across an inspection station opposite the first and second transparency-controllable layers, and a second camera is positioned along a second optical axis oblique to the first optical axis. A projector is positioned along the first optical axis for projecting patterned light in a direction towards the first and second transparency-controllable layers and the inspection station. The 3D shape of an object positioned at the inspection station is reconstructed by using captured images of background patterns and coded light patterns projected by the projector.

In reconstructing the 3D shape of the object, silhouettes may be extracted at each view by calculations using the images of the background patterns, and a visual hull of the object may be reconstructed by calculations using the extracted silhouettes. Light paths in the images of the reflected patterns are determined by decoding the coded light patterns, and light paths having direct single reflections may be separated from light paths having indirect multi-reflections, by calculations using the visual hull. Voxels are eliminated from the visual hull only along light paths of direct reflections, so as to yield the 3D reconstruction.

A polarizer may be placed in front of the first and second transparency-controllable layers, and an analyzer may be placed in front of the second camera. Images may be captured under varying states of polarization of the polarizer and the analyzer, so as to separate diffuse and specular components of reflection by using the captured images.

Multiple sets of first and second transparency-controllable layers may be provided, together with corresponding multiple sets of projectors and cameras.

Based on the 3D reconstruction of the shape of the object, the object may be replicated, such as by 3D replication of the object physically (such as with a 3D printer) or representationally (as with a graphics display).

By virtue of many of the arrangements described herein, advantageous effects are typically obtained, including, for example: a reduction in the capturing time required for a full 3D reconstruction, reconstruction of 3D shape of an object even in the presence of multiple intra-object reflections and/or concave areas of the object; increased efficiency in image capture, since in some configurations, the reflection from the object of the screens and the background can be captured in the same image; increased efficiency in use of more pixels in the captured images, since some configurations are able to use the information from all the pixels, which lead to less time needed to reconstruct the shape of a specular or highly glossy object; and fewer repositionings of the object, since some configurations feature multiple sets of projection and capture pairs.

Additional considerations are given to the possibility of multiple intra-object reflections by the object itself.

In more detail, in arrangements considered herein, the object reflects a coded pattern, and every camera pixel reads a code reflected by the object, which identifies a pixel on one of the screens or on one of the E-glass layers. This is done for each layer in the system. By triangulating the ray of the camera pixel and the light ray (given by the coded points on the E-glass layers), the 3D location is obtained for the object point and its normal.

FIG. 25 shows an example of this triangulation, in the context of the afore-mentioned U.S. application Ser. No. 15/072,116. In this figure, given a light ray 4021 defined by the coded points on a pair of E-glass layers, and a projector ray 4022 at a given pixel of the camera, triangulation yields a point of the surface of specular object 4023.

More precisely, the projector sends a light pattern into the scene; the pattern is reflected by the surface of the specular object; part of it reaches the E-glass layers, and it is visible on the first layer set to diffuse mode. The camera capture images of the E-glass layers and only the pattern from the layer set to diffuse mode can be read. The sequence of projected patterns uniquely identifies a light ray from the projector (e.g., using a gray code).

When the camera reads the same code on both screens (or both E-glass layers), the screen ray is identified as described in U.S. application Ser. No. 15/072,116. This is done for each pixel whose code is visible on the screens. By triangulating the screen ray and the light ray (from the relative pixel of the projector), the 3D location of the object point and its normal are obtained. An example of this triangulation is illustrated in FIG. 25.

However, this simple triangulation fails when the object has concave areas and light rays are reflected more than once by the object's surface before reaching the camera. For example, for a light ray having two reflections as shown at 4024a and 4024b, simple triangulation which assumes only a single reflection will yield a point far different from any point on the surface of object 4023.

A further issue arises in the context of specular objects, for which those of ordinary skill might also conclude that only a small part of the specular object can be reconstructed at each re-positioning of the object. In particular, as shown at 4025 in FIG. 25, only those areas of the object that reflect from the projector onto the screens can be viewed by the camera, leaving most of the projected pixels unused. Thus, pixels that are not reflected onto the screens are wasted since they provide little or no information.

It is further observed that even with an accurate reconstruction of the visual hull, it is still difficult to reconstruct the actual shape of the object since concave areas cannot be reconstructed from a visual hull alone.

The description herein describes an E-glass-based system and a method based on such system that uses the information of all camera pixels at each view to reconstruct the shape of specular objects even in the presence of concave areas and multi-reflection.

Thus, according to one aspect described herein, for reconstruction of the 3D shape of an object, images are captured of the shadow of the object against a screen, silhouettes of the object are extracted at each view by calculations using the images of the shadow, a visual hull of the object is reconstructed by calculations using the extracted silhouettes, images are captured of reflected patterns of coded light patterns reflected from the object onto the screen, light paths are determined in the images of the reflected patterns by decoding the coded light patterns, and light paths having direct single reflections are separated from those having indirect multi-reflections in the images of the reflected patterns, by calculations using the visual hull. Voxels from the visual hull are eliminated only along light paths of direct reflections, yielding the 3D reconstruction of the object.

The captured images of the shadow of the object may be obtained with the same images as the captured reflected patterns. The images of the reflected patterns may be captured after reconstructing the visual hull, and the coded patterns may be selected based on the spatial extent of the visual hull.

The object may be heterogeneous, exhibiting both spectral and diffuse reflections, and the diffuse and specular components in the captured images of the reflected patterns may accordingly be separated, such as by separation using variations in the polarization state of polarized light.

In further aspects described herein, first and second transparency-controllable layers are provided, the first and second layers being positioned in spaced-apart relation relative to each other, wherein both of the first and second layers are controllably switchable between a transparent mode in which the layer is transparent, and a diffuse mode in which the layer diffuses light. A first projector is positioned along a first optical axis across an inspection station opposite the first and second transparency-controllable layers, and a second projector is positioned along a second optical axis oblique to the first optical axis. A camera is positioned along the first optical axis for projecting patterned light in a direction towards the first and second transparency-controllable layers and the inspection station. The 3D shape of an object positioned at the inspection station is reconstructed by using captured images of background patterns and coded light patterns projected by the projector.

In reconstructing the 3D shape of the object, silhouettes may be extracted at each view by calculations using the images of the shadow of the object, and a visual hull of the object may be reconstructed by calculations using the extracted silhouettes. Light paths in the images of the reflected patterns are determined by decoding the coded light patterns, and light paths having direct single reflections may be separated from light paths having indirect multi-reflections, by calculations using the visual hull. Voxels are eliminated from the visual hull only along light paths of direct reflections, so as to yield the 3D reconstruction.

A polarizer may be placed in front of the first and second transparency-controllable layers, and an analyzer may be placed in front of the second projector. Images may be captured under varying states of polarization of the polarizer and the analyzer, so as to separate diffuse and specular components of reflection by using the captured images.

Multiple sets of first and second transparency-controllable layers may be provided, together with corresponding multiple sets of projectors and cameras.

Based on the 3D reconstruction of the shape of the object, the object may be replicated, such as by 3D replication of the object physically (such as with a 3D printer) or representationally (as with a graphics display).

By virtue of many of the arrangements described herein, advantageous effects are typically obtained, including, for example: a reduction in the capturing time required for a full 3D reconstruction, reconstruction of 3D shape of an object even in the presence of multiple intra-object reflections and/or concave areas of the object; increased efficiency in image capture, since in some configurations, the reflection from the object onto the screens and the background can be captured in the same image; increased efficiency in use of more pixels in the captured images, since some configurations are able to use the information from all the pixels, which lead to less time needed to reconstruct the shape of a specular or highly glossy object; and fewer repositionings of the object, since some configurations feature multiple sets of projection and capture pairs.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 8A through 8D show a projector positioned to project directional light so as to form a shadow of an object on a diffuse screen according to one embodiment described herein, in which FIG. 8A is a view with no object and FIGS. 8B, 8C and 8D are views with a diffuse object, a specular object and a transparent object, respectively.

FIGS. 9A through 10B are illustrations of distortions caused in the shadow of a transparent object onto which patterned light is projected, in which FIGS. 9A and 9B show two different orientations of a transparent pyramid and FIGS. 10A and 10B show two different orientation of a transparent cube.

FIGS. 22 and 33 are schematic views of other embodiments which include additional cameras and/or projectors and E-glass layers.

FIGS. 24A through 24C are views for explaining a simulation, in which FIG. 24A is a synthetically created 3D object, FIG. 24B is a reconstruction of the visual hull of the object before voxel carving, and FIG. 24C shows 3D surface reconstruction after voxel carving.

DETAILED DESCRIPTION

One Embodiment

One aspect of the present embodiment concerns the extraction of a silhouette of a foreground object positioned against a background. It is to be understood that the embodiments described herein, and individual features and aspects thereof, may be combined each with the other such as in furtherance of the principles explained herein.

Figure 1:
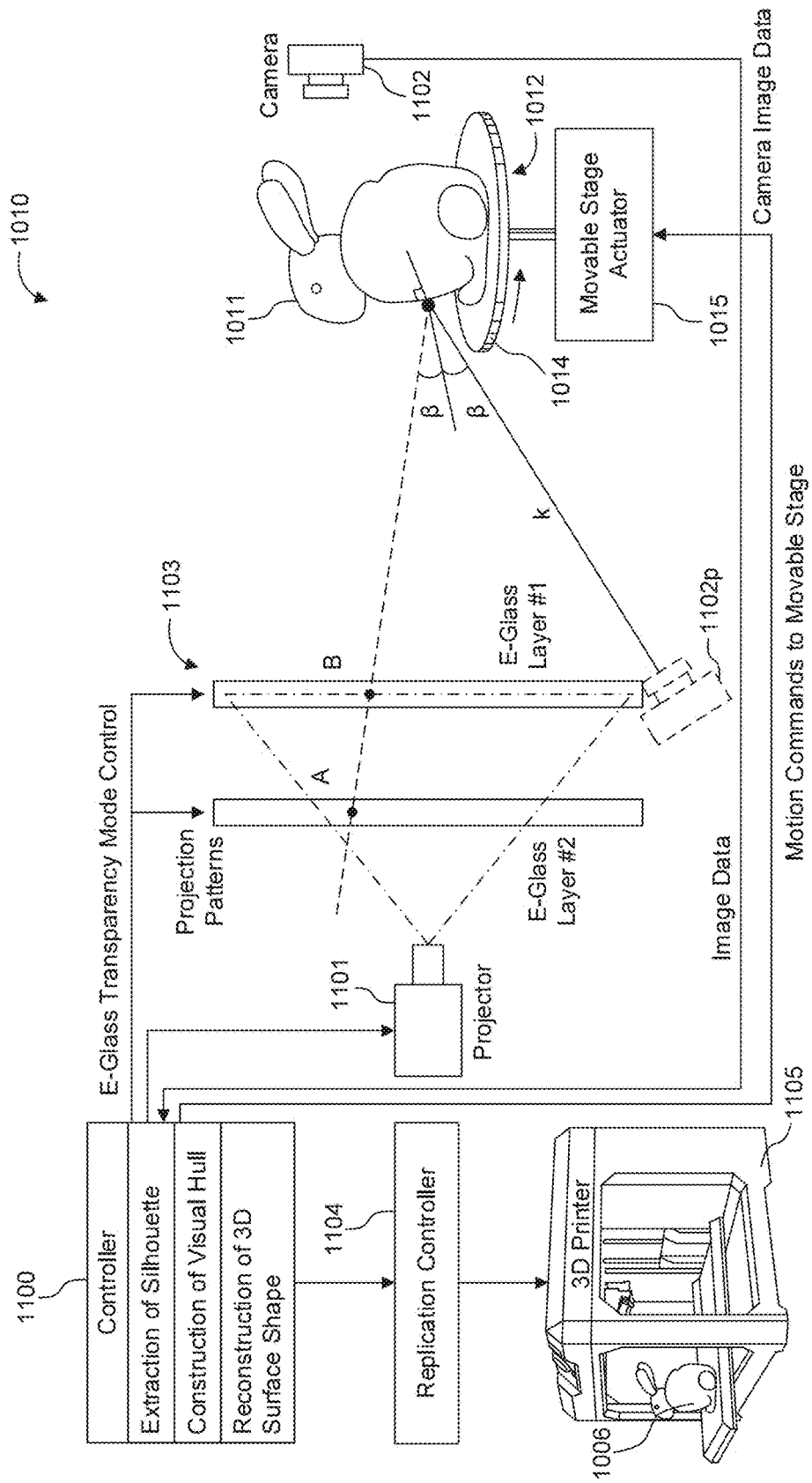
FIG. 1 is a view showing one example embodiment of a system for extraction of a silhouette of a foreground object.

FIG. 1 is a view showing one example embodiment of a system 1010 for extraction of a silhouette of a foreground object positioned against a background. In this example embodiment, in addition to extraction of a silhouette of the foreground object, the system of FIG. 1 is further configured to construct a visual hull of the foreground object by using the extracted silhouette, and is further configured to recover depth information and/or surface shape of the object. The object may be diffuse, or it may be specular, glossy or transparent or semi-transparent, and single object may be heterogeneous by including combinations of these. System 1010 in this embodiment is further configured for replication of the object, for example, for 3D replication of the object physically (such as with a 3D printer) or representationally (as with a graphics display).

While FIG. 1 depicts a replication environment, it should be understood that this is simply an example environment in which the disclosure herein may be practiced, and that other environments or embodiments are of course possible. For example, extraction of a silhouette of a foreground object can also be used in the context of automated inspection, robotics, gripping and positioning, machine vision, quality control, image retrieval, shape modelling and scene reconstruction, security and so forth, among many others.

As shown in FIG. 1, a foreground object 1011 is positioned at an inspection station 1012, which in this embodiment is the surface of a movable stage 1014 by which the object can be moved into varying perspectives. In this embodiment, the movable stage is movable by rotation about a vertical axis, and in other embodiments the movable stage may be a 3-axis positioning table. Movable stage 1014 is moved under control of actuator 1015, via motion commands issued by controller 1100 for extraction of a silhouette.

Controller 1100 is configured to extract a silhouette of objects at inspection station 1012, based on commands issued to projector 1101 and commands issued to actuator 1015 for movable stage 1014, and based on image data received from image capture system 1102 which in this embodiment is a digital camera. Controller 1100 in this example embodiment is further configured to construct a visual hull based on the extracted silhouette, and to reconstruct surface shape based on the visual hull and based on additional captured images, such as images captured by a camera positioned as shown in FIG. 1 by phantom lines. Based on the reconstruction obtained by controller 1100, controller 1100 controls replication controller 1104 so as to obtain a 3D replication of the object. In this embodiment, 3D replication of the object is obtained physically via 3D printer 1105, to produce replicated object 1106. In other embodiments, 3D replication of the object may be obtained representationally via a graphics display. More details of controller 1100 are provided below, such as in connection with FIG. 2.

FIG. 1 further depicts plural transparency-controllable layers 1103, positioned in spaced-apart relation relative to each other. In the FIG. 1 embodiment, there are two spaced-apart layers and in other embodiments there may be three or more spaced-apart layers. Under control from controller 1100, each transparency controllable layer is independently switchable between a transparent mode in which the layer is transparent, and a diffuse mode in which the layer diffuses light.

For the plural transparency-controllable layers 1103, this embodiment uses multiple layers of E-glass. As used herein, the term "E-glass" refers to electronically switchable glass which is switchable between a transparent mode in which the glass is completely transparent, and a diffuse mode in which the glass assumes a frosted appearance. Images can be projected or formed on the frosted appearance of the diffuse mode, and this property of E-glass is used to advantage in the configuration described herein. E-glass is sometimes referred to as "smart glass", and the diffuse mode is sometimes referred to as opaque or translucent. One common use of E-glass is in the field of selectable privacy, such as in a conference room where the windows can be switched between an open transparent state and a private diffuse state.

E-glass is typically formed of a polymer dispersed liquid crystal (PDLC) or polymer stabilized cholesteric texture (PSCT) film sandwiched between two layers of glass with two layers of conductive interlayers, so as to allow control of the E-glass between the transparent mode and the diffuse mode. Other technologies for fabricating E-glass include suspended particle devices (SPDs) and electrochromic devices. For the E-glass used in this embodiment, the change-over from transparent mode to diffuse mode, and vice-versa, takes less than 10 seconds.

As used herein, E-glass refers to any of these or similar technologies, in which the transparency of a layer is controllable electrically between a fully transparent mode and a fully diffuse mode.

The E glass layers are positioned in spaced-apart relation to each other.

In this embodiment, a background comprises a background pattern, a light projector such as projector 1101 for projecting the background pattern, and at least two transparency-controllable layers such as those at 1103 onto which the background pattern is projected. Projector 1101 in this embodiment has an autofocus function, by which patterns projected by the projector are automatically focused onto the surface where the patterns are projected. This provides an advantageous benefit: because the transparency mode of the E-glass layers 1103 is changed between diffuse mode and transparent mode, the surface onto which patterns are projected is likewise changed. For example, in a circumstance when an innermost E-glass layer is in the diffuse mode, patterns are projected onto the innermost layer. The focus distance in this circumstance differs from a circumstance when the innermost E-glass layer is in the transparent mode and the outermost layer is in the diffuse mode, where patterns are projected onto the outermost layer. Both of these focus distances are different from the circumstance when all E-glass layers are in the transparent mode, the object is diffuse, and patterns are projected directly onto the surface of the diffuse object. The autofocus function of projector 1101 responds automatically to these changes in focus distance, ensuring that the projected patterns remain in focus regardless of the surface onto which they are projected.

Foreground object 1011 is positioned between camera 1102 and the background, so as to permit capture of an image or images of the foreground object against the background. A silhouette of the foreground object is extracted from the captured images.

In addition to camera 1102, some embodiments may include a further camera, or a re-positioning of camera 1102, as shown at 1102p in phantom lines. By using the relative positionings of the E-glass layers to projector 1101 and camera 1102p, ray-tracing and/or triangulation techniques allow reconstruction of the 3D surface shape of the object 1011 under inspection. The relative positionings are predetermined through calibration. More details on the relative positionings of E-glass layers 1103, relative to other elements such as projector 1101 and image capture system 1102p, are described in the afore-mentioned U.S. patent application Ser. Nos. 15/072,116 and 15/072,101, which are incorporated by reference herein. Calibration is also described in these applications.

In this embodiment, reconstruction of the surface shape of object 1011 proceeds by construction of a visual hull of the object by using the extracted silhouette. Depth of the surface of the foreground object may be estimated by calculations using images of the foreground object captured under controlled transparency of the first and second layers and controlled projection of patterned light by the projector.

Details are described in the afore-mentioned U.S. patent application Ser. Nos. 15/072,116 and 15/072,101. Such calculations to estimate depth may use the visual hull as a filter to exclude regions of the captured images that do not correspond to the constructed visual hull.

For simplicity, all the arrangements in this section show use of only two E-glass layers. It will be understood that in general, the arrangements described herein work with N layers of E-glass, with N≥2.

Figure 2:
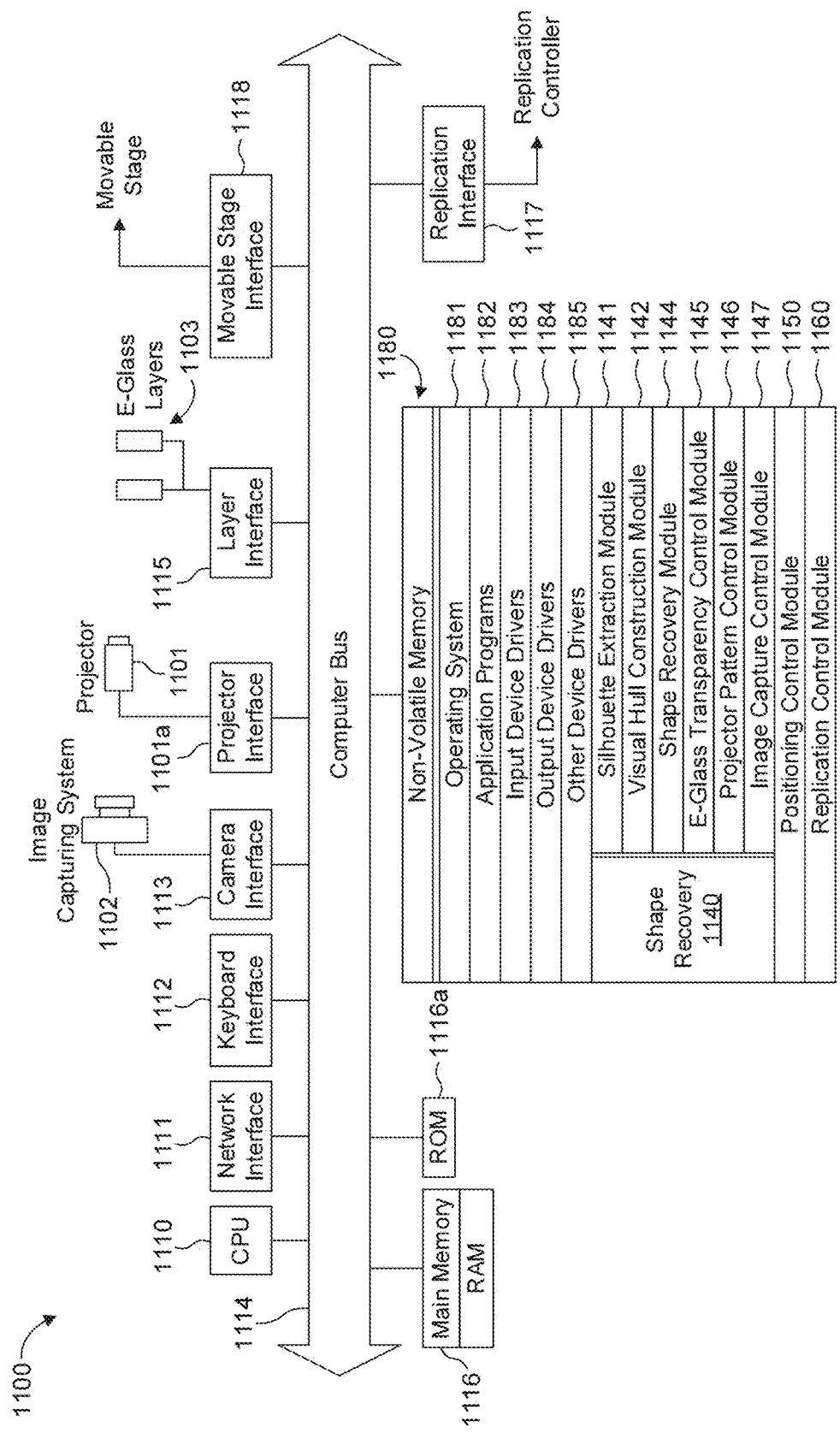
FIG. 2 is a view for explaining one embodiment of the architecture of a controller for extraction of a silhouette of a foreground object.

FIG. 2 is a view for explaining one embodiment of the architecture of controller 1100 for extracting a silhouette of objects at inspection station 1012.

As shown in FIG. 2, controller 1100 includes central processing unit (CPU) 1110 which interfaces with computer bus 1114. Also interfacing with computer bus 1114 are network interface 1111, keyboard interface 1112, camera interface 1113 which interfaces to image capture system 1102, projector interface 1114 which interfaces to projector 1101, E-glass interface 1115 which interfaces to the plural E-glass layers 1103, movable stage interface 1118 which interfaces to actuator 1015 of movable stage 1014, random access memory (RAM) 1116 for use as a main run-time transient memory, read only memory (ROM) 1116a, replication interface 1117 for interface to replication controller 1104, and non-volatile memory 1180 (e.g., a hard disk or other nonvolatile and non-transitory storage medium).

RAM 1116 interfaces with computer bus 1114 so as to provide information stored in RAM 1116 to CPU 1110 during execution of the instructions in software programs, such as an operating system, application programs, image processing modules, and device drivers. More specifically, CPU 1110 first loads computer-executable process steps from non-volatile memory 1180 or another storage device into a region of RAM 1116. CPU 1110 can then execute the stored process steps from RAM 1116 in order to execute the loaded computer-executable process steps. Data also can be stored in RAM 1116 so that the data can be accessed by CPU 1110 during the execution of the computer-executable software programs, to the extent that such software programs have a need to access and/or modify the data.

As also shown in FIG. 2, non-volatile memory 1180 contains computer-executable process steps for operating system 1181, and application programs 1182, such as graphic image management programs. Non-volatile memory 1180 also contains computer-executable process steps for device drivers for software interface to devices, such as input device drivers 1183, output device drivers 1184, and other device drivers 1185.

Non-volatile memory 1180 also stores a shape recovery module 1140, a positioning control module 1150, and replication control module 1160. These modules, i.e., the shape recovery module 1140, the positioning control module 1150, and the replication control module 1160, are comprised of computer-executable process steps for silhouette extraction and visual hull construction and recovery or reconstruction of 3D surface shape of an object, for repositioning of the object on movable stage 1014, and for control of replication controller 1104 for 3D replication of the object.

As shown in FIG. 2, shape recovery module 1140 generally comprises silhouette extraction module 1141 for extracting a silhouette of a foreground object positioned against a background, a visual hull construction module for constructing a visual hull using the extracted silhouette, and shape recovery module 1144 for recovery of surface shape of the object under inspection. Shape recovery module 1140 also generally comprises an E-glass transparency control module 1145 for control over the transparency modes of each of the plural E-glass layers 1103, a projector pattern control module 1146 which stores one or more background patterns together with plural sequences of patterned light patterns and which controls projection of the plural sequences of background patterns and patterned light patterns by projector 1101, as well as image capture control module 1147 for control of image capture by image capturing system 1102.

Positioning control module 1150 controls repositioning of the object on movable stage 1014, and replication control module 1160 controls replication controller 1104 for 3D replication of the object.

With respect to movable stage 1014, controller 1100 issues positioning commands to reposition movable stage 1014 and the object thereon. At each position, by control over the E-glass layers and pattern projection, multiple silhouettes of the foreground object may be extracted. The extracted silhouettes may be used to construct a visual hull of the object. Repositioning of the object exposes other areas of its surface to image capture and illumination by the layers, and thereby permits 3D shape reconstruction with as much of the entirety of the object as desired.

The computer-executable process steps for these modules may be configured as part of operating system 1181, as part of an output device driver in output device drivers 1184, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Silhouette Extraction

One main challenge for silhouette extraction is to have the texture of the foreground object different from the background pattern.

Backlighting is often used in commercial 2D machine vision systems to segment the foreground. One example is a well-known green screen, or screen using a color unlikely to be found in the foreground object. The backlights saturate the image sensor in areas where they are visible. One can then threshold the images to obtain a binary segmentation for the object. This solution is not accurate enough for objects with thin parts or transparent objects. With single color active background, color spill is particularly prominent for highly specular surfaces.

To overcome this problem, rather than using a single color as a background, it has been considered to use background patterns. This is illustrated in FIGS. 3A and 3B.

Figure 3A:
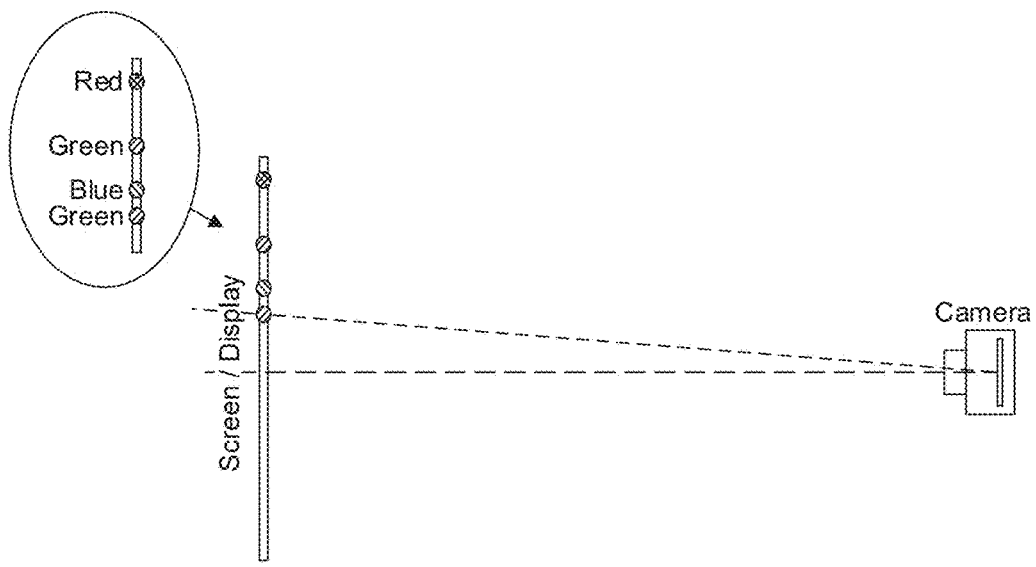
FIG. 3A depicts a background pattern formed from multiple colors which are known in advance.
Figure 3B:
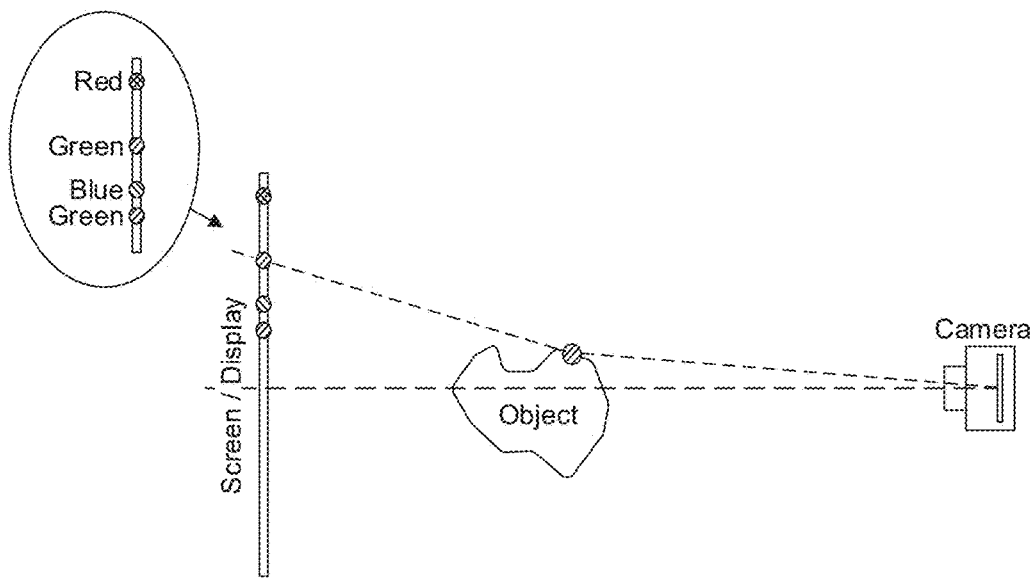
FIG. 3B illustrates a specular object positioned against the background pattern.

FIG. 3A depicts a background pattern formed from multiple colors which are known in advance. A camera captures an image of the known background so as to allow comparison with an image captured with the foreground object positioned against the background, thereby to permit extraction of a silhouette of the object.

However, the pattern cannot uniquely identify each small portion of the background, and therefore generates ambiguities, in particular when dealing with specular or transparent objects. Examples of these ambiguities are explained below, for each of a specular object and a transparent object.

For a specular object, when the foreground object has a specular surface, or includes some specular parts, it might reflect pixels from the background into the camera. This is shown in FIG. 3B.

FIG. 3B illustrates a specular object positioned against the background pattern shown in FIG. 3A. As shown in FIG. 3B, the same camera pixel might record the same color with and without the object, even if its ray hits the object.

This ambiguity is due to the fact that the specular surface of the object projects another pixel of the display, which might have the same color, since the color of the pattern cannot be unique on the display.

Figure 4A:
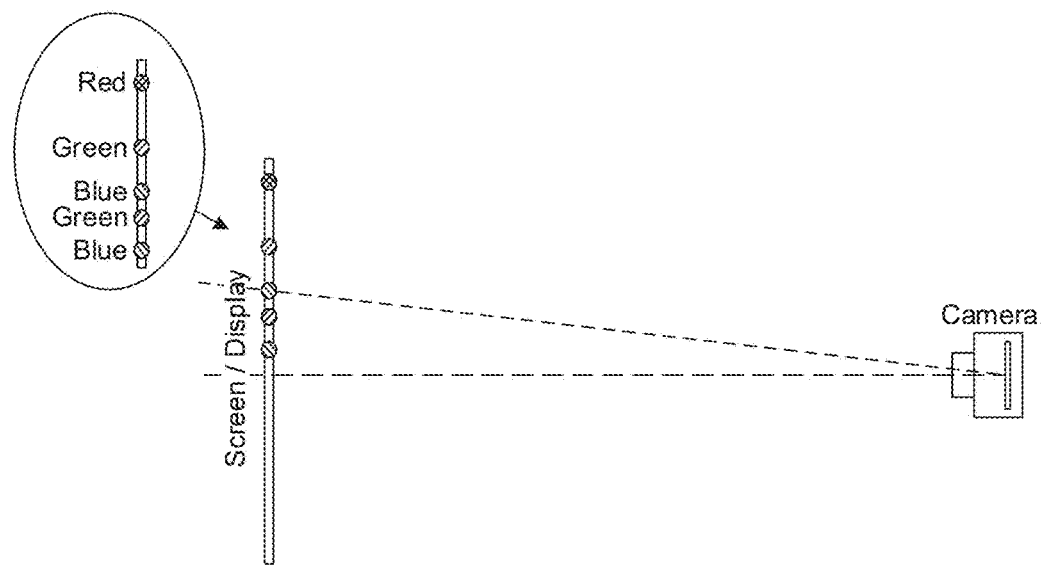
FIG. 4A depicts a background pattern formed from multiple colors which are known in advance.

For a transparent object, a like effect occurs. This is illustrated in FIGS. 4A and 4B, in which FIG. 4A shows a known background pattern and FIG. 4B shows a transparent object positioned against the known pattern.

Figure 4B:
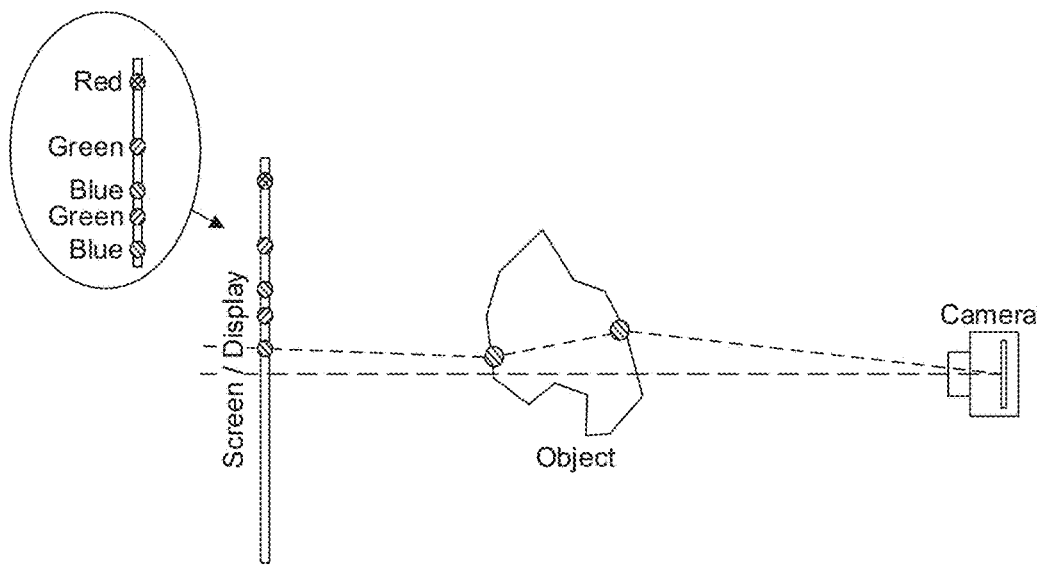
FIG. 4B illustrates a transparent object positioned against the background pattern.

When the foreground object is transparent, as shown in FIG. 4B, depending on the pattern displayed as background, the refraction by the transparent object might cause a camera pixel to record the same color with and without the foreground object.

The afore-mentioned article by Matusik addressed these types of ambiguities by displaying several patterns—with different frequencies—on the background screen and capturing an image for each pattern.

The disclosure herein differs from the proposal of Matusik. In this disclosure accurate silhouettes may be extracted with even a single background pattern, the background pattern being projected—independently or simultaneously—on different layers of the transparency-controllable layers 1103.

According to the disclosure herein, a background includes a projector which projects one or more background patterns together with multiple transparency-controllable layers (i.e., N layers with N≥2), such as electronic glass (E-glass) layers. Each layer of E-glass can be set either to diffuse or to transparent. Depending on the voltage applied to the glass, each layer can also be partially transparent.

Figure 5:
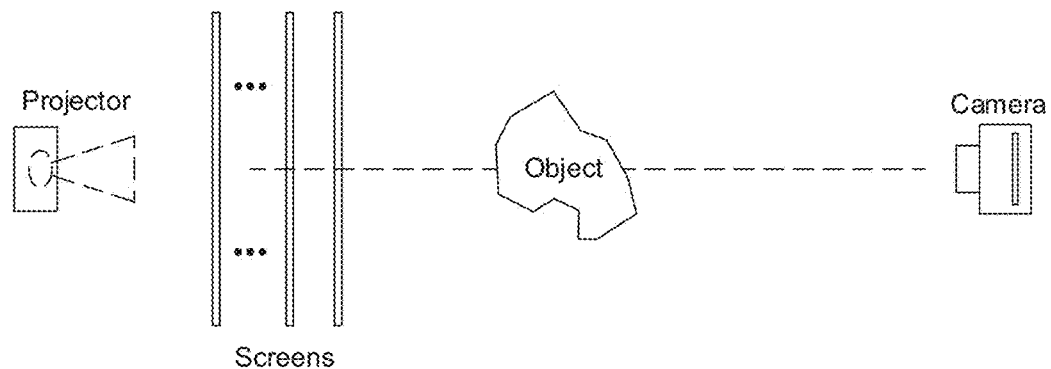
FIG. 5 is a view for explaining a principle by which a foreground object is positioned against a background for extraction of a silhouette of the object.

FIG. 5 is a view for explaining a principle by which a foreground object is positioned against a background for extraction of a silhouette of the object.

As shown in FIG. 5, even a single pattern is ordinarily adequate to extract an accurate silhouette using E-glass layers as background. In the arrangement depicted in FIG. 5, a single background pattern is projected, but the pattern will be visible on different layers, generating a unique value for each ray reaching the background and captured by the camera.

This results in a more accurate extraction of the object's silhouette, in particular when dealing with specular surfaces or transparent objects.

In one embodiment, each layer can be set only to either diffuse or transparent, and the projected pattern is visible, sequentially, on different layers (only one layer is set to be diffuse each time).

In one embodiment, the E-glass layers are partially transparent, and the background pattern visible from the camera is a combination of projected pattern on different E-glass layers at the same time (creating a light-field).

Figure 6:
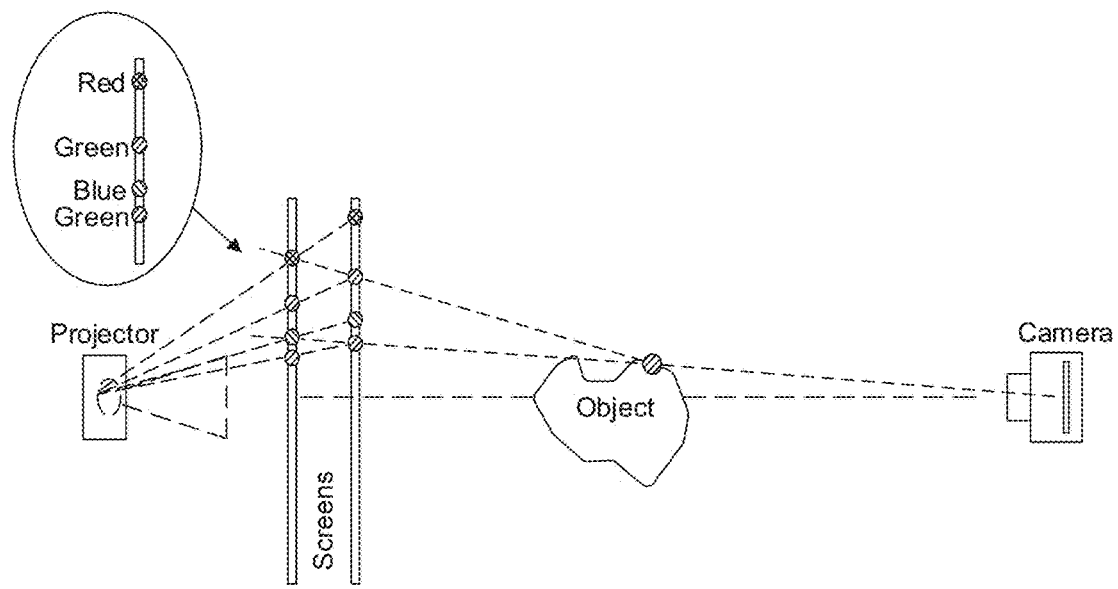
FIG. 6 is a view for explaining ambiguities on silhouette extraction caused by specular surfaces, and for explaining how such ambiguities are resolved.
Figure 7A:
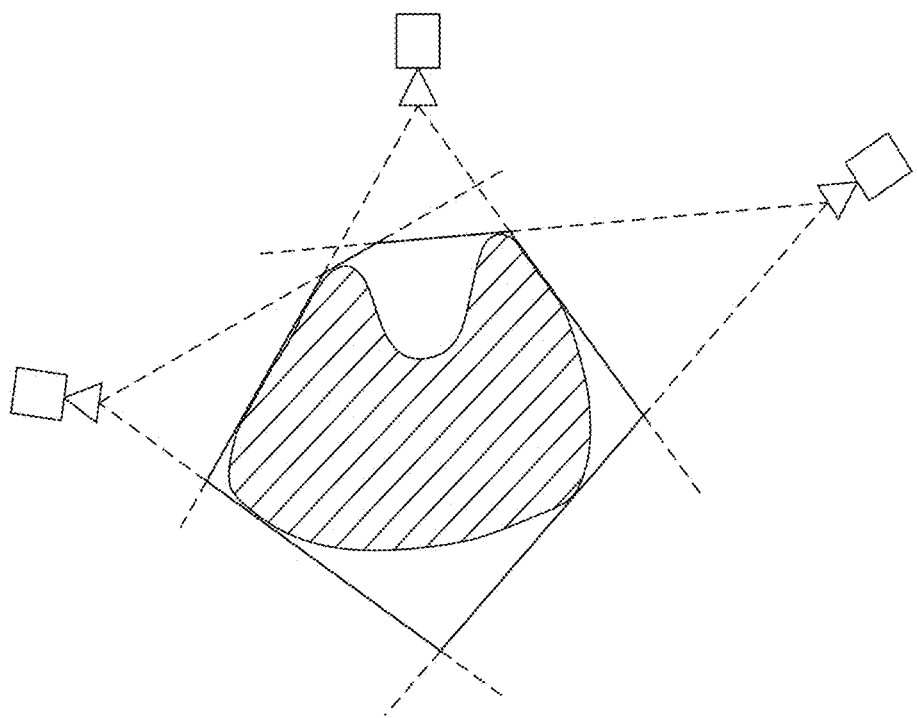
FIGS. 7A and 7B are examples depicting visual hulls.
Figure 7B:
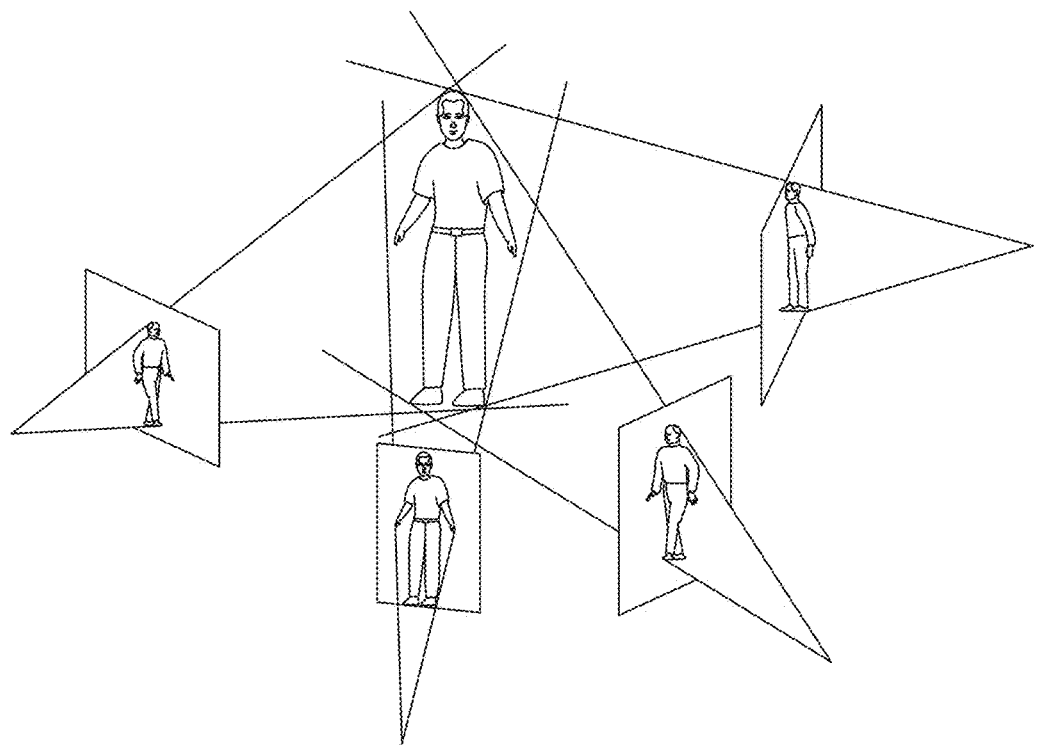

FIG. 6 is a view for explaining ambiguities on silhouette extraction caused by specular surfaces, and for explaining how such ambiguities are resolved by using the information from different E-glass layers (in this case N=2).

As shown in FIG. 6, ambiguities caused by a specular surface can be solved by projecting the same pattern on different layers of E-glass. For simplicity, this figure illustrates only the case when the system is composed by 2 screens. Adding layers of E-glass in the system reduces the number of ambiguities for each ray.

Similarly, ambiguities created by a transparent object, such as the transparent object shown in FIG. 3B, can be solved in the same manner.

In one embodiment, the projector is replaced by a coherent laser beam.

Another Embodiment

One aspect of the present embodiment concerns the extraction of a silhouette of a foreground object positioned against a background. It is to be understood that the embodiments described herein, and individual features and aspects thereof, may be combined each with the other such as in furtherance of the principles explained herein.

A description will now be made of examples of systems and methods to reconstruct the visual hull of an object by using images of its shadow on multiple diffuse layers.

First, a description will be given of general principles on how the information of the shadow can help to extract the silhouette cone—and therefore the visual hull—of an object. Then a description will be given of systems for reconstruction of the visual hull of an object based on multiple diffuse screens, followed by methods to reconstruct the visual hull using captured images of the shadows of the object.

General Principles

Figure 8A:
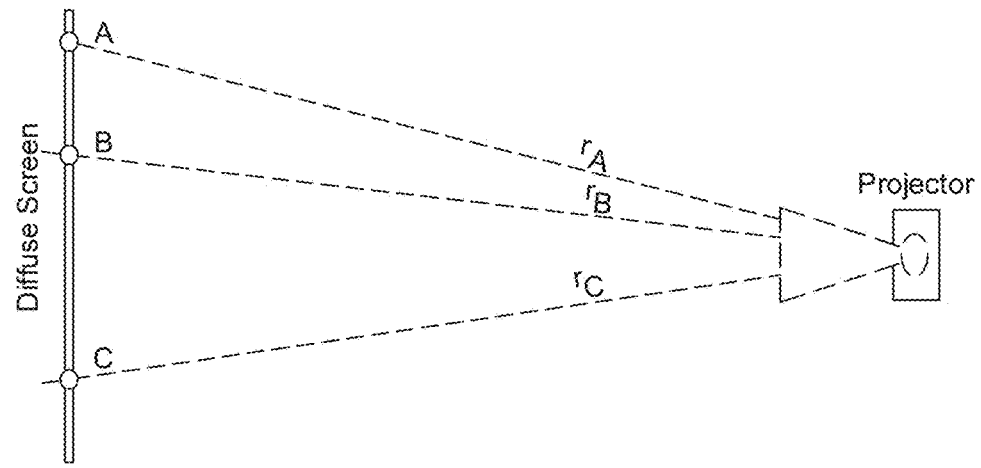

Consider the arrangement of FIG. 8A which shows a projector positioned to project directional light such as coded or patterned light toward a diffuse screen such as a transparency-controllable screen.

For simplicity, consider just 3 light rays (rA, rB, and rC) which generate 3 bright spots on the diffuse layer (A, B, and C) when there is nothing between the light source and the screen.

Figure 8B:
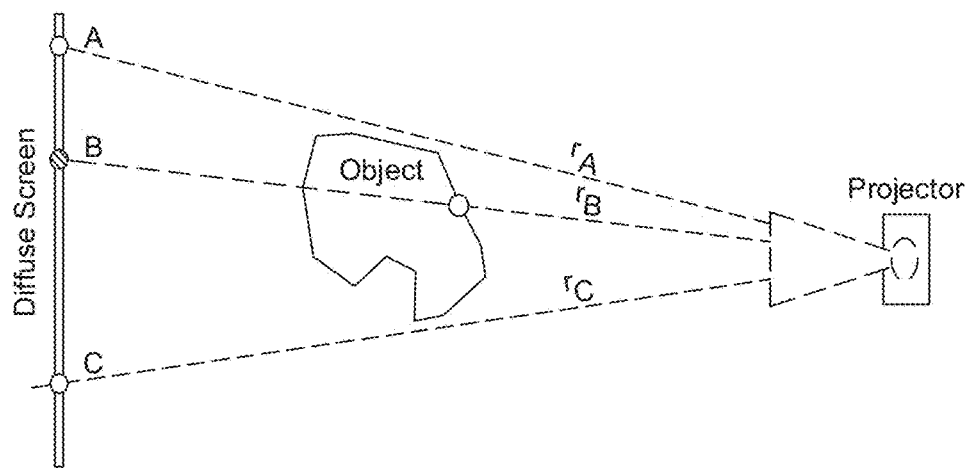
Figure 8C:
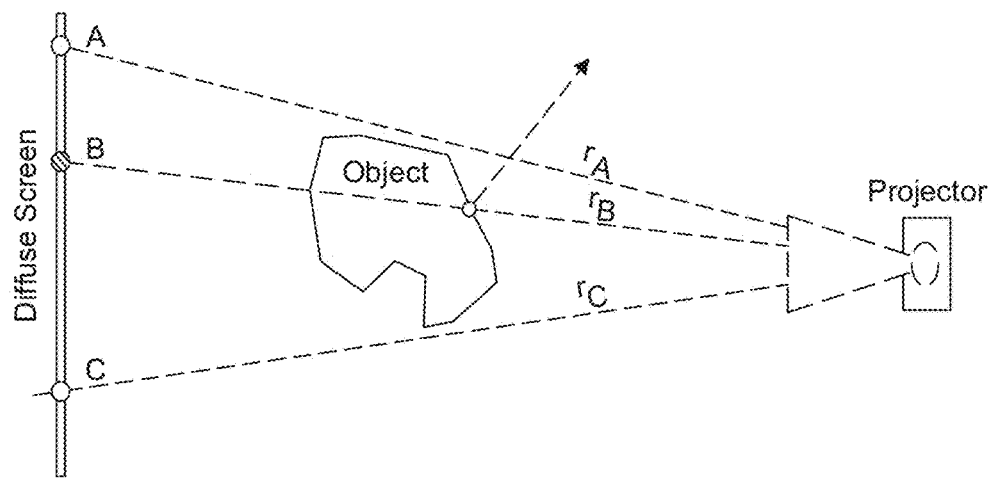
Figure 8D:
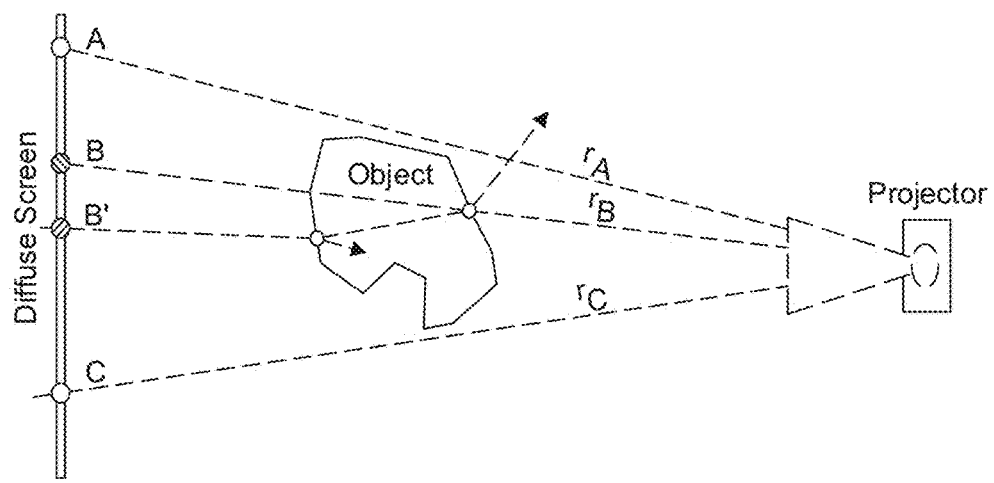

If an object is placed between the light source and the diffuse screen, some of the light rays will hit the object and might never hit the screen, sending the projected light in other directions, depending on the object's material. As shown in FIGS. 8B, 8C and 8D, three cases can be distinguished:

Case 1: Object with diffuse surface (FIG. 8B): When a light ray hits this type of object, its intensity is reflected in many directions and might never hit the diffuse screen, creating a shadow. In this case, the spot B is dark.

Case 2: Object with specular surface (FIG. 8C): When a light ray hits a specular surface, its intensity is entirely reflected in one direction which depends on the normal of the object's surface at the intersection point. The light does not reach the diffuse screen, and in this case the spot B is dark.

Case 3: Transparent object (FIG. 8D): When a light ray hits a transparent object, its intensity is partially reflected (this part will never reach the diffuse screen) and partially goes through the object following a deflected path. The light ray rB might eventually hit the screen but at a point B' instead of B, and with an intensity which is usually lower than the original intensity.

Figure 9A:
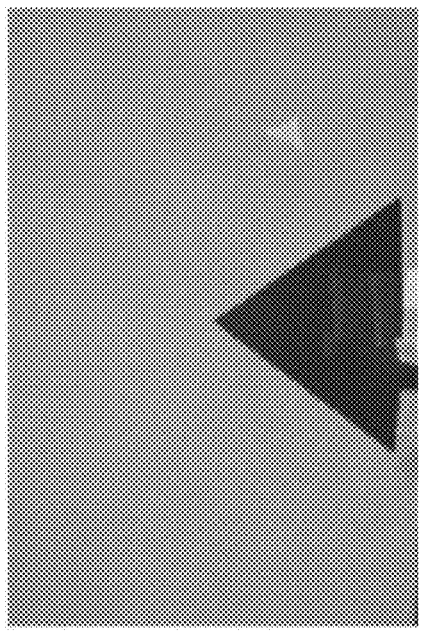
Figure 10A:
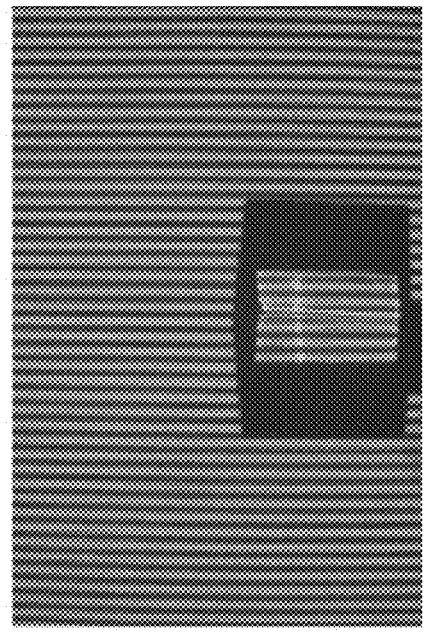
Figure 9B:
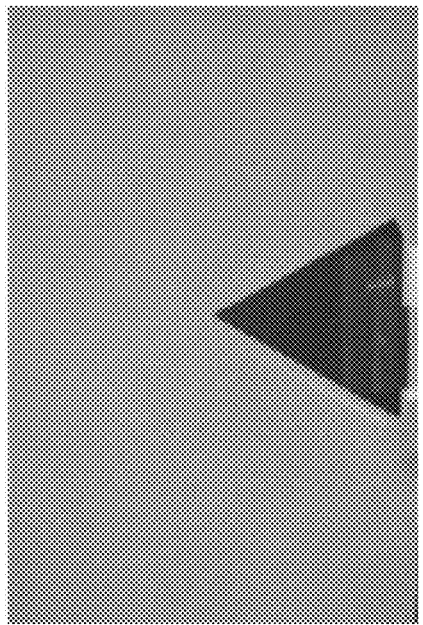
Figure 10B:
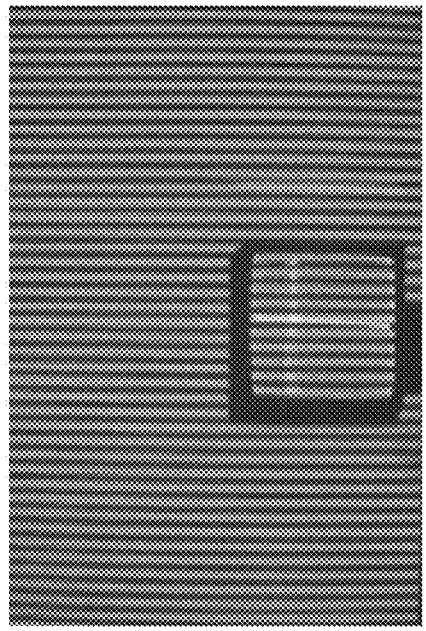

FIGS. 9A, 9B, 9A and 9B show examples of this case 3, for transparent objects. These figures show examples of shadows of two different but fully transparent objects when the projector projects flat light and a pattern consisting of vertical stripes. In FIGS. 9A and 9B, the object is a pyramid at two different orientations (here, rotation orientations). Likewise, in FIGS. 10A and 10B, the object is a cube at two different orientations (rotations). It can be observed in these figures that the vertically-striped pattern is deformed by the transparent object due to the deflected light rays.

Reconstruction of Visual Hull

As described herein, to reconstruct a visual hull of an object that might be diffuse, specular or transparent, a projector is positioned across an inspection station for the object relative to N layers of transparency-controllable screens such as electronic glass (E-glass), where a camera is positioned to capture images of the shadows generated by the target object. Each layer of E-glass can be set either to diffuse or to transparent.

Figure 11:
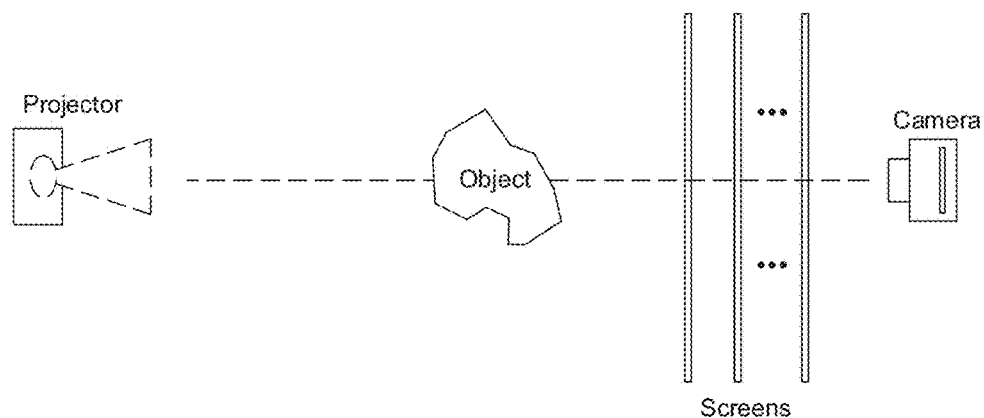
FIG. 11 shows an example embodiment for reconstruction of a visual hull, by extraction of silhouette cones using shadows of an object.

FIG. 11 shows an example embodiment for reconstruction of a visual hull. As shown in this figure, using the captured images of the shadow of the object cast by the projector, silhouette cones of the object are extracted at each of multiple different orientations of the object, and the extracted silhouette cones are combined to estimate the visual hull.

Multiple different methods may be used to reconstruct the visual hull using the arrangement shown in FIG. 11.

In a first of such methods, a center of projection P0 (see FIG. 12) is estimated at each different orientation of the object, which in this embodiment are multiple different rotations of the object.

More particularly, in consideration of the arrangement shown in FIG. 11, where there are multiple layers of E-glass in front of a camera, shadows generated on the layers can be used to extract the silhouette cone at each rotation of the object. This is especially true when the layers are calibrated to the optical characteristics of the camera.

Figure 12:
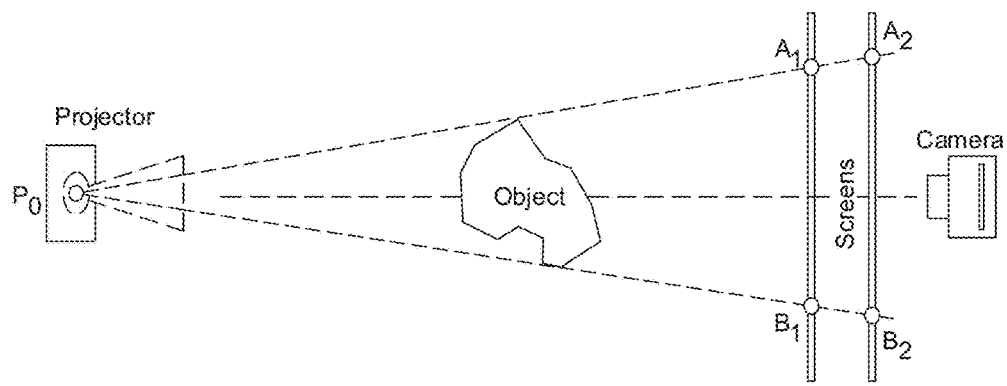
FIG. 12 shows an example embodiment for reconstruction of a visual hull, by extraction of silhouette cones using shadows of an object, in which there are two transparency-controllable layers onto which shadows of the object are formed.

In this method, the following procedure can be used at each rotation, when a system has 2 screens, as shown in FIG. 12. In FIG. 12, a silhouette cone is extracted using the shadows on the two screens (2D example).

1. Capture an image of E-glass #1 as diffuse (E-glass #2 is transparent or removed),
2. Extract at least two extreme points A1 and B1 of the shadow,
3. Capture an image of E-glass #2 as diffuse (E-glass #1 is transparent or removed),
4. Extract the relative extreme points A2 and B2 of the shadow,
5. Find the center of projection P0 (and therefore the relative silhouette cone) by triangulating the rays A1-A2 and B1-B2.

Once the silhouette cones at each rotation are extracted, the visual hull of the object can be estimated by computing their intersection, as in a common shape-from-silhouette technique.

In this embodiment, the extreme points A1, B1, A2, B2 and so forth, on corresponding diffuse layers E1, E2 and so forth, correspond to the corners of a bounding box containing the shadow of the object. In this example, E1 is shorthand notation for E-glass layer #1, and E2 and so forth are shorthand notations for E-glass layer #2 and so forth.

In a second method for reconstruction of the visual hull using the arrangement shown in FIG. 11, the center of projection P0 is estimated from all orientations of the object. More particularly, in this method, the centers of projection from all the rotations are computed at the same time.

Thus, in this second method, steps 1 through 4 as mentioned above are performed for all rotations of the object, such that there is a capture of the shadows and an extraction of the extreme points A1, B1, A2, B2 and so forth for all of screens E1, E2 and so forth, and these steps 1 through 4 are performed for all of the rotations. Then, the center of projection P0 is found, using the constraint that all the silhouette cones share the same center of projection, as illustrated with the 2D example in FIG. 12.

In a third method for reconstruction of the visual hull using the arrangement shown in FIG. 11, the center of projection P0 is estimated during calibration. More particularly, the following calibration process may be performed for estimation of P0:

1. Project a known pattern such as a checkerboard on the screens;
2. Capture an image of E-glass #1 as diffuse (all the other layers are transparent or removed);
3. Extract 3D locations of the corners of the checkerboard;
4. Repeat steps 2-3 for all the screens in the system;
5. P0 is the intersection of all the rays linking the relative corners of the checkerboard from different screens.

Once the location of P0 is computed, steps 1 through 5 of the first-mentioned method can be used with a fixed P0.

Figure 13A:
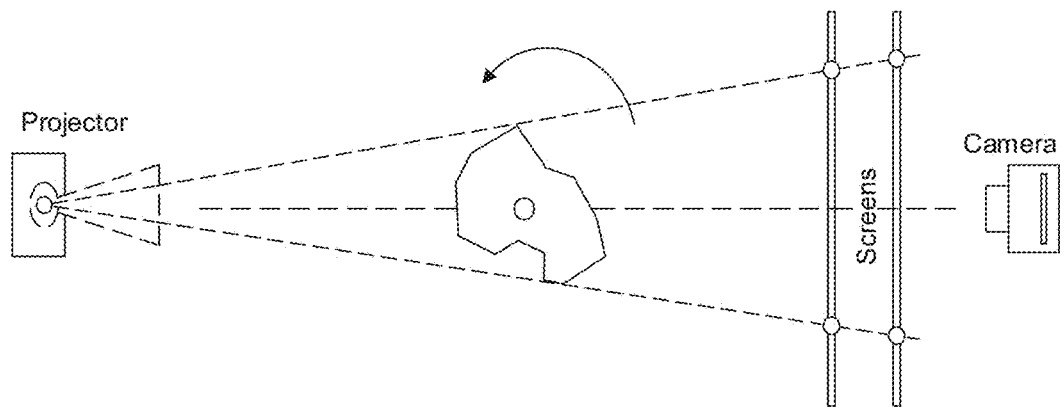
FIGS. 13A, 13B and 13C are illustrations for explaining the notion of the center of projection P0, showing how rotation of the object affects shadows on the screens and also affects the silhouette cone.
Figure 13B:
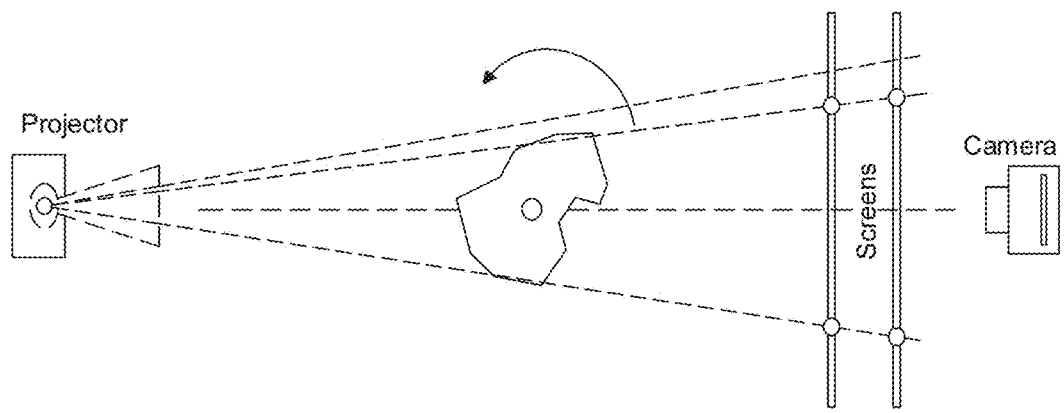
Figure 13C:
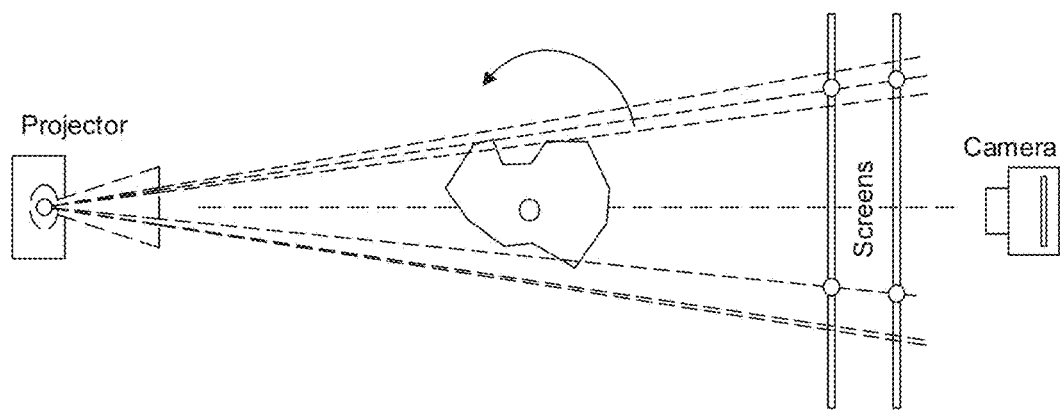

FIGS. 13A, 13B and 13C illustrate the notion of the center of projection P0. As shown in these figures, rotation of the object affects the shadows on the screens, and consequently also affects the silhouette cone. All the cones converge to a single point, which is the center of projection P0.

Some embodiments may be constructed with only one single diffuse layer, as shown in FIGS. 8A through 8D. In this case the position of the center of projection P0 has to be calibrated using the procedure described in Method #3 above. That is, with only a single diffuse layer, the silhouette cone is extracted by using the extreme points of the shadow (A1, B1, etc.) together with the fixed—and calibrated—position of P0.

Calibration Procedure for the E-Glass Layers

In the methods described herein, a calibration procedure for the E-glass layers is needed for triangulation of the extreme points. In particular, the positions of the screens need calibration in order to extract the silhouette cones. The calibration of the screens may comprise the following steps:

1—Project or place a printed checkerboard on each screen (separately);
2—Take a picture of the checkerboard on each plane;
3—Undistort the image using the intrinsic camera parameters;
4—Recover the extrinsic parameters of each checkerboard. In this embodiment, the extrinsic parameters include the joint rotation-translation matrix [R|t], i.e., the so-called matrix of extrinsic parameters.

Figure 14:
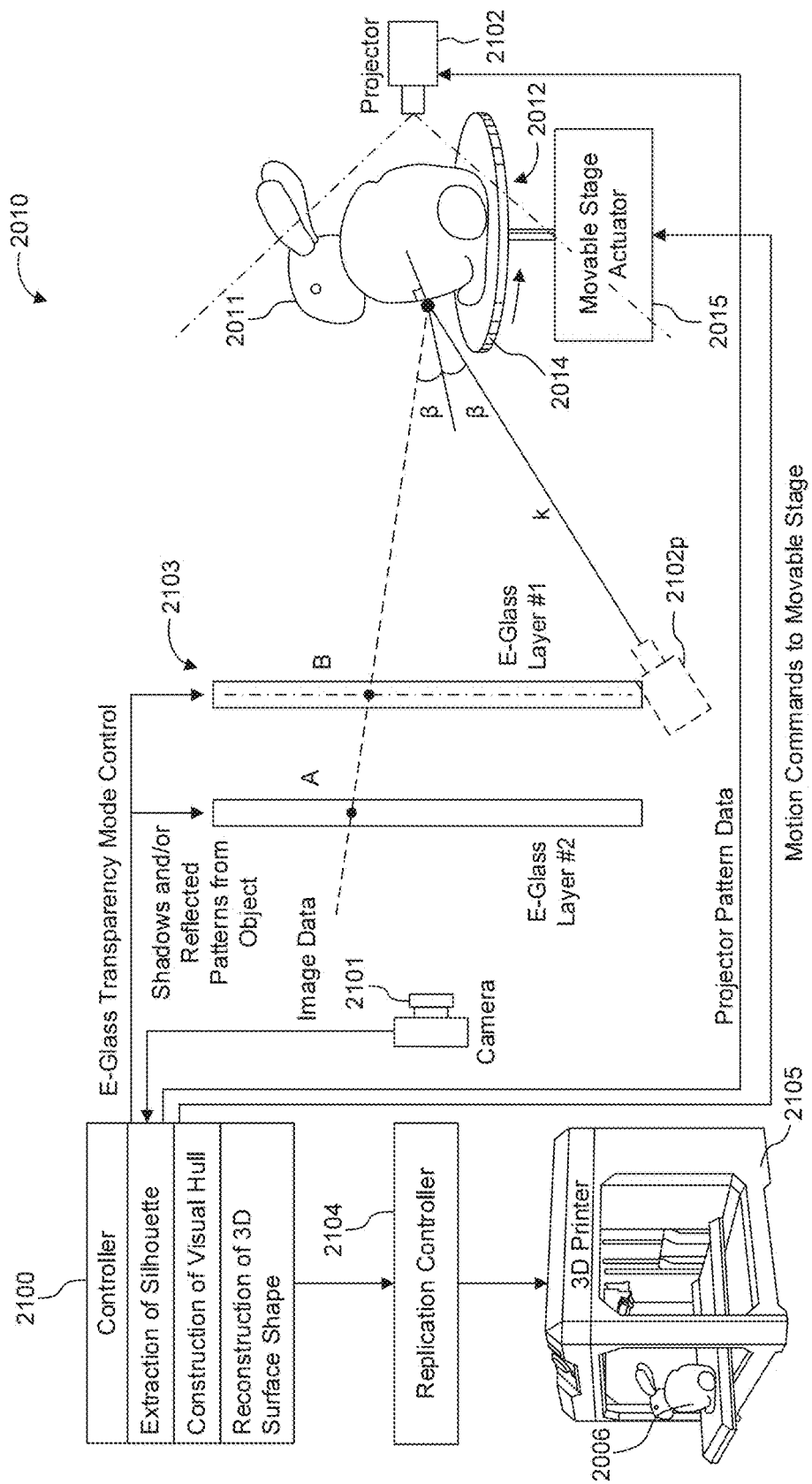
FIG. 14 is a view showing one example embodiment of a system for extraction of a silhouette cone and visual hull of an object, as well as 3D depth of the object for replication thereof.

FIG. 14 is a view showing another example embodiment of a system 2010 for extraction of a silhouette of an object by use of shadows cast on E-glass layers. In this example embodiment, in addition to extraction of a silhouette of the foreground object, the system of FIG. 14 is further configured to construct a visual hull of the foreground object by using the extracted silhouette, and is further configured to recover depth information and/or surface shape of the object. The object may be diffuse, or it may be specular, glossy or transparent or semi-transparent, and any single object may be heterogeneous by including combinations of these. System 2010 in this embodiment is further configured for replication of the object, for example, for 3D replication of the object physically (such as with a 3D printer) or representationally (as with a graphics display).

While FIG. 14 depicts a replication environment, it should be understood that this is simply an example environment in which the disclosure herein may be practiced, and that other environments or embodiments are of course possible. For example, extraction of a silhouette of a foreground object can also be used in the context of automated inspection, robotics, gripping and positioning, machine vision, quality control, image retrieval, shape modelling and scene reconstruction, security and so forth, among many others.

As shown in FIG. 14, a foreground object 2011 is positioned at an inspection station 2012, which in this embodiment is the surface of a movable stage 2014 by which the object can be moved into varying perspectives. In this embodiment, the movable stage is movable by rotation about a vertical axis, and in other embodiments the movable stage may be a 3-axis positioning table. Movable stage 2014 is moved under control of actuator 2015, via motion commands issued by controller 2100 for extraction of a silhouette.

Controller 2100 is configured to extract a silhouette of objects at inspection station 2012, based on commands issued to projector 2102 and commands issued to actuator 2015 for movable stage 2014, and based on image data received from image capture system 2101 which in this embodiment is a digital camera. Controller 2100 in this example embodiment is further configured to construct a visual hull based on the extracted silhouette, and to reconstruct surface shape based on the visual hull and based on additional captured images, such as images captured by camera 2101 based on patterns projected onto the object by projector 2102p positioned as shown in FIG. 10 by phantom lines. Based on the reconstruction obtained by controller 2100, controller 2100 controls replication controller 2104 so as to obtain a 3D replication of the object. In this embodiment, 3D replication of the object is obtained physically via 3D printer 2105, to produce replicated object 2106. In other embodiments, 3D replication of the object may be obtained representationally via a graphics display. More details of controller 2100 are provided below, such as in connection with FIG. 15.

FIG. 14 further depicts plural transparency-controllable layers 2103, positioned in spaced-apart relation relative to each other. In the FIG. 14 embodiment, there are two spaced-apart layers and in other embodiments there may be three or more spaced-apart layers. Under control from controller 2100, each transparency controllable layer is independently switchable between a transparent mode in which the layer is transparent, and a diffuse mode in which the layer diffuses light.

For the plural transparency-controllable layers 2103, this embodiment uses multiple layers of E-glass. As used in this description, the term "E-glass" refers to electronically switchable glass which is switchable between a transparent mode in which the glass is completely transparent, and a diffuse mode in which the glass assumes a frosted appearance. Images can be projected or formed on the frosted appearance of the diffuse mode, and this property of E-glass is used to advantage in the configuration described herein. E-glass is sometimes referred to as "smart glass", and the diffuse mode is sometimes referred to as opaque or translucent. One common use of E-glass is in the field of selectable privacy, such as in a conference room where the windows can be switched between an open transparent state and a private diffuse state.

E-glass is typically formed of a polymer dispersed liquid crystal (PDLC) or polymer stabilized cholesteric texture (PSCT) film sandwiched between two layers of glass with two layers of conductive interlayers, so as to allow control of the E-glass between the transparent mode and the diffuse mode. Other technologies for fabricating E-glass include suspended particle devices (SPDs) and electrochromic devices. For the E-glass used in this embodiment, the change-over from transparent mode to diffuse mode, and vice-versa, takes less than 10 seconds.

As used herein, E-glass refers to any of these or similar technologies, in which the transparency of a layer is controllable electrically between a fully transparent mode and a fully diffuse mode. The E-glass layers are positioned in spaced-apart relation to each other.

In this embodiment, a light projector such as projector 2102 projects light towards an object 2011 at inspection station 2012 so as to cause the object to cast a shadow image onto at least two transparency-controllable layers such as those at 2103. Projector 2102 in this embodiment preferably has an autofocus function, by which patterns projected by the projector are automatically focused onto the surface where the patterns are projected.

Camera 2101 is positioned so as to permit capture of an image or images of the shadow of the object, as cast by the projector 2102 onto the E-glass layers. A silhouette of the object is extracted from the captured images of the shadow of the object.

In addition to projector 2102, some embodiments may include a further projector, or a re-positioning of projector 2102, as shown at 2102p in phantom lines. By using the relative positionings of the E-glass layers to camera 2101 and projector 2102p, ray-tracing and/or triangulation techniques allow reconstruction of the 3D surface shape of the object 11 under inspection. The relative positionings are predetermined through calibration. More details on the relative positionings of E-glass layers 2103, relative to other elements such as projector 2101 and image capture system 2102p, are described in the following applications, which are incorporated by reference herein. Calibration is also described in these applications:

U.S. patent application Ser. No. 15/072,116, filed Mar. 16, 2016 by Mahdi Nezamabadi et al., "3D Shape Reconstruction Using Reflection Onto Electronic Light Diffusing Layers.

U.S. application Ser. No. 15/072,101, filed Mar. 16, 2016 by Mahdi Nezamabadi, "3D Shape Reconstruction Using Projection Onto Electronic Light Diffusing Layers".

In this embodiment, reconstruction of the surface shape of object 2011 proceeds by construction of a visual hull of the object by using the extracted silhouette. Depth of the surface of the foreground object may be estimated by calculations using images of the foreground object captured under controlled transparency of the first and second layers and controlled projection of patterned light by the projector. Details are described in the afore-mentioned U.S. patent application Ser. Nos. 15/072,116 and 15/072,101. Such calculations to estimate depth may use the visual hull as a filter to exclude regions of the captured images that do not correspond to the constructed visual hull.

For simplicity, all the arrangements in this section show use of only two E-glass layers. It will be understood that in general, the arrangements described herein work with N layers of E-glass, with $N \geq 2$.

Figure 15:
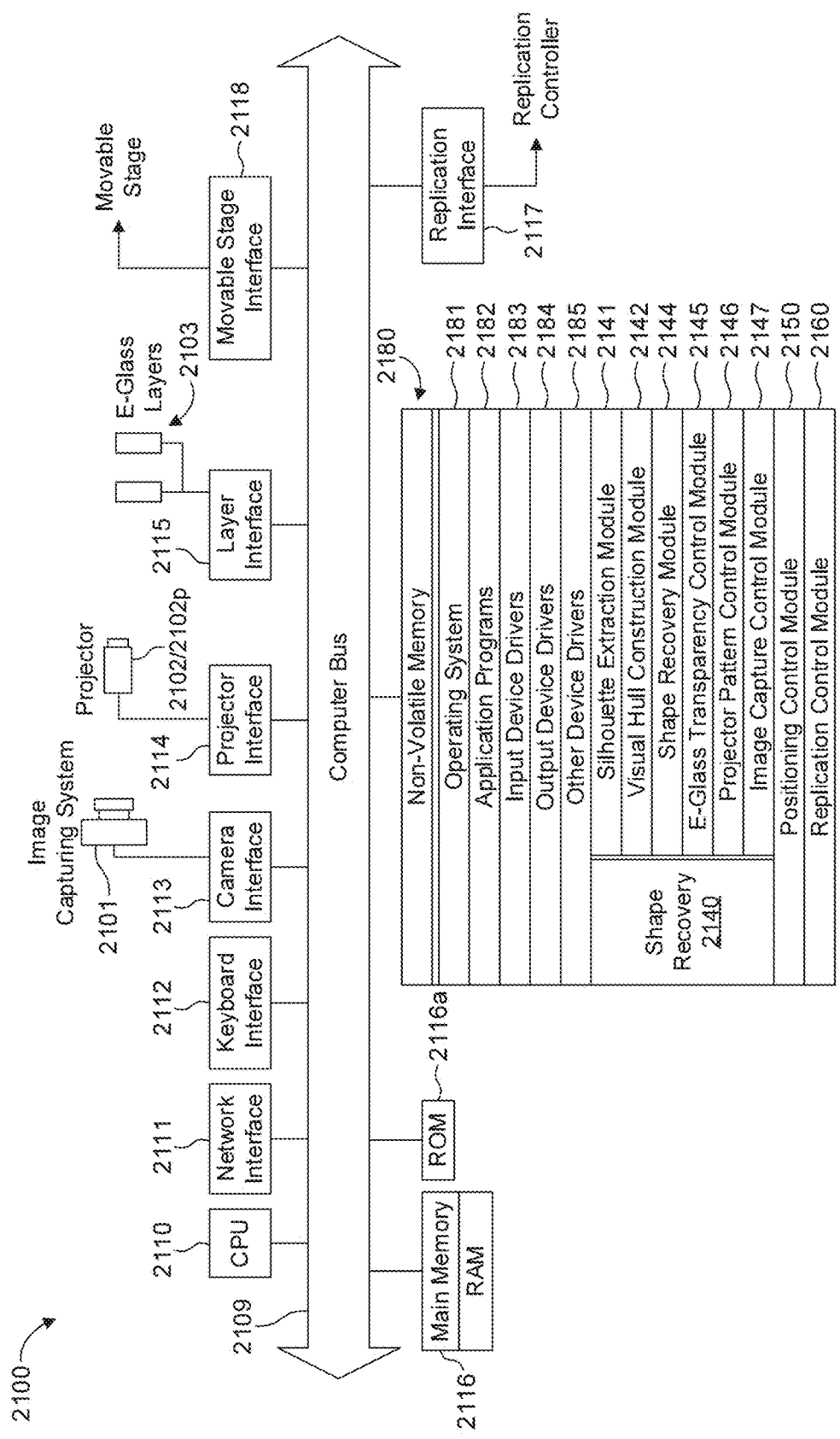
FIG. 15 is a view for explaining one embodiment of the architecture of the controller shown in FIG. 14.

FIG. 15 is a view for explaining one embodiment of the architecture of controller 2100 for extracting a silhouette of objects at inspection station 2012.

As shown in FIG. 15, controller 2100 includes CPU 2110 which interfaces with computer bus 2114. Also interfacing with computer bus 2114 are network interface 2111, keyboard interface 2112, camera interface 2113 which interfaces to image capture system 2101, projector interface 2114 which interfaces to projector 2102 and 2102p, E-glass interface 2115 which interfaces to the plural E-glass layers 2103, movable stage interface 2118 which interfaces to actuator 2015 of movable stage 2014, random access memory (RAM) 2116 for use as a main run-time transient memory, ROM 2116a, replication interface 2117 for interface to replication controller 2104, and non-volatile memory 2180 (e.g., a hard disk or other nonvolatile and non-transitory storage medium).

RAM 2116 interfaces with computer bus 2114 so as to provide information stored in RAM 2116 to CPU 2110 during execution of the instructions in software programs, such as an operating system, application programs, image processing modules, and device drivers. More specifically, CPU 2110 first loads computer-executable process steps from non-volatile memory 2180 or another storage device into a region of RAM 2116. CPU 2110 can then execute the stored process steps from RAM 2116 in order to execute the loaded computer-executable process steps. Data also can be stored in RAM 2116 so that the data can be accessed by CPU 2110 during the execution of the computer-executable software programs, to the extent that such software programs have a need to access and/or modify the data.

As also shown in FIG. 15, non-volatile memory 2180 contains computer-executable process steps for operating system 2181, and application programs 2182, such as graphic image management programs. Non-volatile memory 2180 also contains computer-executable process steps for device drivers for software interface to devices, such as input device drivers 2183, output device drivers 2184, and other device drivers 2185.

Non-volatile memory 2180 also stores a shape recovery module 2140, a positioning control module 2150, and replication control module 2160. These modules, i.e., the shape recovery module 2140, the positioning control module 2150, and the replication control module 2160, are comprised of computer-executable process steps for silhouette extraction and visual hull construction and recovery or reconstruction of 3D surface shape of an object, for repositioning of the object on movable stage 2014, and for control of replication controller 2104 for 3D replication of the object.

As shown in FIG. 15, shape recovery module 2140 generally comprises silhouette extraction module 2141 for an extracting a silhouette cone of an positioned at the inspection station based on captured images of the shadow of the object cast by projector 2102, a visual hull construction module for constructing a visual hull using the extracted silhouette cones, and shape recovery module 2144 for recovery of surface shape of the object under inspection. Shape recovery module 2140 also generally comprises an E-glass transparency control module 2145 for control over the transparency modes of each of the plural E-glass layers 2103, a projector pattern control module 2146 which stores one or more background patterns together with plural sequences of patterned light patterns and which controls projection of the plural sequences of background patterns and patterned light patterns by projector 2101, as well as image capture control module 2147 for control of image capture by image capturing system 2102.

Positioning control module 2150 controls repositioning of the object on movable stage 2014, and replication control module 2160 controls replication controller 2104 for 3D replication of the object.

With respect to movable stage 2014, controller 2100 issues positioning commands to reposition movable stage 2014 and the object thereon. At each position, by control over the E-glass layers and pattern projection, multiple silhouettes of the foreground object may be extracted. The extracted silhouettes may be used to construct a visual hull of the object. Repositioning of the object exposes other areas of its surface to image capture and illumination by the layers, and thereby permits 3D shape reconstruction with as much of the entirety of the object as desired.

The computer-executable process steps for these modules may be configured as part of operating system 2181, as part of an output device driver in output device drivers 2184, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Another Embodiment

One aspect of the present embodiment concerns the recovery of surface shape of glossy objects such as objects whose reflection characteristics include both a specular component and a diffuse component. It is to be understood that the embodiments described herein, and individual features and aspects thereof, may be combined each with the other such as in furtherance of the principles explained herein.

Figure 17:
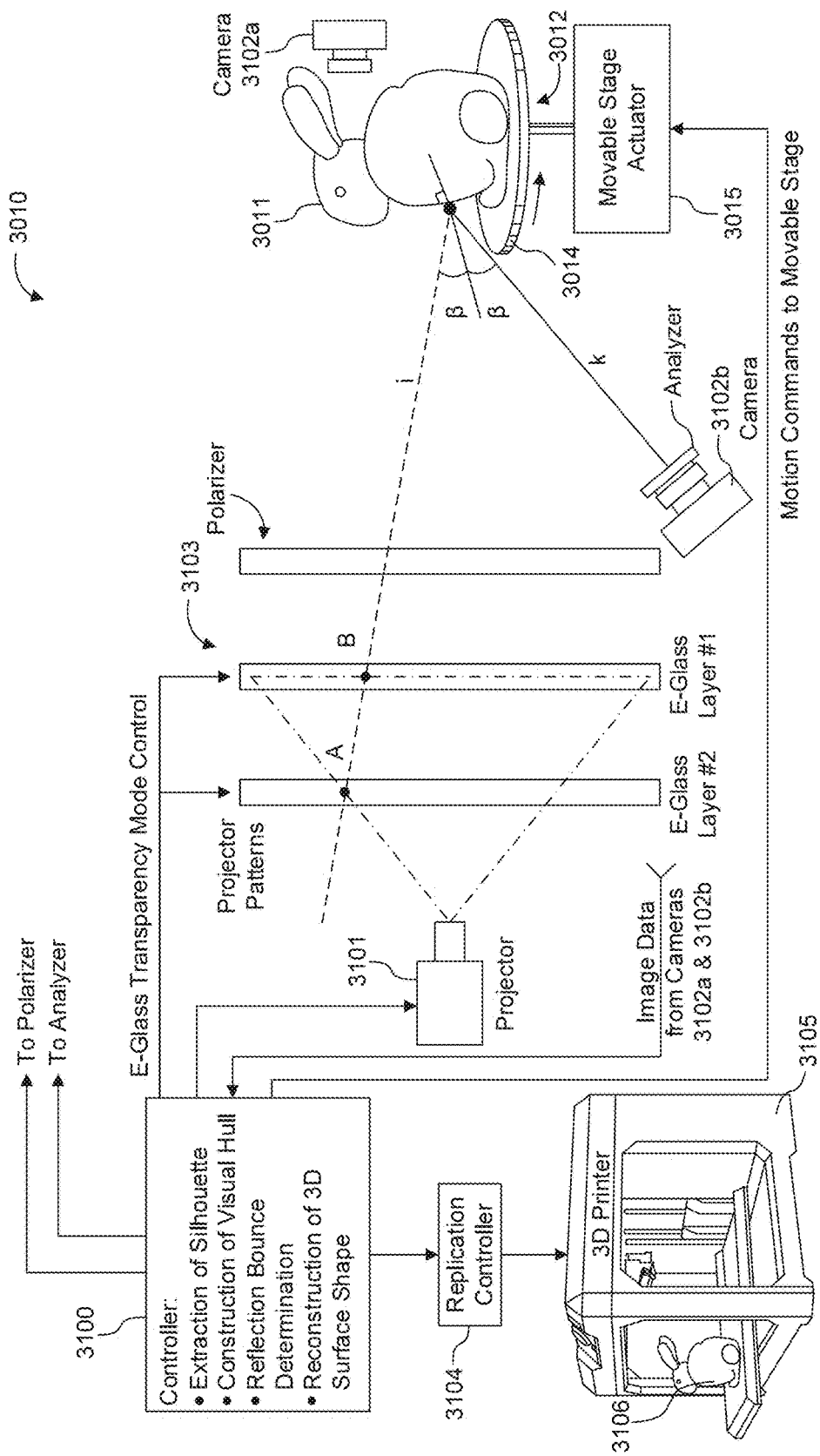
FIG. 17 is a view showing one example embodiment of a system for recovery of surface shape of glossy objects.

FIG. 17 is a view showing one example embodiment of a system for recovery of surface shape of glossy objects such as objects whose reflection characteristics include both a specular component and a diffuse component, in the form of a replication system 3010 in which surface shape of objects is recovered for replication, for example, for 3D replication of the object physically (such as with a 3D printer) or representationally (as with a graphics display).

While FIG. 17 depicts a replication environment, it should be understood that this is simply an example environment in which the disclosure herein may be practiced, and that other environments or embodiments are of course possible. For example, recovery of surface shape can also be used in the context of automated inspection, robotics, gripping and positioning, machine vision, quality control, defect detection, image retrieval, shape modelling and scene reconstruction, security and so forth, among many others.

As shown in FIG. 17, an object 3011 is positioned at an inspection station 3012, which in this embodiment is the surface of a movable stage 3014 by which the object can be moved into varying perspectives. In this embodiment, the movable stage is movable by rotation about a vertical axis, and in other embodiments the movable stage may be a 3-axis positioning table. Object 3011 is typically a specular object or a mirror-like object, or other similar object with a glossy or highly glossy surface, exhibiting reflection characteristics that include both specular and diffuse components. Movable stage 3014 is moved under control of actuator 3015, via motion commands issued by controller 3100 for reconstruction of surface shape.

Controller 3100 is configured to reconstruct surface shape of objects at inspection station 3012, based on commands issued to projector 3101, commands issued to transparency-controllable layers 3103, and commands issued to actuator 3015 for movable stage 3014; and based on image data received from an image capture system which in this embodiment includes digital cameras 3102a and 3102b. Based on the reconstruction obtained by controller 3100, controller 3100 controls replication controller 3104 so as to obtain a 3D replication of the object. In this embodiment, 3D replication of the object is obtained physically via 3D printer 3105, to produce replicated object 3106. In other embodiments, 3D replication of the object may be obtained representationally via a graphics display. More details of controller 3100 are provided below, such as in connection with FIG. 18.

FIG. 17 further depicts plural transparency-controllable layers 3103, positioned in spaced-apart relation relative to each other. In the FIG. 17 embodiment, there are two spaced-apart layers and in other embodiments there may be three or more spaced-apart layers. Under control from controller 3100, each transparency controllable layer is independently switchable between a transparent mode in which the layer is transparent, and a diffuse mode in which the layer diffuses light.

For the plural transparency-controllable layers 3103, this embodiment uses multiple layers of E-glass. As used herein, the term "E-glass" refers to electronically switchable glass which is switchable between a transparent mode in which the glass is completely transparent, and a diffuse mode in which the glass assumes a frosted appearance. Images can be projected or formed on the frosted appearance of the diffuse mode, and this property of E-glass is used to advantage in the configuration described herein. E-glass is sometimes referred to as "smart glass", and the diffuse mode is sometimes referred to as opaque or translucent. One common use of E-glass is in the field of selectable privacy, such as in a conference room where the windows can be switched between an open transparent state and a private diffuse state.

E-glass is typically formed of a polymer dispersed liquid crystal (PDLC) or polymer stabilized cholesteric texture (PSCT) film sandwiched between two layers of glass with two layers of conductive interlayers, so as to allow control of the E-glass between the transparent mode and the diffuse mode. Other technologies for fabricating E-glass include suspended particle devices (SPDs) and electrochromic devices. For the E-glass used in this embodiment, the change-over from transparent mode to diffuse mode, and vice-versa, takes less than 10 seconds.

As used herein, E-glass refers to any of these or similar technologies, in which the transparency of a layer is controllable electrically between a fully transparent mode and a fully diffuse mode.

The E-glass layers are positioned in spaced-apart relation to each other, such that by using the relative positionings of the E-glass layers to projector 3101 and cameras 3102a and 3102b, ray-tracing and/or triangulation techniques allow reconstruction of the 3D surface shape of the object 3011 under inspection. The relative positionings are predetermined through calibration. More details on the relative positionings of E-glass layers 3103, relative to other elements such as projector 3101 and the image capture system, and calibration, are described in the afore-mentioned U.S. application Ser. No. 15/072,101, which is incorporated by reference.

In addition to the plural E-glass layers 3103, the FIG. 17 embodiment also includes a pair of polarizers, one configured to polarize light and the other configured to analyze polarized light. In the FIG. 17 embodiment, the first polarizer is positioned between the E-glass layers and the object, so as to polarize light illuminated toward the object. The second polarizer is positioned in front of camera 3102b so as to permit analysis of the polarization state of light reflected from the object.

More particularly, with respect to the pair of polarizers in the FIG. 17 embodiment, one is used as a polarizer to polarize the incident light before it reaches the object; and the other is used as an analyzer to analyze the light reflected off the object. Either the analyzer or the polarizer can rotate, or both can rotate.

In the FIG. 17 embodiment, the pair of polarizers are usable to separate a diffuse component of reflection from a specular component of reflection. Each surface point on highly glossy or heterogeneous objects will typically reflect in both modes, and separation of each component facilitates accurate surface reconstruction for such objects. It should be understood that in some embodiments, where mainly specular reflections are expected, with little or no diffuse reflection, the polarizers may be omitted, and processing to separate diffuse and specular components of reflection may likewise be omitted.

In embodiments which separate diffuse and specular components of reflection, separation of these components is described in the afore-mentioned U.S. Application No. 62/309,897, incorporated by reference herein.

Briefly, as explained in greater detail in said Application No. 62/309,897, to obtain a diffuse component of reflection from the object 3011 at the inspection station, all E-glass layers are set to transparent mode, and projector 3101 projects the patterns directly onto the surface of the diffuse object. The state of polarization is varied, and camera 3102b captures images of the patterns as projected onto the object. The nature and intensity of the captured images varies in accordance with the variation in the state of polarization, which allows for separation of diffuse and specular components of reflection. The diffuse component allows the depth for each pixel of the object at the inspection station to be calculated based on traditional triangulation methodology.

To obtain a specular component of reflection, each different layer of E-glass is in turn set to diffuse mode with all others set to transparent mode, and projector 3101 projects patterns so as to illuminate the object by the patterns projected onto the diffuse mode layer. The state of polarization is varied, and images are captured of the structured light pattern as reflected by the glossy surface of the object. The nature and intensity of the captured images varies in accordance with the variation in the state of polarization, which allows for separation of diffuse and specular components of reflection. By projecting multiple different patterns, such as multiple different Gray code patterns, and by sequencing through each E-glass layer for each pattern, the 3D shape of the entirety of the visible surface of the object can be reconstructed by analysis of the specular component of the captured images of the distorted reflections of the patterns caused by the surface of the object.

The position of camera and the E-glass layers are determined during a calibration process and stored for later computations. The correspondences between camera pixels and points on E-glass layers are established by projecting coded patterns, different from each other, such that each pixel at the layer is uniquely identifiable. The patterns may, for example, be patterns of horizontal and vertical stripe patterns, such as binary patterns, each pattern in the sequence having a spatial frequency that differs from others of the patterns in the sequence, such as Gray code patterns.

Projector 3101 in this embodiment has an autofocus function, by which patterns projected by the projector are automatically focused onto the surface where the patterns are projected. This provides an advantageous benefit: because the transparency mode of the E-glass layers 3103 is changed between diffuse mode and transparent mode, the surface onto which patterns are projected is likewise changed. For example, in a circumstance when an innermost E-glass layer is in the diffuse mode, patterns are projected onto the innermost layer. The focus distance in this circumstance differs from a circumstance when the innermost E-glass layer is in the transparent mode and the outermost layer is in the diffuse mode, where patterns are projected onto the outermost layer. Both of these focus distances are different from the circumstance when all E-glass layers are in the transparent mode, the object is diffuse, and patterns are projected directly onto the surface of the diffuse object. The autofocus function of projector 3101 responds automatically to these changes in focus distance, ensuring that the projected patterns remain in focus regardless of the surface onto which they are projected.

As depicted in FIG. 17, controller 3100 provides commands to the pair of polarizers (i.e., to the polarizer and to the analyzer), mode commands (for example, diffuse vs. transparent) to the E-glass layers, pattern commands (such as Gray code patterns) to the projector, motion commands to the movable stage, and replication commands to the replication controller. Controller 3100 receives image data from the image capture system, and uses the image data for functionality which includes functionality to extract a silhouette of the object, functionality to construct a visual hull for the object, functionality to determine the number of reflections encountered by a light ray reflected by the surface of the object (sometimes referred to herein as the number of "bounces"), and functionality to reconstruct the 3D surface shape of the object based on the captured image data.

Figure 18:
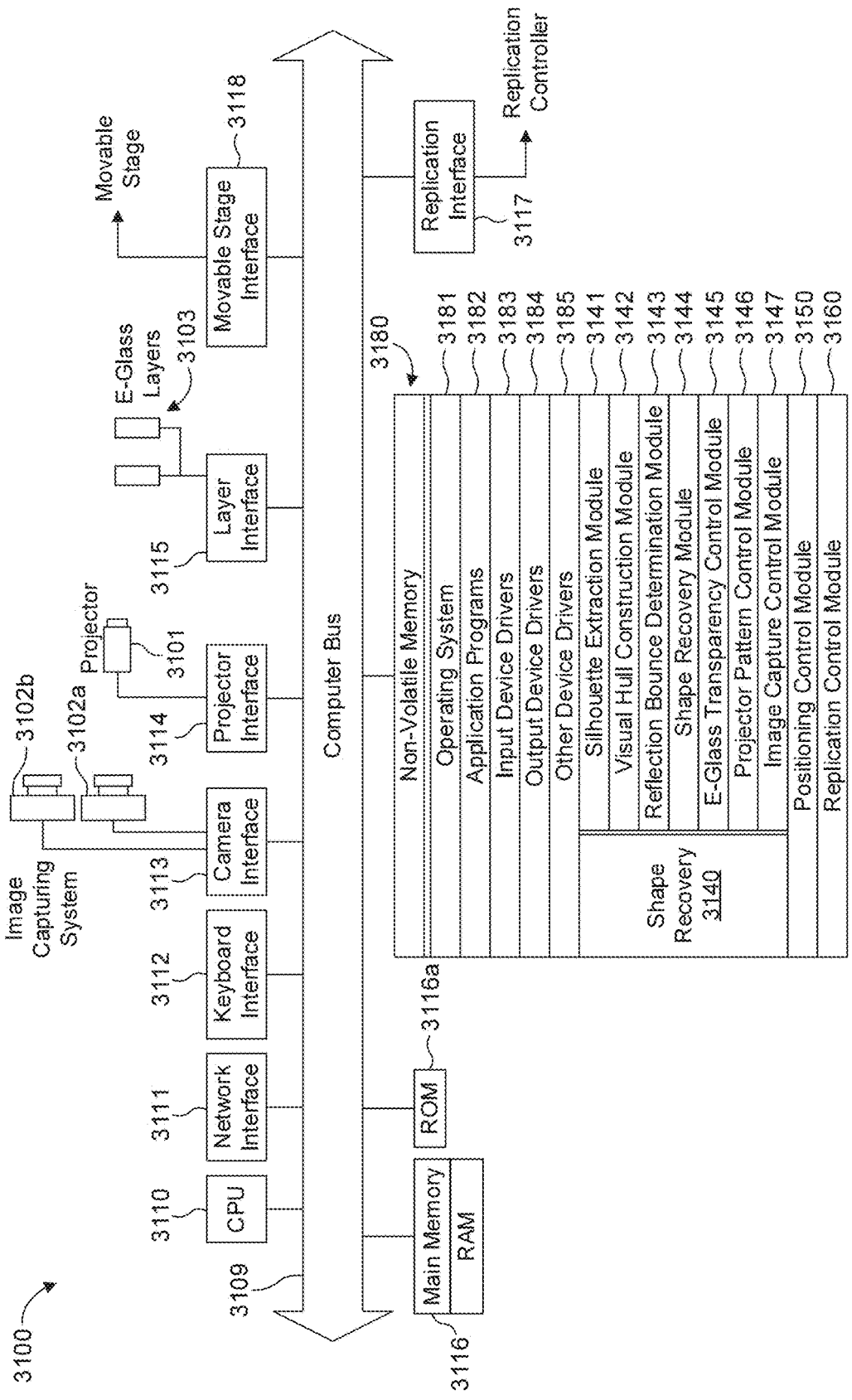
FIG. 18 is a view for explaining one embodiment of the architecture of the controller shown in FIG. 2.

FIG. 18 is a view for explaining one embodiment of the architecture of controller 3100 for shape reconstruction of objects at inspection station 3012.

As shown in FIG. 18, controller 3100 includes CPU 3110 which interfaces with computer bus 3109. Also interfacing with computer bus 3109 are network interface 3111, keyboard interface 3112, camera interface 3113 which interfaces to the image capture system including cameras 3102a and 3102b, projector interface 3114 which interfaces to projector 3101, E-glass interface 3115 which interfaces to the plural E-glass layers 3103, movable stage interface 3118 which interfaces to actuator 3015 of movable stage 3014, RAM 3116 for use as a main run-time transient memory, ROM 3116a, replication interface 3117 for interface to replication controller 3104, and non-volatile memory 3180 (e.g., a hard disk or other nonvolatile and non-transitory storage medium).

RAM 3116 interfaces with computer bus 3109 so as to provide information stored in RAM 3116 to CPU 3110 during execution of the instructions in software programs, such as an operating system, application programs, image processing modules, and device drivers. More specifically, CPU 3110 first loads computer-executable process steps from non-volatile memory 3180 or another storage device into a region of RAM 3116. CPU 3110 can then execute the stored process steps from RAM 3116 in order to execute the loaded computer-executable process steps. Data also can be stored in RAM 3116 so that the data can be accessed by CPU 3110 during the execution of the computer-executable software programs, to the extent that such software programs have a need to access and/or modify the data.

As also shown in FIG. 18, non-volatile memory 3180 contains computer-executable process steps for operating system 3181 and for application programs 3182, such as graphic image management programs. Non-volatile memory 3180 also contains computer-executable process steps for device drivers for software interface to devices, such as input device drivers 3183, output device drivers 3184, and other device drivers 3185.

Non-volatile memory 3180 also stores a shape recovery module 3140, a positioning control module 3150, and replication control module 3160. These modules, i.e., the shape recovery module 3140, the positioning control module 3150, and the replication control module 3160, are comprised of computer-executable process steps for 3D shape reconstruction of the surface shape of an object, for repositioning of the object on movable stage 3014, and for control of replication controller 3104 for 3D replication of the object.

As shown in FIG. 18, shape recovery module 3140 generally comprises silhouette extraction module 3141 for extracting a silhouette of a foreground object positioned against a background, a visual hull construction module 3142 for constructing a visual hull using the extracted silhouette, a reflection bounce determination module 3143 for determining the number of bounces encountered at the surface of the object by a light ray, and shape recovery module 3144 for recovery of surface shape of the object under inspection. Shape recovery module 3140 also generally comprises an E-glass transparency control module 3145 for control over the transparency modes of each of the plural E-glass layers 3103, a projector pattern control module 3146 which stores one or more background patterns together with plural sequences of patterned light patterns and which controls projection of the plural sequences of background patterns and patterned light patterns by projector 3101, as well as image capture control module 3147 for control of image capture by image capturing system 3102.

Unshown in FIG. 18 is a further module, also stored in non-volatile memory 3180, for control over the pair of polarizers, so as to rotate the polarizer and/or the analyzer and alter the state of polarization, for those embodiments that separate diffuse and specular components of reflection.

Positioning control module 3150 controls repositioning of the object on movable stage 3014, and replication control module 3160 controls replication controller 3104 for 3D replication of the object.

With respect to movable stage 3014, controller 3100 issues positioning commands to reposition movable stage 3014 and the object thereon. At each position, by control over the E-glass layers and pattern projection, multiple silhouettes of the foreground object may be extracted. The extracted silhouettes may be used to construct a visual hull of the object, and the visual hull may be used to determine the number of bounces for a reflected light ray. Repositioning of the object exposes other areas of its surface to image capture and illumination by the layers, and thereby permits 3D shape reconstruction with as much of the entirety of the object as desired.

The computer-executable process steps for these modules may be configured as part of operating system 3181, as part of an output device driver in output device drivers 3184, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Shape Reconstruction in the Presence of Multi-Reflections

In a captured image of a specular object using the system shown above, or when working with the separated-out specular component of a captured image, there are three (3) different categories of ray paths:

0-bounce (dashed line 3025 in FIG. 16): camera rays (corresponding to camera pixels) that do not hit the target object.

1-bounce or direct (dashed lines 3021 and 3022 in FIG. 16): rays that hit the object once and then bounce to the screens.

Figure 16:
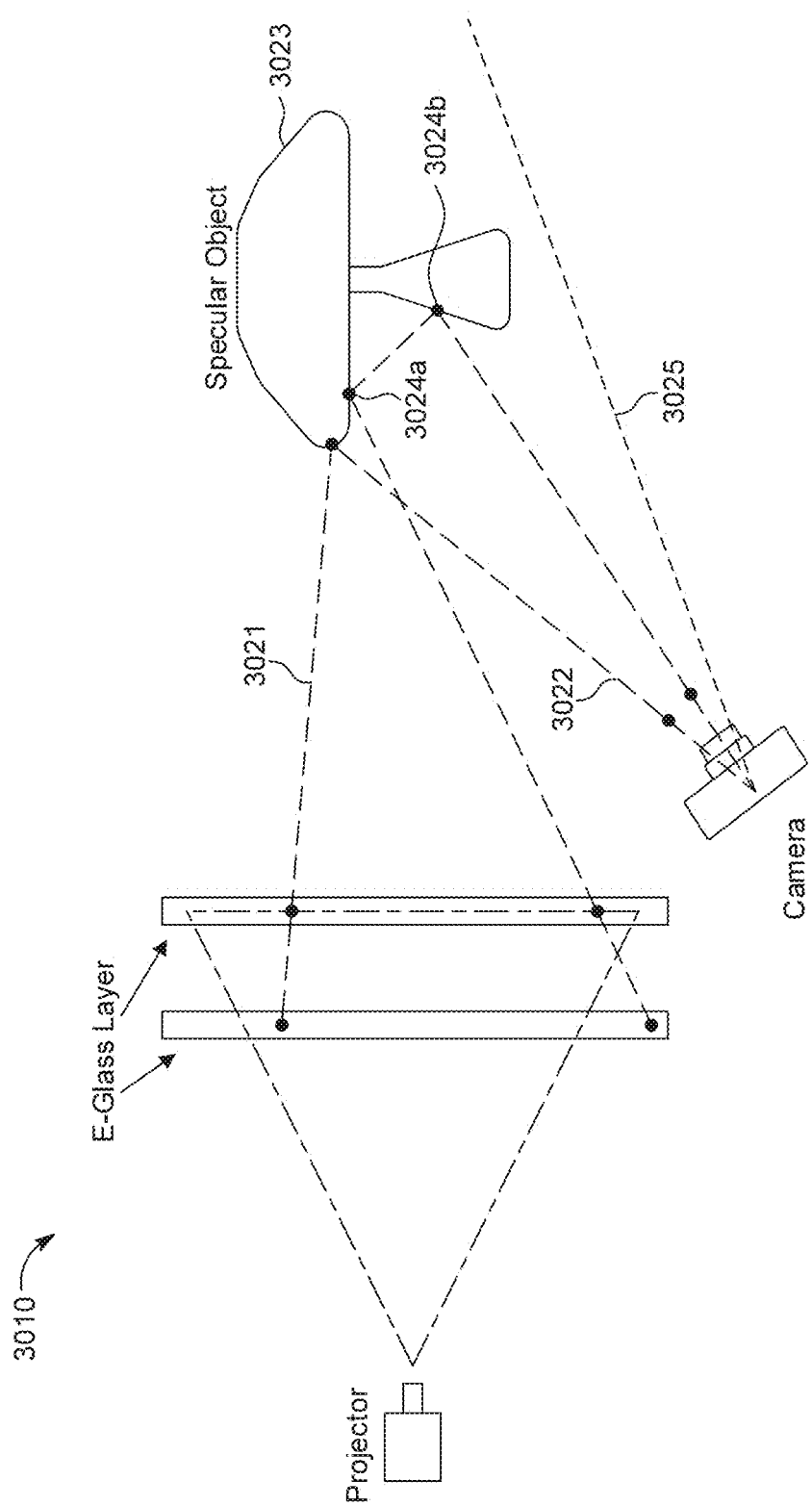
FIG. 16 is a view showing one-bounce direct reflections and multi-bounce indirect reflections.

N-bounce or indirect where N is greater than or equal to two (2) (dashed line corresponding to reflection points 3024a and 3024b in FIG. 16): rays that hit the object multiple times such as due to concave regions of the object, and then bounce to the screens.

The system described herein utilizes shape reconstruction techniques which distinguish between these three categories. Principally, the technique is divided in two tasks: (1) Reconstruct the visual hull of the object; and (2) Starting from the visual hull, measure the shape by triangulating only the direct paths (i.e., the 1-bounce paths).

The first task is achieved by extracting the silhouette of the object at each view and then combining them together using the angle of rotation of each pose/camera. Extraction of the silhouette, and construction of the visual hull, is described above.

Figure 19:
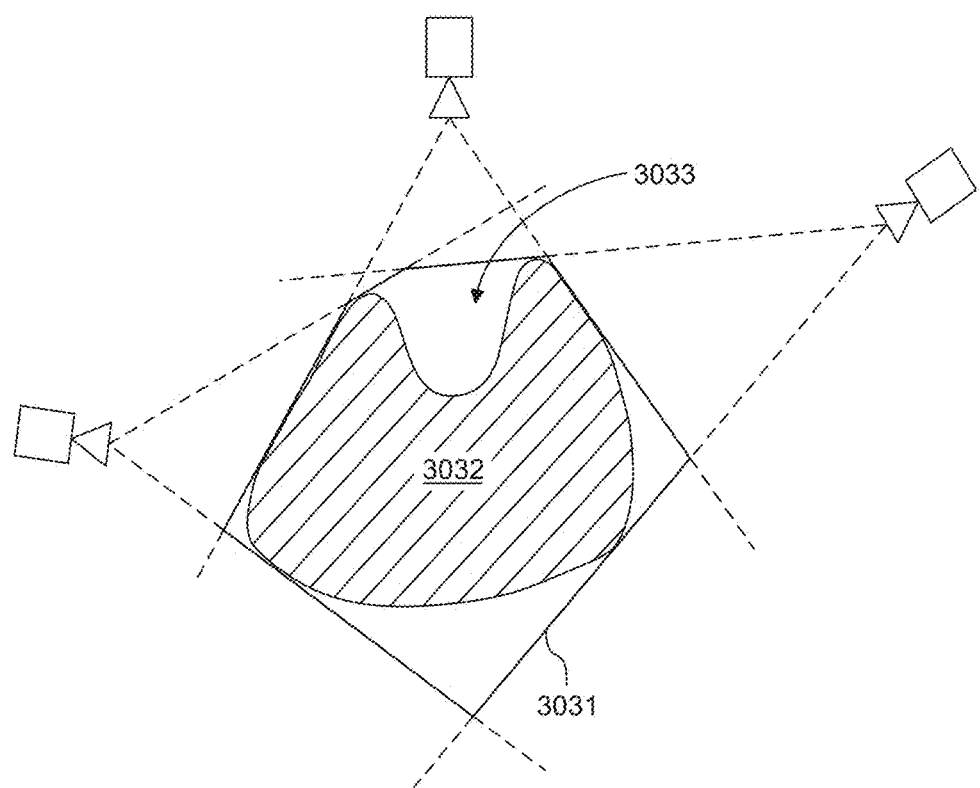
FIG. 19 shows an example of 2D visual hull for an object that includes concave areas.

FIG. 19 shows an example of a 2D visual hull 3031 for an object 3032 that includes concave areas such as area 3033. The visual hull is estimated by combining silhouettes from different viewpoints. As shown in FIG. 4, concave regions cannot be properly reconstructed using only the visual hull.

Using the estimated visual hull, the second task is performed, so as to distinguish the 1-bounce paths and to triangulate using only the 1-bounce paths.

One challenge of the second task is to distinguish direct reflections (1-bounce paths) from multi-reflections (N-bounce paths). The disclosure herein capitalizes on three properties of light ray reflection in the system.

Property #1: In a direct reflection (1-bounce paths), the camera ray (given by the camera pixel) and the light ray (given by the code read from the screens) are coplanar; in other words they lie on the epipolar plane.

Property #2: A generic multi-bounce path (N-bounce paths) usually does not keep the rays coplanar. This has been demonstrated by M. O'Toole et al., cited above, and acts as a computationally-simple first step in determining whether to exclude a reflection from the reconstruction of surface shape.

Property #3: In the rare event that the rays of a multi-bounce path are coplanar, they probably meet outside the visual hull. It should be understood that the rays of all multi-bounce paths usually meet outside the visual hull, regardless of whether the rays are or are not coplanar. On the other hand, direct reflections (1-bounce paths) will lie within the visual hull.

Figure 20:
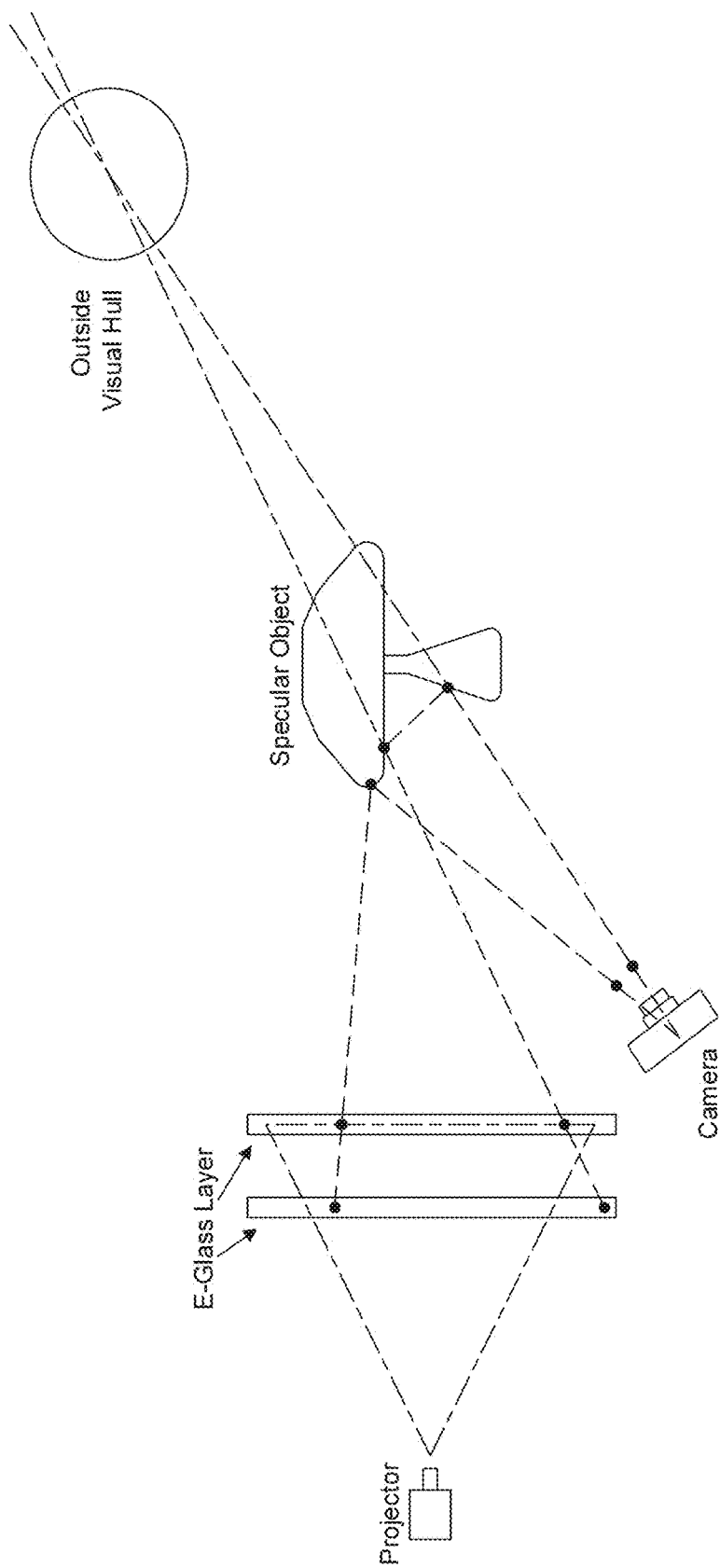
FIG. 20 is an illustration of a multi-bounce path, demonstrating that for a multi-bounce situation, the light rays meet outside the visual-hull of the object.

FIG. 20 is an illustration of a multi-bounce path, demonstrating that for a multi-bounce situation, the light rays meet outside the visual-hull of the object. This is consistent with property #3.

Thus, according to the disclosure herein, direct paths are distinguished from multi-reflection paths based at least on whether the rays do or do not meet inside the visual hull. Once the direct paths are distinguished from the multi-reflection paths, ray triangulation is used only on the direct paths, while excluding the multi-reflection paths, so as to obtain the concave areas missing from the reconstruction of the visual hull.

Figure 21:
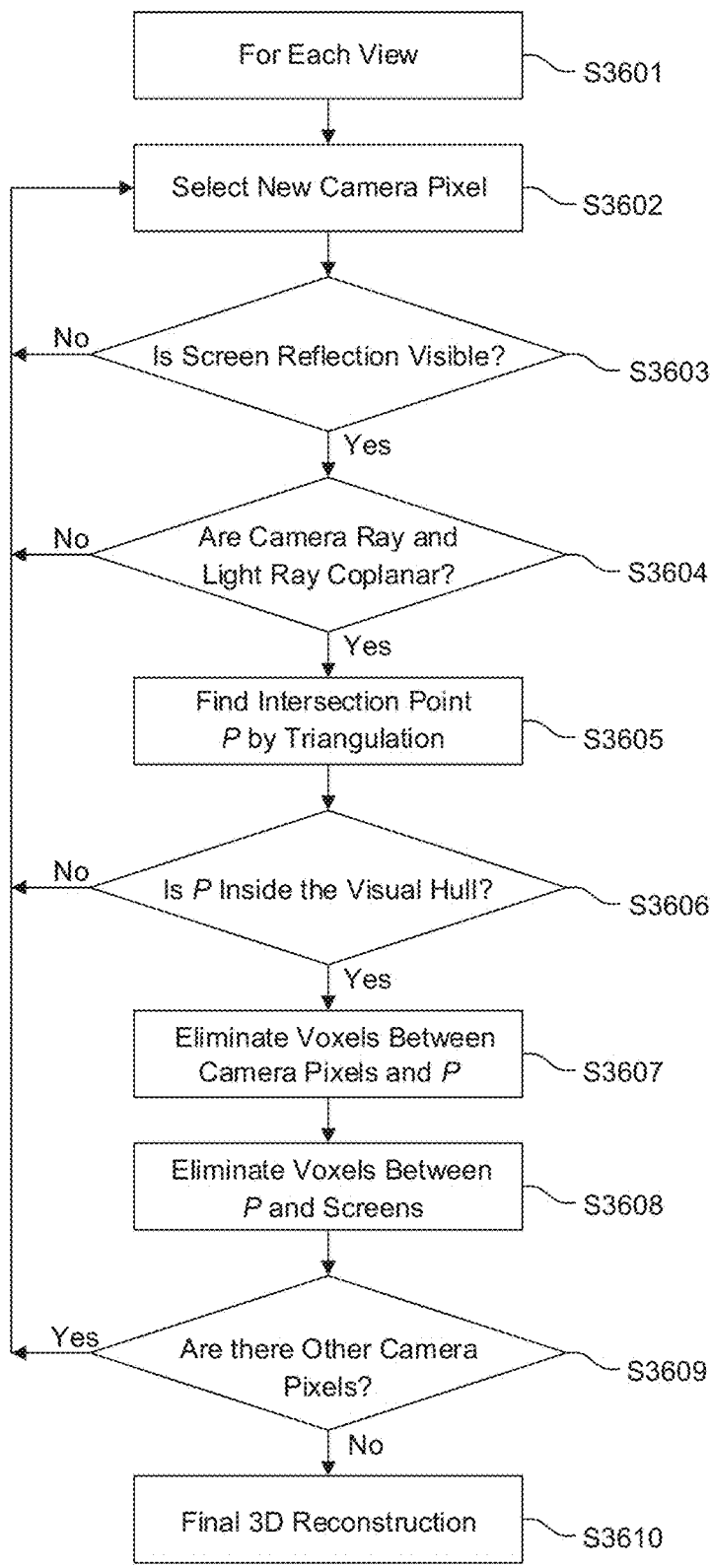
FIG. 21 is a flow diagram for explaining shape reconstruction according to the disclosure herein.

FIG. 21 is a flow diagram for explaining shape reconstruction according to the disclosure herein. The FIG. 21 flow diagram illustrates a 3D shape reconstruction technique herein termed "voxel carving", which in this disclosure refers to a technique whereby the voxels of the object's visual hull are carved away based on exclusion of multi-reflection paths, so as to reveal concave areas of the object that were not visible in the visual hull. In this embodiment, the process steps shown in FIG. 21 are executed by controller 3100.

In connection with the steps shown in FIG. 21, controller 3100 operates shape recovery module 3140 so as to collect images of an object at inspection station 3012 under various patterns projected onto E-glass layers 3103, from multiple different viewpoints by repositionings of movable stage 3014. More specifically, E-glass transparency control 3145 independently controls transparency of each of E-glass layers 3103, while projector pattern control module 3146 controls projector 3101 to project multiple different patterns onto the E-glass layers. At the projection of a background pattern, image capture control module 3147 controls camera 3102a to capture an image of the object as silhouetted by the background, for use by silhouette extraction module 3141 for extracting a silhouette of the object positioned against the projected background. Based on the silhouettes extracted at the multiple positionings of the object, visual hull construction module 3142 constructs a visual hull of the object. Extraction of the silhouette, and construction of the visual hull, is described above. It is this visual hull that is subjected to the voxel carving described in FIG. 6.

Likewise, and in connection with the steps shown in FIG. 21, at the projection of patterned light having coded light patterns, and in conjunction with transparency control of E-glass layers 3103 by E-glass transparency control 3145, image capture control module 3147 controls camera 3102b to capture an image of the patterned light as reflected by the object. The patterned light codes the direction of each ray of light. Using images of the reflected light patterns, as captured by camera 3102b, the patterns are decoded to determine ray direction, and the decoded ray directions are used by reflection bounce determination module 3143, so as to differentiate between direct bounce rays and multi-bounce rays, with the multi-bounce rays thereafter being excluded, and the direct bounce rays thereafter being used by shape recovery module 3144 in recovery to the 3D shape of the object.

In embodiments where there is separation of diffuse and specular components of reflection, the unshown polarization control module controls the polarization state of the polarizer and the analyzer, so as to vary the polarization of light and permit separation of diffuse and specular components of reflection.

Referring to the voxel carving shown in the flow diagram of FIG. 21, from a volume of voxels (such as a cube containing the object), voxels are removed by using the extracted silhouettes at each rotation to remove voxels that are not part of the silhouette cone. The remaining voxels formed the visual hull of the target object.

Thereafter, triangulation is performed using direct bounce rays, to the exclusion of multi-bounce rays, so as to eliminate voxels from the visual hull corresponding to concave regions of the object.

More specifically, for each different view (step S3601), a new camera pixel in the view's image is selected (step S3602). Step S3603 determines whether a screen reflection is visible for the selected pixel. A screen reflection might not be visible in situations such as those shown by dotted line 3025 in FIG. 16. If a screen reflection is not visible, flow returns to step S3602 for selection of another pixel in the image.

If a screen reflection is visible, then flow advances to step S3604 to determine whether the camera ray and the light ray are coplanar, i.e., whether the camera ray and the light ray are epipolar. The direction of the camera ray is determined by its pixel's location in the image, and the direction of the light ray is determined by decoding of the coded patterned light. If the camera ray and the light ray are not coplanar, then the reflection corresponds to a multi-bounce reflection, and triangulation is not performed using the selected pixel's reflection. Instead, flow returns to step S3602 to select another pixel.

If the camera ray and the light ray are coplanar, flow advances to step S3605 to find the point P representing the intersection between the camera ray and the light ray. Step S3606 determines whether the intersection point P lies inside of the visual hull. If the intersection point P does not lie inside the visual hull, then the reflection corresponds to a multi-bounce reflection, and triangulation is not performed using the selected pixel's reflection. Instead, flow returns to step S3602 to select another pixel.

If the intersection point P lies inside of the visual hull, then the selected pixel's reflection corresponds to a direct-bounce reflection, and the reflection is thus eligible for use in 3D surface reconstruction. Flow thus advances to steps S3607 and S3608 where voxel carving is performed. Specifically, step S3607 eliminates all voxels between the camera pixel and the intersection point P, and step S3609 eliminates all voxels between intersection point P and E-glass screens 3103. Flow then advances to step S3609 to determine whether there are any further pixels in the camera image, or any further views for processing.

When all pixels and views have been processed, voxel carving is complete, and flow terminates at step S3610. In step S3610, the remaining voxels correspond to the 3D surface shape of the object.

Simulated Experiments

This section shows results on simulated data. In this example the size of the voxels is 250×250 µm.

Figure 24C:
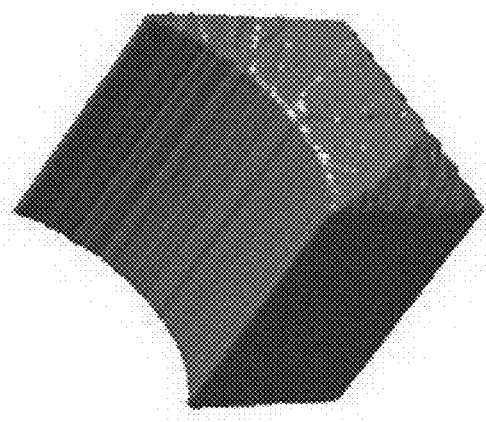
Figure 24B:
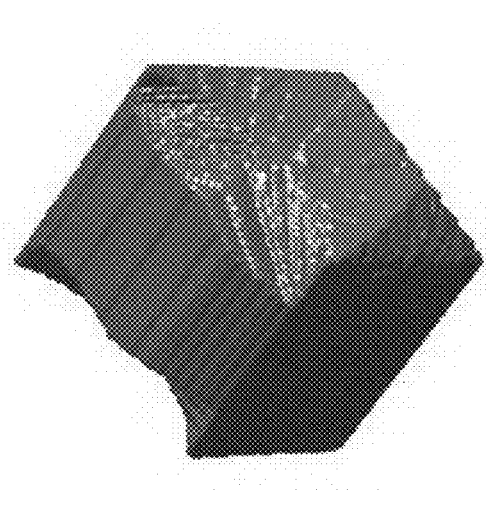
Figure 24A:
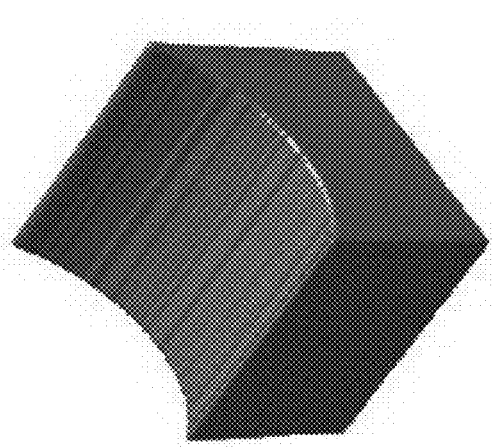

For purposes of simulation, a specular 3D object shown in FIG. 24A is synthetically created, for purposes of a ground-truth comparison with the 3D surface reconstruction of the disclosed embodiments.

FIG. 24B is a reconstruction of the visual hull of the object before voxel carving. FIG. 24C shows 3D surface reconstruction after voxel carving, which uses only direct bounce rays to the exclusion of multi-bounce rays. The 3D surface reconstruction of FIG. 24C shows good agreement with the ground truth of FIG. 24A.

Other Embodiments

As shown at dotted line 3025 in FIG. 16, a screen reflection might not be visible to all pixels in captured images of the object. In one sense, these pixels are "wasted" since they provide little information on the 3D surface shape of the object. Moreover, multiple positionings by movable stage 3014 are needed to capture images of the entirety of the object, such that efficiency is perhaps not as high as it could be.

Figure 22:
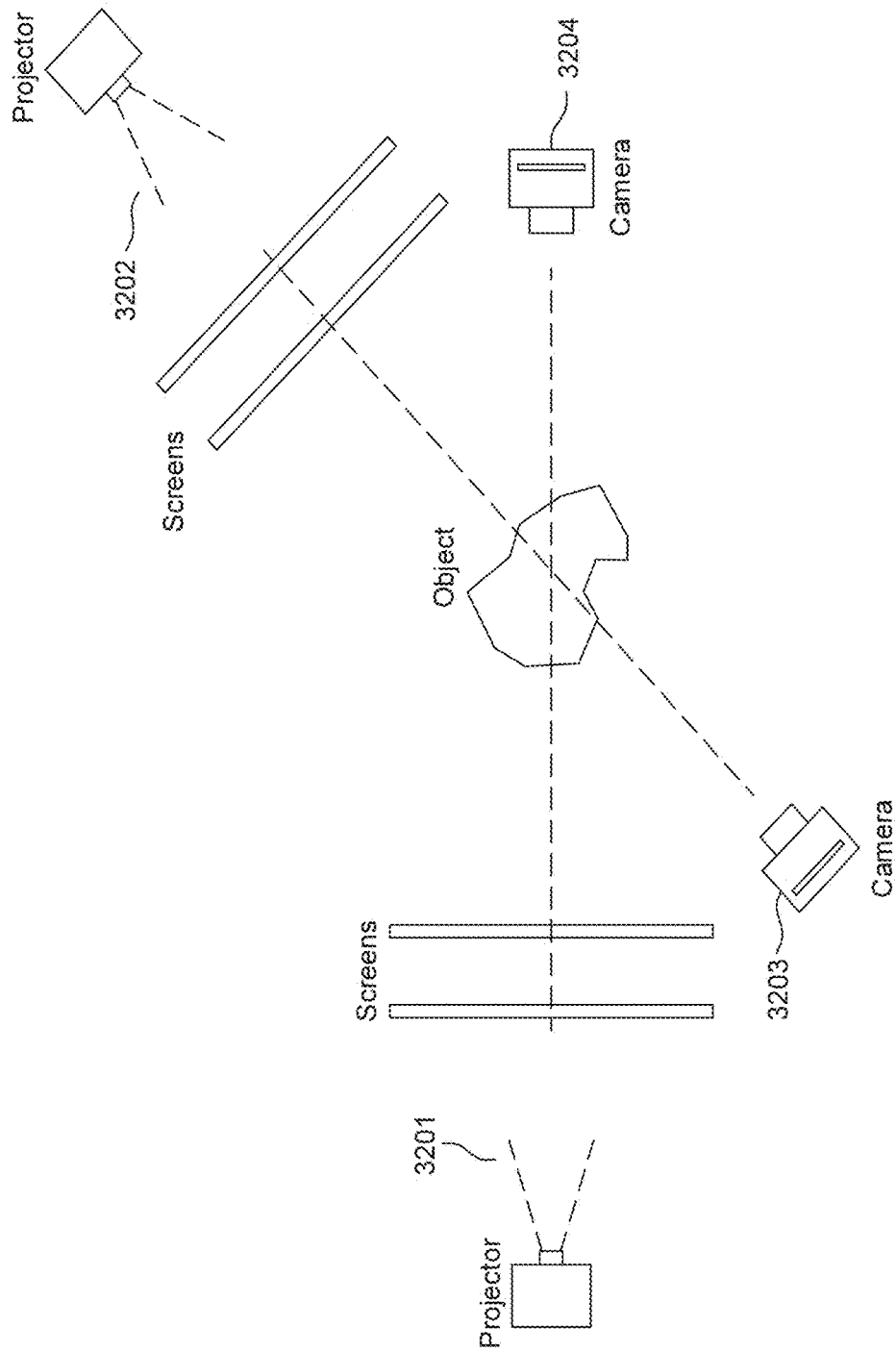
Figure 23:
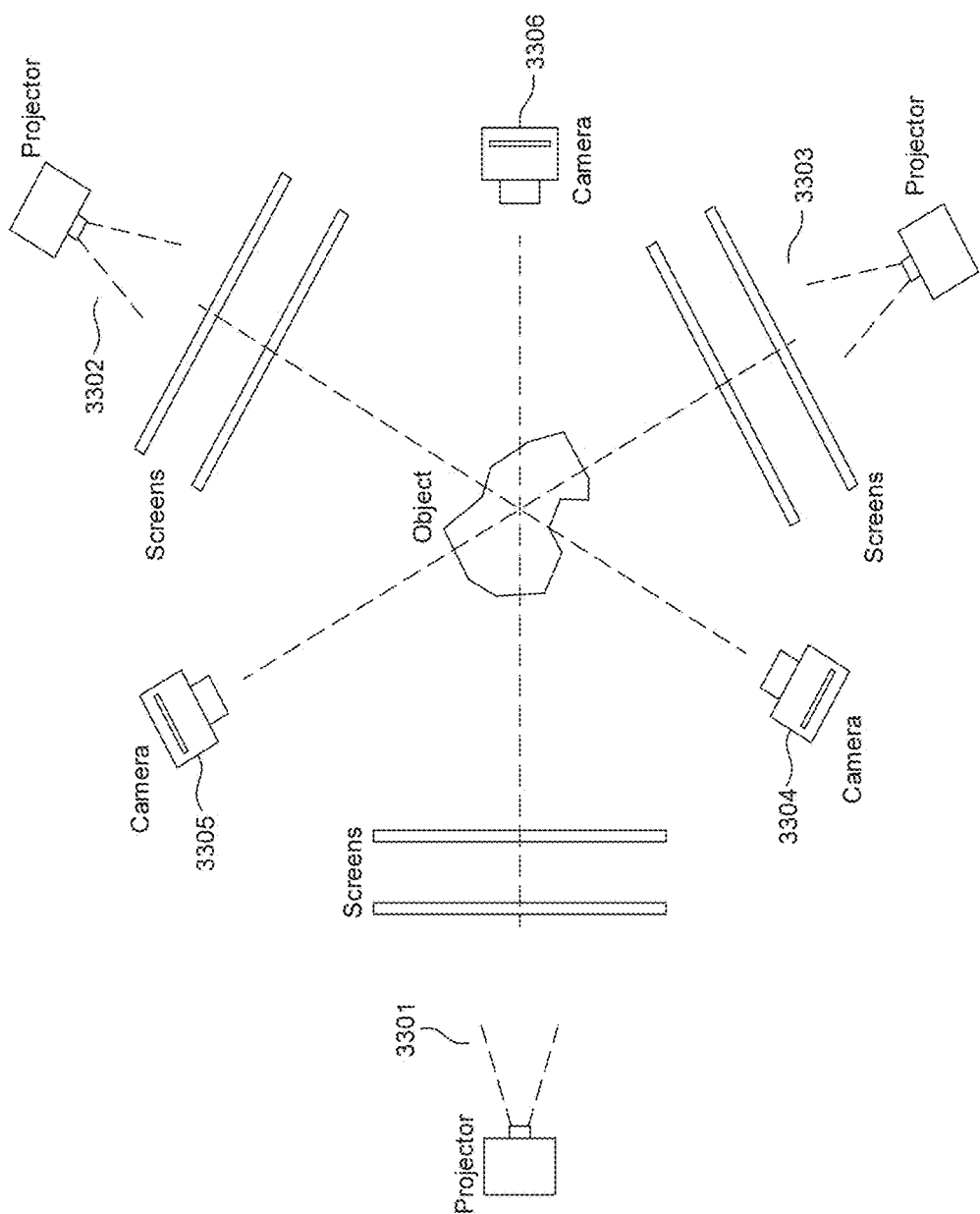

FIGS. 22 and 23 are schematic views of other embodiments, which include additional cameras and/or projectors and E-glass layers, in an effort to improve efficiency of image capture, and to lower the number of wasted pixels.

In FIG. 22, there are two sets 3201 and 3202 of projectors and E-glass layers, and two cameras 3203 and 3204. In this configuration, there are two setups for ray triangulation: a first triangulation setup comprising projector and E-glass layers 3201 and camera 3203; and a second triangulation setup comprising projector and E-glass layers 3202 and camera 3204. In addition, there are two setups for silhouette extraction: a first silhouette setup comprising projector and E-glass layers 3201 and camera 3204; and a second silhouette setup comprising projector and E-glass layers 3202 and camera 3203.

In FIG. 23, there are three sets 3301, 3302 and 3303 of projectors and E-glass layers, and three cameras 3304, 3305 and 3306. In this configuration, there are three setups for ray triangulation, and each setup has multiple cameras: a first triangulation setup comprising projector and E-glass layers 3301 and cameras 3304 and 3305; a second triangulation setup comprising projector and E-glass layers 3302 and cameras 3305 and 3306; and a third triangulation setup comprising projector and E-glass layers 3303 and cameras 3304 and 3306. In addition, there are three setups for silhouette extraction: a first silhouette setup comprising projector and E-glass layers 3301 and camera 3306; a second silhouette setup comprising projector and E-glass layers 3302 and camera 3304; and a third silhouette setup comprising projector and E-glass layers 3303 and camera 3305.

These embodiments exhibit increased efficiencies and fewer wasted pixels.

In addition, these embodiments illustrate that the principle can be extended to a more general case where the duality of the configurations (use the E-glass layers to the left or to the right of the camera for triangulation and use the screens in front of the camera for silhouette extraction) is maintained. For instance, a system may have four or more dual configurations.

One advantage of arrangements described herein is that, if the background patterns are different from the reflected patterns, the same images can be used to extract silhouettes (and therefore the object's visual hull) as well as the light paths for triangulation. When the background patterns are on, each image contains both the coded reflected pattern (visible on the specular surface of the object, which reflects the screens into the camera) and the background pattern (visible where the camera rays do not intersect the object).

Those of ordinary skill will recognize that in each set of camera-projector-E-glass layers, because of the optical interchangeability of the camera and the projector, the positions of the camera and the projector may be exchanged.

Those of ordinary skill will further recognize that a projector and its corresponding E-glass layers may be replaced by multiple LCD display layers, as described in the afore-mentioned U.S. Patent Application Publication No. 2016/0076878.

Another Embodiment

One aspect of the present embodiment concerns the recovery of surface shape of glossy objects such as objects whose reflection characteristics include both a specular component and a diffuse component. It is to be understood that the embodiments described herein, and individual features and aspects thereof, may be combined each with the other such as in furtherance of the principles explained herein.

Figure 26:
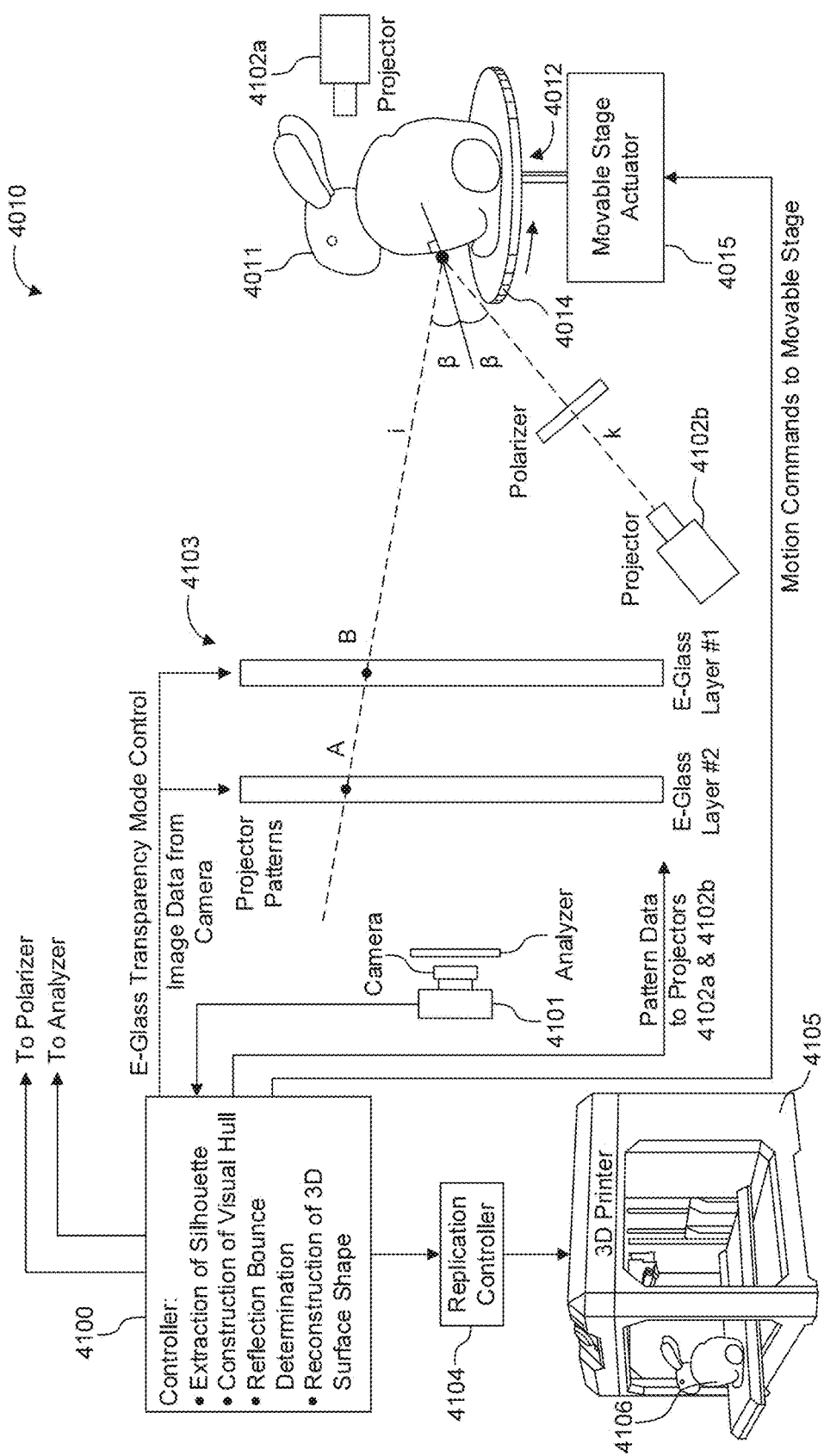
FIG. 26 is a view showing one example embodiment of a system for recovery of surface shape of glossy objects.

FIG. 26 is a view showing one example embodiment of a system for recovery of surface shape of glossy objects such as objects whose reflection characteristics include both a specular component and a diffuse component, in the form of a replication system 4010 in which surface shape of objects is recovered for replication, for example, for 3D replication of the object physically (such as with a 3D printer) or representationally (as with a graphics display).

While FIG. 26 depicts a replication environment, it should be understood that this is simply an example environment in which the disclosure herein may be practiced, and that other environments or embodiments are of course possible. For example, recovery of surface shape can also be used in the context of automated inspection, robotics, gripping and positioning, machine vision, quality control, defect detection, image retrieval, shape modelling and scene reconstruction, security and so forth, among many others.

As shown in FIG. 26, an object 4011 is positioned at an inspection station 4012, which in this embodiment is the surface of a movable stage 4014 by which the object can be moved into varying perspectives. In this embodiment, the movable stage is movable by rotation about a vertical axis, and in other embodiments the movable stage may be a 3-axis positioning table. Object 4011 is typically a specular object or a mirror-like object, or other similar object with a glossy or highly glossy surface, exhibiting reflection characteristics that include both specular and diffuse components. Movable stage 4014 is moved under control of actuator 4015, via motion commands issued by controller 4100 for reconstruction of surface shape.

Controller 4100 is configured to reconstruct surface shape of objects at inspection station 4012, based on commands issued to camera 4101, commands issued to projectors 4102a and 4102b, commands issued to transparency-controllable layers 4103, and commands issued to actuator 4015 for movable stage 4014; and based on image data received from an image capture system which in this embodiment includes digital camera 4101. Based on the reconstruction obtained by controller 4100, controller 4100 controls replication controller 4104 so as to obtain a 3D replication of the object. In this embodiment, 3D replication of the object is obtained physically via 3D printer 4105, to produce replicated object 4106. In other embodiments, 3D replication of the object may be obtained representationally via a graphics display. More details of controller 4100 are provided below, such as in connection with FIG. 27.

FIG. 26 further depicts plural transparency-controllable layers 4103, positioned in spaced-apart relation relative to each other. In the FIG. 26 embodiment, there are two spaced-apart layers and in other embodiments there may be three or more spaced-apart layers. Under control from controller 4100, each transparency controllable layer is independently switchable between a transparent mode in which the layer is transparent, and a diffuse mode in which the layer diffuses light.

For the plural transparency-controllable layers 4103, this embodiment uses multiple layers of E-glass. As used herein, the term "E-glass" refers to electronically switchable glass which is switchable between a transparent mode in which the glass is completely transparent, and a diffuse mode in which the glass assumes a frosted appearance. Images can be projected or formed on the frosted appearance of the diffuse mode, and this property of E-glass is used to advantage in the configuration described herein. E-glass is sometimes referred to as "smart glass", and the diffuse mode is sometimes referred to as opaque or translucent. One common use of E-glass is in the field of selectable privacy, such as in a conference room where the windows can be switched between an open transparent state and a private diffuse state.

E-glass is typically formed of a polymer dispersed liquid crystal (PDLC) or polymer stabilized cholesteric texture (PSCT) film sandwiched between two layers of glass with two layers of conductive interlayers, so as to allow control of the E-glass between the transparent mode and the diffuse mode. Other technologies for fabricating E-glass include suspended particle devices (SPDs) and electrochromic devices. For the E-glass used in this embodiment, the change-over from transparent mode to diffuse mode, and vice-versa, takes less than 10 seconds.

As used herein, E-glass refers to any of these or similar technologies, in which the transparency of a layer is controllable electrically between a fully transparent mode and a fully diffuse mode.

The E-glass layers are positioned in spaced-apart relation to each other, such that by using the relative positionings of the E-glass layers to camera 4101 and projectors 4102a and 4102b, ray-tracing and/or triangulation techniques allow reconstruction of the 3D surface shape of the object 4011 under inspection. The relative positionings are predetermined through calibration. More details on the relative positionings of E-glass layers 4103, relative to other elements such as camera 4101 and projectors 4102a and 4102b, and calibration, are described in the afore-mentioned U.S. application Ser. No. 15/072,116, which is incorporated by reference.

In addition to the plural E-glass layers 4103, the FIG. 26 embodiment also includes a pair of polarizers, one configured to polarize light and the other configured to analyze polarized light. In the FIG. 26 embodiment, the first polarizer is positioned between projector 4102b and the object, so as to polarize light illuminated toward the object. The second polarizer is positioned in front of camera 4101 so as to permit analysis of the polarization state of light reflected from the object.

More particularly, with respect to the pair of polarizers in the FIG. 26 embodiment, one is used as a polarizer to polarize the incident light before it reaches the object; and the other is used as an analyzer to analyze the light reflected off the object. Either the analyzer or the polarizer can rotate, or both can rotate.

In the FIG. 26 embodiment, the pair of polarizers are usable to separate a diffuse component of reflection from a specular component of reflection. Each surface point on highly glossy or heterogeneous objects will typically reflect in both modes, and separation of each component facilitates accurate surface reconstruction for such objects. It should be understood that in some embodiments, where mainly specular reflections are expected, with little or no diffuse reflection, the polarizers may be omitted, and processing to separate diffuse and specular components of reflection may likewise be omitted.

In embodiments which separate diffuse and specular components of reflection, separation of these components is described in the afore-mentioned U.S. application Ser. No. 62/309,897, incorporated by reference herein.

Briefly, as explained in greater detail in said application Ser. No. 62/309,897, to obtain a diffuse component of reflection from the object 4011 at the inspection station, all E-glass layers are set to transparent mode, and projector 4102b projects the patterns directly onto the surface of the diffuse object. The state of polarization is varied, and camera 4101 captures images of the patterns as projected onto the object. The nature and intensity of the captured images varies in accordance with the variation in the state of polarization, which allows for separation of diffuse and specular components of reflection. The diffuse component allows the depth for each pixel of the object at the inspection station to be calculated based on traditional triangulation methodology.

To obtain a specular component of reflection, each different layer of E-glass is in turn set to diffuse mode with all others set to transparent mode, and projector 4102b projects patterns so as to illuminate the object by the patterns projected onto the diffuse mode layer. The state of polarization is varied, and images are captured of the structured light pattern as reflected by the glossy surface of the object. The nature and intensity of the captured images varies in accordance with the variation in the state of polarization, which allows for separation of diffuse and specular components of reflection. By projecting multiple different patterns, such as multiple different Gray code patterns, and by sequencing through each E-glass layer for each pattern, the 3D shape of the entirety of the visible surface of the object can be reconstructed by analysis of the specular component of the captured images of the distorted reflections of the patterns caused by the surface of the object.

The position of camera and the E-glass layers are determined during a calibration process and stored for later computations. The correspondences between camera pixels and points on E-glass layers are established by projecting coded patterns, different from each other, such that each pixel at the layer is uniquely identifiable. The patterns may, for example, be patterns of horizontal and vertical stripe patterns, such as binary patterns, each pattern in the sequence having a spatial frequency that differs from others of the patterns in the sequence, such as Gray code patterns.

Each of projectors 4102a and 4102b in this embodiment has an autofocus function, by which patterns projected by the projector are automatically focused onto the surface where the patterns are projected. This provides an advantageous benefit: because the transparency mode of the E-glass layers 4103 is changed between diffuse mode and transparent mode, the surface onto which patterns are projected is likewise changed. For example, in a circumstance when an innermost E-glass layer is in the diffuse mode, patterns are projected onto the innermost layer. The focus distance in this circumstance differs from a circumstance when the innermost E-glass layer is in the transparent mode and the outermost layer is in the diffuse mode, where patterns are projected onto the outermost layer. Both of these focus distances are different from the circumstance when all E-glass layers are in the transparent mode, the object is diffuse, and patterns are projected directly onto the surface of the diffuse object. The autofocus function of each projector 4102a and 4102b responds automatically to these changes in focus distance, ensuring that the projected patterns remain in focus regardless of the surface onto which they are projected.

As depicted in FIG. 26, controller 4100 provides commands to the pair of polarizers (i.e., to the polarizer and to the analyzer), mode commands (for example, diffuse vs. transparent) to the E-glass layers, pattern commands (such as Gray code patterns) to the projector, motion commands to the movable stage, and replication commands to the replication controller. Controller 4100 receives image data from the image capture system, and uses the image data for functionality which includes functionality to extract a silhouette of the object, functionality to construct a visual hull for the object, functionality to determine the number of reflections encountered by a light ray reflected by the surface of the object (sometimes referred to herein as the number of "bounces"), and functionality to reconstruct the 3D surface shape of the object based on the captured image data.

Figure 27:
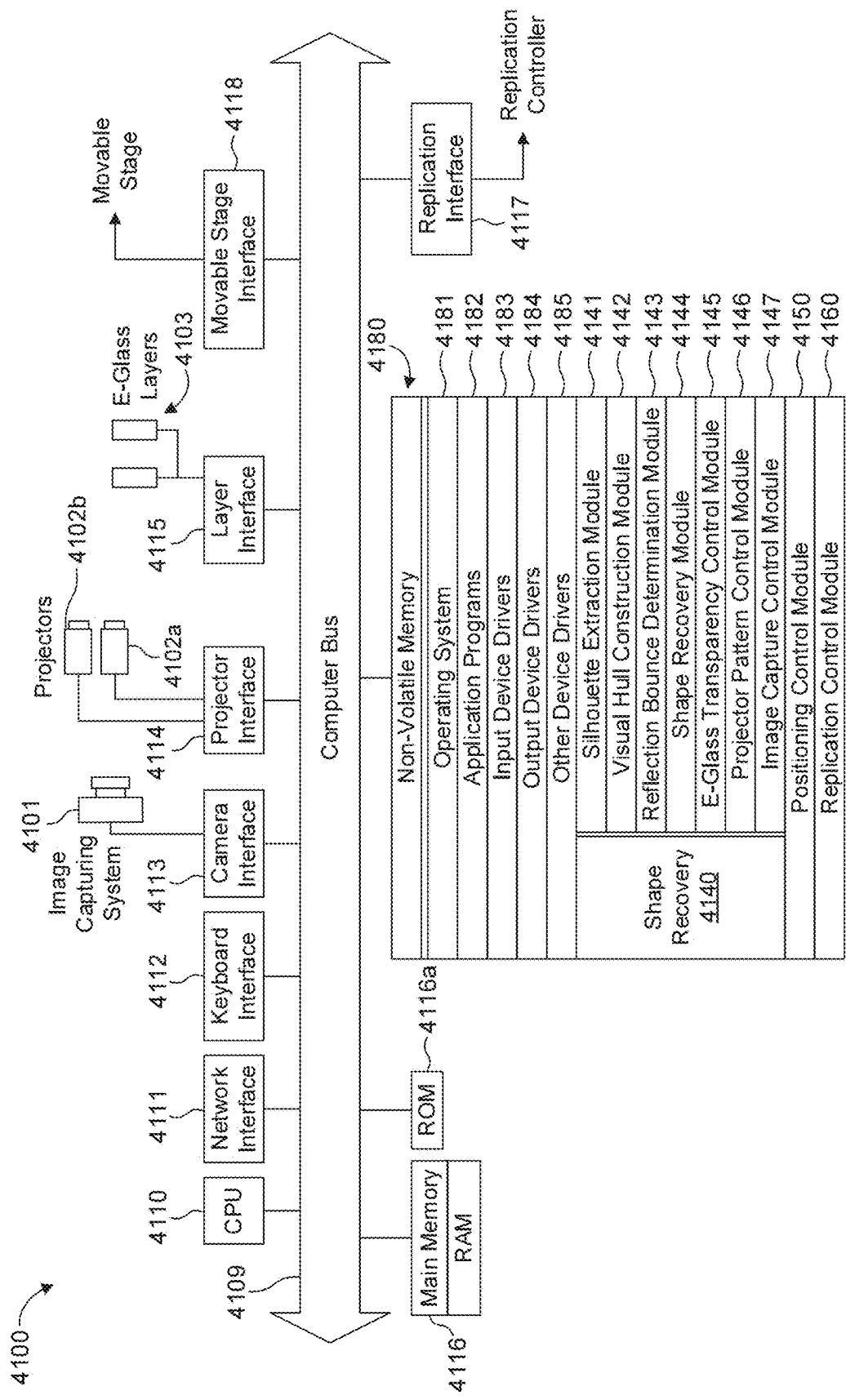
FIG. 27 is a view for explaining one embodiment of the architecture of the controller shown in FIG. 26.

FIG. 27 is a view for explaining one embodiment of the architecture of controller 100 for shape reconstruction of objects at inspection station 4012.

As shown in FIG. 27, controller 4100 includes CPU 4110 which interfaces with computer bus 4109. Also interfacing with computer bus 4109 are network interface 4111, keyboard interface 4112, camera interface 4113 which interfaces to the image capture system including camera 4101, projector interface 4114 which interfaces to projectors 4102a and 4102b, E-glass interface 4115 which interfaces to the plural E-glass layers 4103, movable stage interface 4118 which interfaces to actuator 4015 of movable stage 4014, RAM 4116 for use as a main run-time transient memory, ROM 4116a, replication interface 4117 for interface to replication controller 4104, and non-volatile memory 4180 (e.g., a hard disk or other nonvolatile and non-transitory storage medium).

RAM 4116 interfaces with computer bus 4109 so as to provide information stored in RAM 4116 to CPU 4110 during execution of the instructions in software programs, such as an operating system, application programs, image processing modules, and device drivers. More specifically, CPU 4110 first loads computer-executable process steps from non-volatile memory 4180 or another storage device into a region of RAM 4116. CPU 4110 can then execute the stored process steps from RAM 4116 in order to execute the loaded computer-executable process steps. Data also can be stored in RAM 4116 so that the data can be accessed by CPU 4110 during the execution of the computer-executable software programs, to the extent that such software programs have a need to access and/or modify the data.

As also shown in FIG. 27, non-volatile memory 4180 contains computer-executable process steps for operating system 4181 and for application programs 4182, such as graphic image management programs. Non-volatile memory 4180 also contains computer-executable process steps for device drivers for software interface to devices, such as input device drivers 4183, output device drivers 4184, and other device drivers 4185.

Non-volatile memory 4180 also stores a shape recovery module 4140, a positioning control module 4150, and replication control module 4160. These modules, i.e., the shape recovery module 4140, the positioning control module 4150, and the replication control module 4160, are comprised of computer-executable process steps for 3D shape reconstruction of the surface shape of an object, for repositioning of the object on movable stage 4014, and for control of replication controller 4104 for 3D replication of the object.

As shown in FIG. 27, shape recovery module 4140 generally comprises silhouette extraction module 4141 for extracting a silhouette of a foreground object positioned against a background, a visual hull construction module 4142 for constructing a visual hull using the extracted silhouette, a reflection bounce determination module 4143 for determining the number of bounces encountered at the surface of the object by a light ray, and shape recovery module 4144 for recovery of surface shape of the object under inspection. Shape recovery module 4140 also generally comprises an E-glass transparency control module 4145 for control over the transparency modes of each of the plural E-glass layers 4103, a projector pattern control module 4146 which stores one or more background patterns together with plural sequences of patterned light patterns and which controls projection of the plural sequences of background patterns and patterned light patterns by projectors 4102a and 4102b, as well as image capture control module 4147 for control of image capture by image capturing system 4102.

Unshown in FIG. 27 is a further interface to the pair of polarizers, as well as a further module, also stored in non-volatile memory 4180, for control over the pair of polarizers, so as to rotate the polarizer and/or the analyzer and alter the state of polarization, for those embodiments that separate diffuse and specular components of reflection.

Positioning control module 4150 controls repositioning of the object on movable stage 4014, and replication control module 4160 controls replication controller 4104 for 3D replication of the object.

With respect to movable stage 4014, controller 4100 issues positioning commands to reposition movable stage 4014 and the object thereon. At each position, by control over the E-glass layers and pattern projection, multiple silhouettes of the foreground object may be extracted. The extracted silhouettes may be used to construct a visual hull of the object, and the visual hull may be used to determine the number of bounces for a reflected light ray. Repositioning of the object exposes other areas of its surface to image capture and illumination by the layers, and thereby permits 3D shape reconstruction with as much of the entirety of the object as desired.

The computer-executable process steps for these modules may be configured as part of operating system 4181, as part of an output device driver in output device drivers 4184, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Shape Reconstruction in the Presence of Multi-Reflections

In a captured image of a specular object using the system shown above, or when working with the separated-out specular component of a captured image, there are three (3) different categories of ray paths:

0-bounce (dashed line 4025 in FIG. 25): light rays (corresponding to projector pixels) that do not hit the target object.

1-bounce or direct (dashed lines 4021 and 4022 in FIG. 25): rays that hit the object once and then bounce to the screens.

Figure 25:
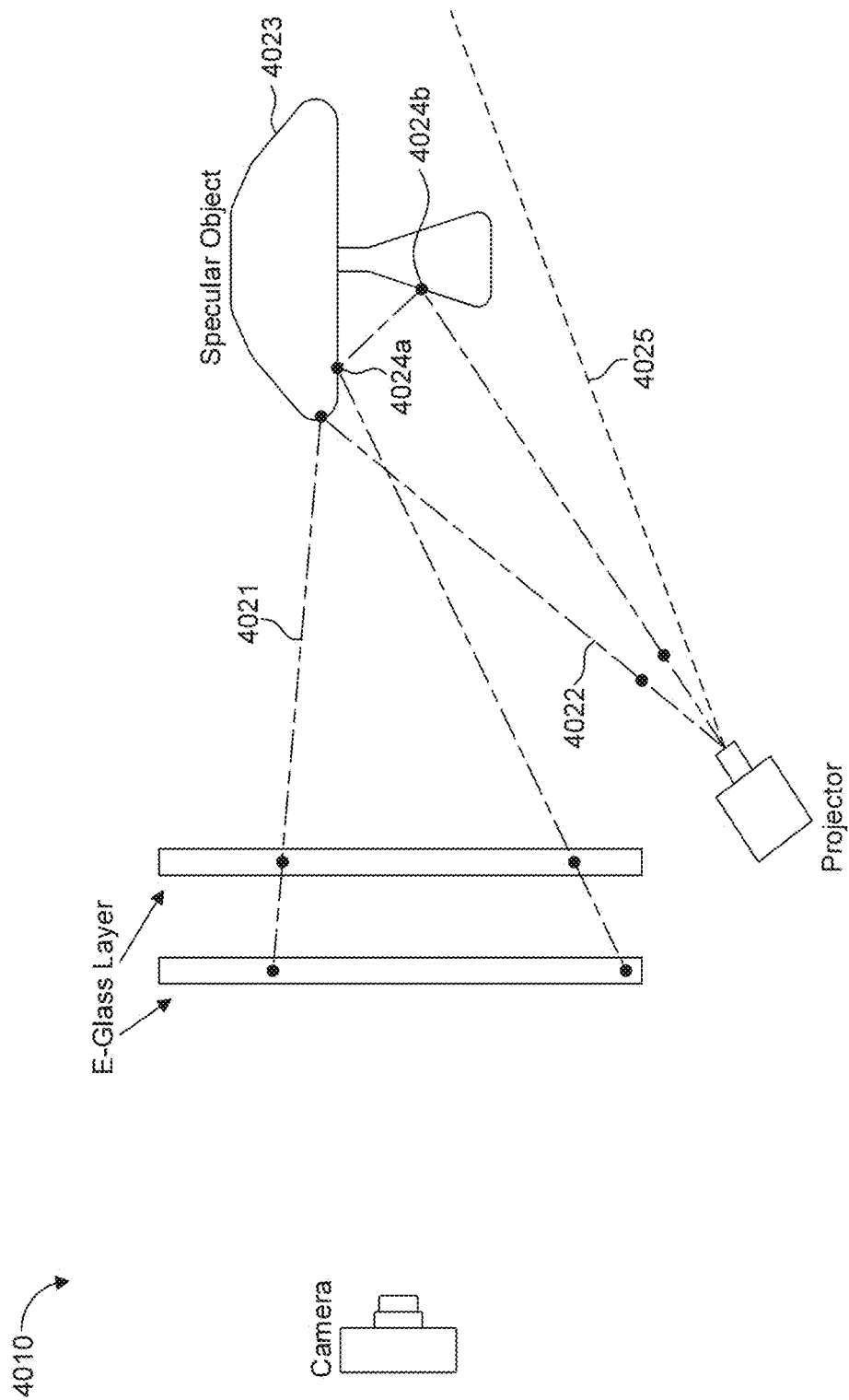
FIG. 25 is a view showing one-bounce direct reflections and multi-bounce indirect reflections.

N-bounce or indirect where N is greater than or equal to two (2) (dashed line corresponding to reflection points 4024a and 4024b in FIG. 25): rays that hit the object multiple times such as due to concave regions of the object, and then bounce to the screens.

The system described herein utilizes shape reconstruction techniques which distinguish between these three categories. Principally, the technique is divided in two tasks: (1) Reconstruct the visual hull of the object; and (2) Starting from the visual hull, measure the shape by triangulating only the direct paths (i.e., the 1-bounce paths).

The first task is achieved by extracting the silhouette of the object at each view and then combining them together using the angle of rotation of each pose/camera. Extraction of the silhouette, and construction of the visual hull, is described above, which uses shadows from projector 4102a onto the E-glass layers.

Figure 28:
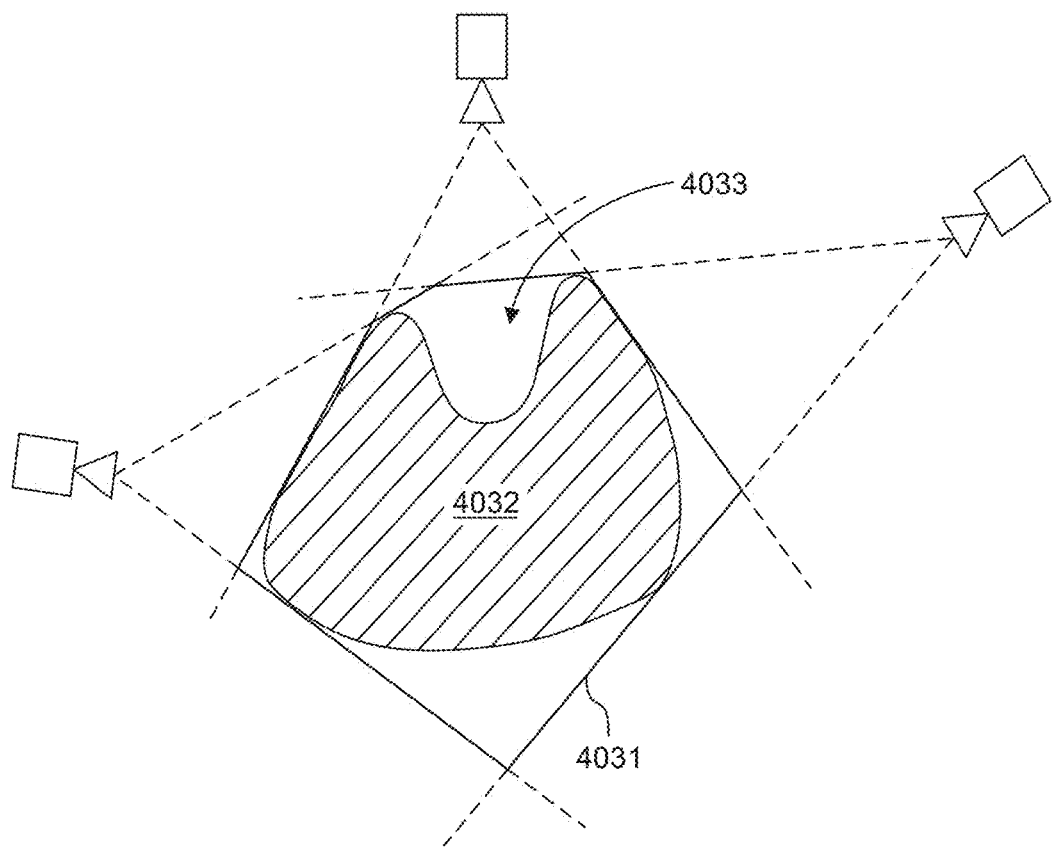
FIG. 28 shows an example of 2D visual hull for an object that includes concave areas.

FIG. 28 shows an example of a 2D visual hull 4031 for an object 4032 that includes concave areas such as area 4033. The visual hull is estimated by combining silhouettes from different viewpoints. As shown in FIG. 28, concave regions cannot be properly reconstructed using only the visual hull.

Using the estimated visual hull, the second task is performed, so as to distinguish the 1-bounce paths and to triangulate using only the 1-bounce paths.

One challenge of the second task is to distinguish direct reflections (1-bounce paths) from multi-reflections (N-bounce paths). The disclosure herein capitalizes on three properties of light ray reflection in the system.

Property #1: In a direct reflection (1-bounce paths), the screen ray (given by the location of the reflections on the screens) and the light ray (given by the projector pixel with the code read from the screens) are coplanar; in other words they lie on the epipolar plane.

Property #2: A generic multi-bounce path (N-bounce paths) usually does not keep the rays coplanar. This has been demonstrated by M. O'Toole et al., cited above, and acts as a computationally-simple first step in determining whether to exclude a reflection from the reconstruction of surface shape.

Property #3: In the rare event that the rays of a multi-bounce path are coplanar, they probably meet outside the visual hull. It should be understood that the rays of all multi-bounce paths usually meet outside the visual hull, regardless of whether the rays are or are not coplanar. On the other hand, direct reflections (1-bounce paths) will lie within the visual hull.

Figure 29:
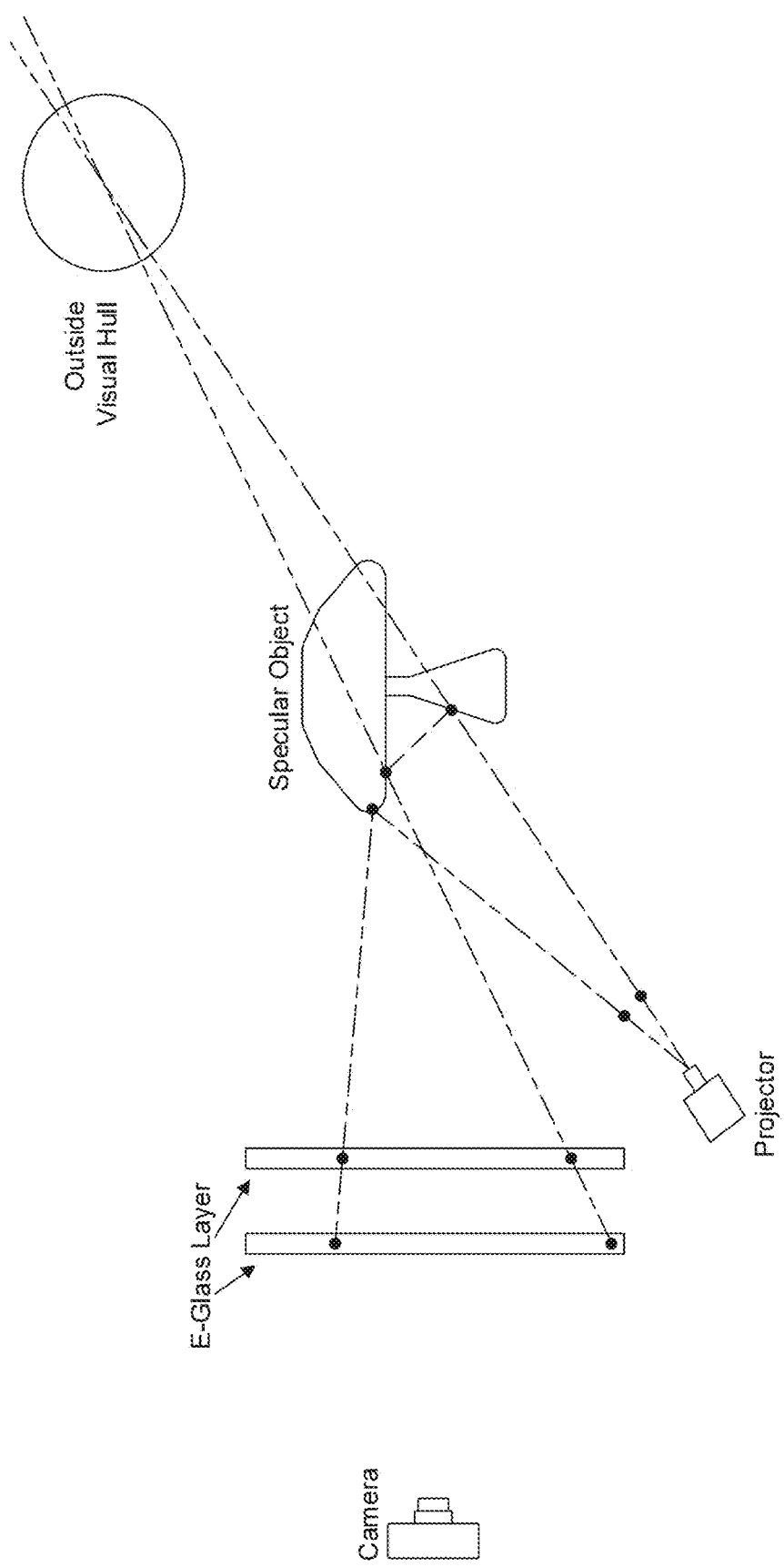
FIG. 29 is an illustration of a multi-bounce path, demonstrating that for a multi-bounce situation, the light rays meet outside the visual-hull of the object.

FIG. 29 is an illustration of a multi-bounce path, demonstrating that for a multi-bounce situation, the light rays meet outside the visual-hull of the object. This is consistent with property #3.

Thus, according to the disclosure herein, direct paths are distinguished from multi-reflection paths based at least on whether the rays do or do not meet inside the visual hull. Once the direct paths are distinguished from the multi-reflection paths, ray triangulation is used only on the direct paths, while excluding the multi-reflection paths, so as to obtain the concave areas missing from the reconstruction of the visual hull.

Figure 30:
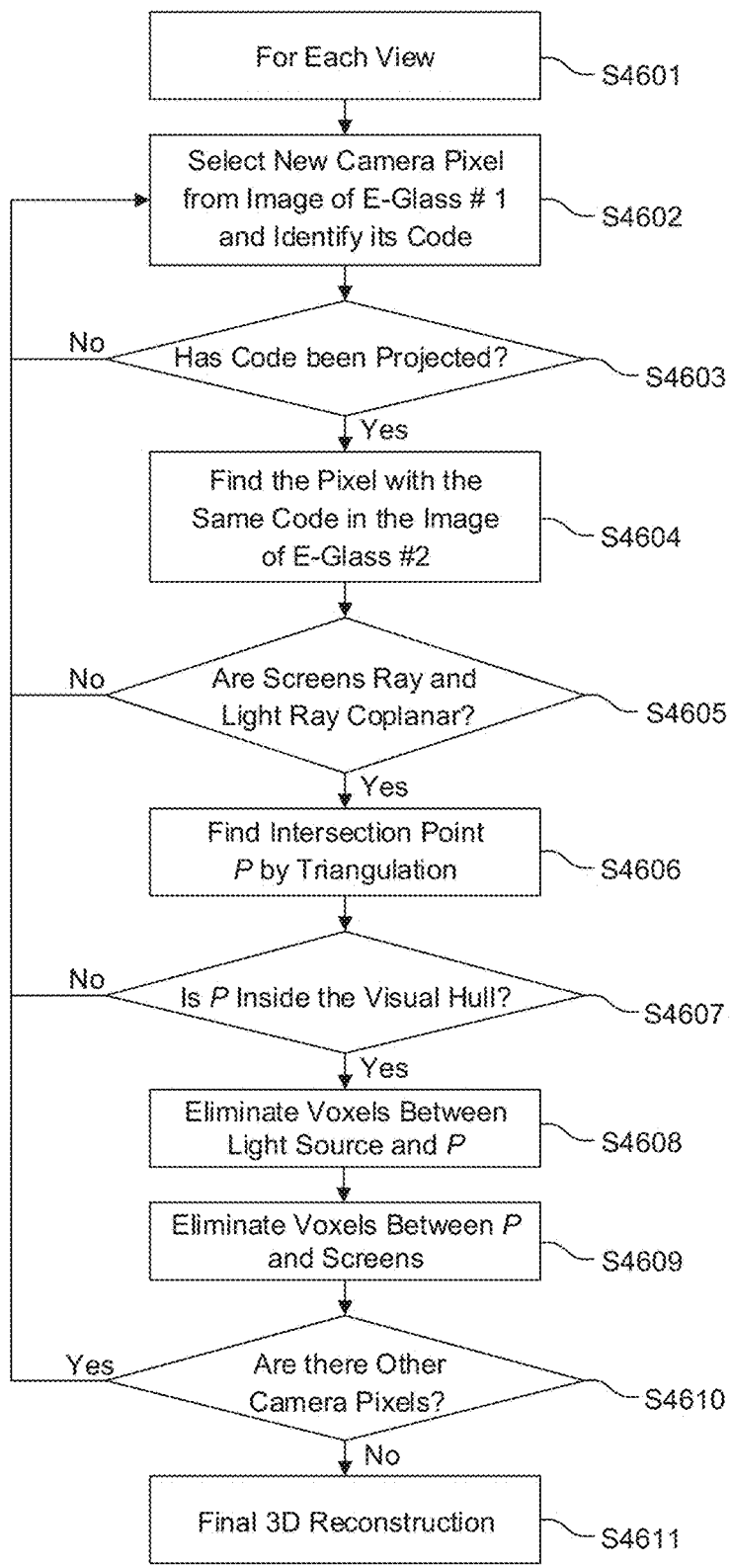
FIG. 30 is a flow diagram for explaining shape reconstruction according to the disclosure herein.

FIG. 30 is a flow diagram for explaining shape reconstruction according to the disclosure herein. The FIG. 30 flow diagram illustrates a 3D shape reconstruction technique herein termed "voxel carving", which in this disclosure refers to a technique whereby the voxels of the object's visual hull are carved away based on exclusion of multi-reflection paths, so as to reveal concave areas of the object that were not visible in the visual hull. In this embodiment, the process steps shown in FIG. 30 are executed by controller 4100.

In connection with the steps shown in FIG. 30, controller 4100 operates shape recovery module 4140 so as to collect images of an object at inspection station 4012 under various patterns projected onto E-glass layers 4103, from multiple different viewpoints by repositionings of movable stage 4014. More specifically, E-glass transparency control 4145 independently controls transparency of each of E-glass layers 4103, while projector pattern control module 4146 controls projectors 4102a and 4102b to project multiple different patterns onto the object. At the projection of a background pattern, image capture control module 4147 controls camera 4101 to capture an image of the object as silhouetted by the background, for use by silhouette extraction module 4141 for extracting a silhouette of the object positioned against the projected background. Based on the silhouettes extracted at the multiple positionings of the object, visual hull construction module 4142 constructs a visual hull of the object. Extraction of the silhouette, and construction of the visual hull, is described above. It is this visual hull that is subjected to the voxel carving described in FIG. 30.

Likewise, and in connection with the steps shown in FIG. 30, at the projection of patterned light having coded light patterns, and in conjunction with transparency control of E-glass layers 4103 by E-glass transparency control 4145, image capture control module 4147 controls camera 4102b to capture an image of the patterned light as reflected by the object from projector 4102b onto the E-glass layers. The patterned light codes the direction of each ray of light. Using images of the reflected light patterns, as captured by camera 4101, the patterns are decoded to determine ray direction, and the decoded ray directions are used by reflection bounce determination module 4143, so as to differentiate between direct bounce rays and multi-bounce rays, with the multi-bounce rays thereafter being excluded, and the direct bounce rays thereafter being used by shape recovery module 4144 in recovery to the 3D shape of the object.

In embodiments where there is separation of diffuse and specular components of reflection, the unshown polarization control module controls the polarization state of the polarizer and the analyzer, so as to vary the polarization of light and permit separation of diffuse and specular components of reflection.

Referring to the voxel carving shown in the flow diagram of FIG. 30, from a volume of voxels (such as a cube containing the object), voxels are removed by using the extracted silhouettes at each rotation to remove voxels that are not part of the silhouette cone. The remaining voxels formed the visual hull of the target object.

Thereafter, triangulation is performed using direct bounce rays, to the exclusion of multi-bounce rays, so as to eliminate voxels from the visual hull corresponding to concave regions of the object.

More specifically, for each different view (step S4601), a new camera pixel in the view's image of E-glass layer #1 is selected and its code is identified (step S4602). Step S4603 determines whether a code has been projected for the selected pixel. A coded projection might not be visible in situations such as those shown by dotted line 4025 in FIG. 25. If a coded projection onto a screen, flow returns to step S4602 for selection of another pixel in the image.

If a code has been projected for the selected pixel onto E-glass layer #1, then flow advances to step S4604 to find a pixel with the same code in the image of E-glass layer #2. Once a pixel with the same code is found in the images for both of E-glass layers #1 and #2, then flow advances to step S4605 to determine whether the screen ray and the light ray are coplanar, i.e., whether the screen ray and the light ray are epipolar. The direction of the screen ray is determined by its pixel's location in the image, and the direction of the light ray is determined by decoding of the coded patterned light. If the screen ray and the light ray are not coplanar, then the reflection corresponds to a multi-bounce reflection, and triangulation is not performed using the selected pixel's reflection. Instead, flow returns to step S4602 to select another pixel.

If the camera ray and the light ray are coplanar, flow advances to step S4606 to find the point P representing the intersection between the screen ray and the light ray. Step S4607 determines whether the intersection point P lies inside of the visual hull. If the intersection point P does not lie inside the visual hull, then the reflection corresponds to a multi-bounce reflection, and triangulation is not performed using the selected pixel's reflection. Instead, flow returns to step S4602 to select another pixel.

If the intersection point P lies inside of the visual hull, then the selected pixel's reflection corresponds to a direct-bounce reflection, and the reflection is thus eligible for use in 3D surface reconstruction. Flow thus advances to steps S4608 and S4609 where voxel carving is performed. Specifically, step S4608 eliminates all voxels between the light source and the intersection point P, and step S4609 eliminates all voxels between intersection point P and E-glass screens 4103. Flow then advances to step S4610 to determine whether there are any further pixels in the camera image, or any further views for processing.

When all pixels and views have been processed, voxel carving is complete, and flow terminates at step S4611. In step S4611, the remaining voxels not carved away correspond to the 3D surface shape of the object.

Other Embodiments

As shown at dotted line 4025 in FIG. 25, a screen reflection might not be visible to all pixels in captured images of the object. In one sense, these pixels are "wasted" since they provide little information on the 3D surface shape of the object. Moreover, multiple positionings by movable stage 4014 are needed to capture images of the entirety of the object, such that efficiency is perhaps not as high as it could be.

Figure 31:
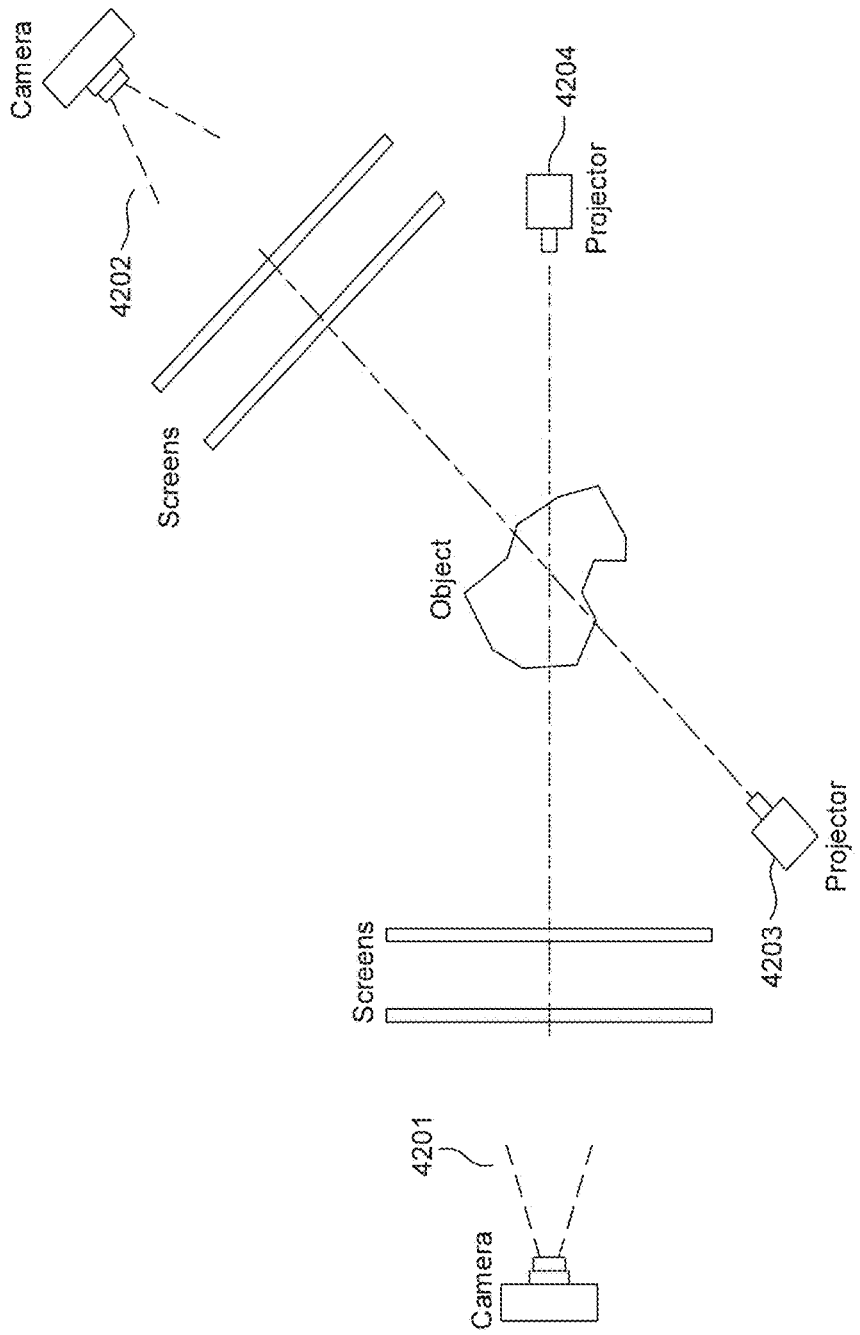
FIGS. 31 and 32 are schematic views of other embodiments which include additional cameras and/or projectors and E-glass layers.
Figure 32:
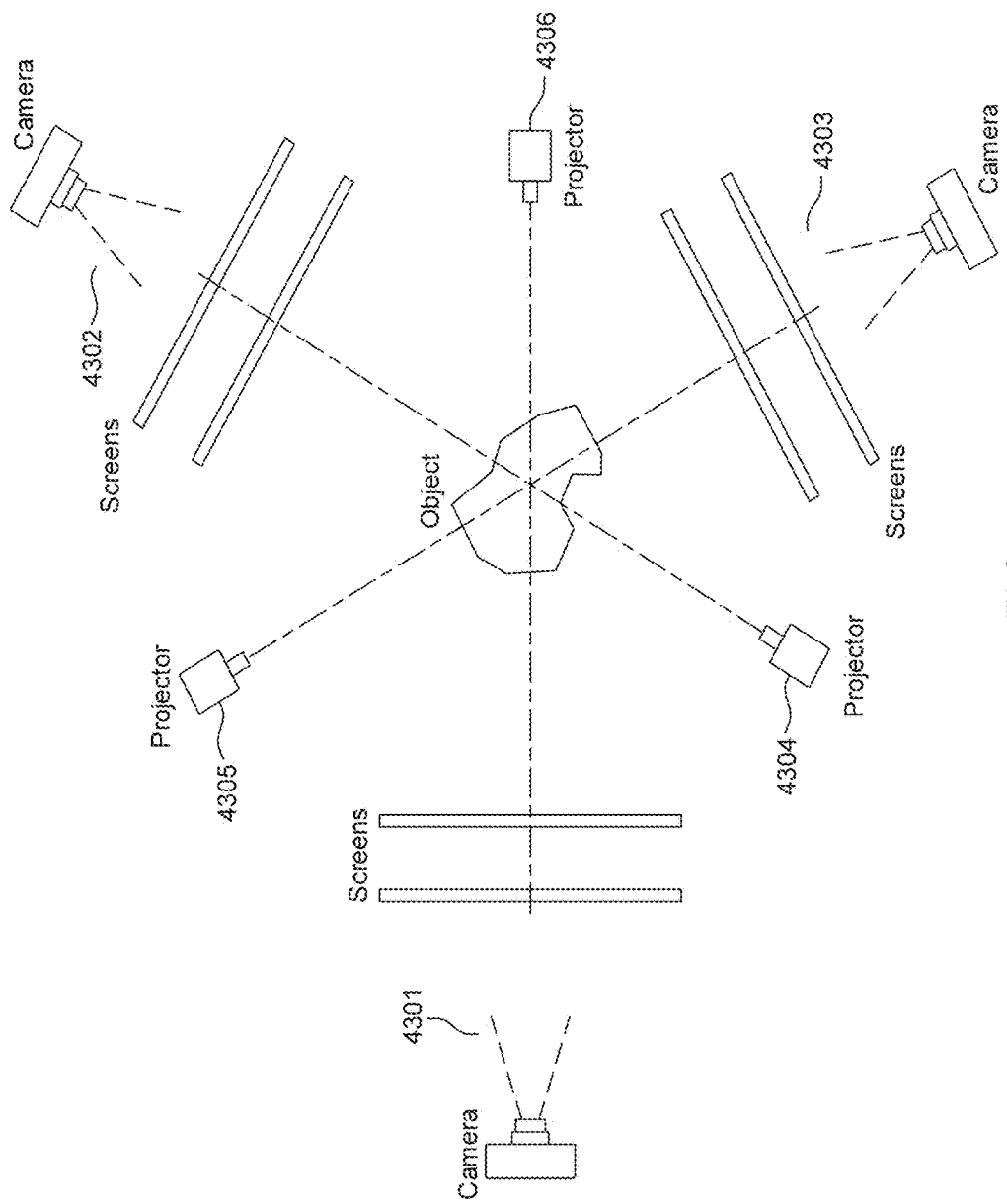

FIGS. 31 and 32 are schematic views of other embodiments, which include additional cameras and/or projectors and E-glass layers, in an effort to improve efficiency of image capture, and to lower the number of wasted pixels.

In FIG. 31, there are two sets 4201 and 4202 of cameras and E-glass layers, and two projectors 4203 and 4204. In this configuration, there are two setups for ray triangulation: a first triangulation setup comprising camera and E-glass layers 4201 and projector 4203; and a second triangulation setup comprising camera and E-glass layers 4202 and projector 4204. In addition, there are two setups for silhouette extraction: a first silhouette setup comprising camera and E-glass layers 4201 and projector 4204; and a second silhouette setup comprising camera and E-glass layers 4202 and projector 4203.

In FIG. 32, there are three sets 4301, 4302 and 4303 of projectors and E-glass layers, and three cameras 4304, 4305 and 4306. In this configuration, there are three setups for ray triangulation, and each setup has multiple projector: a first triangulation setup comprising camera and E-glass layers 4301 and projectors 4304 and 4305; a second triangulation setup comprising camera and E-glass layers 4302 and projectors 4305 and 4306; and a third triangulation setup comprising camera and E-glass layers 4303 and projectors 4304 and 4306. In addition, there are three setups for silhouette extraction: a first silhouette setup comprising camera and E-glass layers 4301 and projector 4306; a second silhouette setup comprising camera and E-glass layers 4302 and projector 4304; and a third silhouette setup comprising camera and E-glass layers 4303 and projector 4305.

These embodiments exhibit increased efficiencies and fewer wasted pixels.

In addition, these embodiments illustrate that the principle can be extended to a more general case where the duality of the configurations (use the E-glass layers to the left or to the right of the camera for triangulation and use the screens in front of the camera for silhouette extraction) is maintained. For instance, a system may have four or more dual configurations.

One advantage of arrangements described herein is that, if the background patterns are different from the reflected patterns, the same images can be used to extract silhouettes (and therefore the object's visual hull) as well as the light paths for triangulation. When the background patterns are on, each image contains both the coded reflected pattern (visible on the specular surface of the object, which reflects the screens into the camera) and the background pattern (visible where the camera rays do not intersect the object).

Those of ordinary skill will recognize that in each set of camera-projector-E-glass layers, because of the optical interchangeability of the camera and the projector, the positions of the camera and the projector may be exchanged.

Those of ordinary skill will further recognize that a projector and its corresponding E-glass layers may be replaced by multiple LCD display layers, as described in the afore-mentioned U.S. Patent Application Publication No. 2016/0076878.

Computer Implementation

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. An apparatus that extracts a silhouette of a foreground object placed between a camera and a background, the apparatus comprising:
   one or more processors; and
   one or more memories storing instructions, which when executed by the one or more processors, cause the apparatus to function as:
   a control unit configured to control projection of background patterns by a projector, the projector positioned and configured to project the background patterns toward a screen so as to illuminate the background with patterned light and
   an extraction unit configured to extract a silhouette of the foreground object based on images of the foreground object captured by the camera,
   wherein the extraction unit is configured to extract the silhouette of the foreground object based on a reflection characteristic or transparency of the foreground object.

2. An apparatus that extracts a silhouette of a foreground object placed between a camera and a background, wherein the apparatus comprises:
   first and second transparency-controllable layers, the first and second layers being positioned in spaced-apart relation relative to each other, wherein both of the first and second layers are controllably switchable between a transparent mode in which the layer is transparent, and a diffuse mode in which the layer diffuses light;
   a projector positioned and configured to project background patterns toward the first and second layers so as to illuminate the background with patterned light; and
   a controller configured to control transparency of the first and second layers and to control projection of background patterns by the projector, and configured to extract a silhouette of the foreground object based on images of the foreground object captured by the camera,
   wherein the controller is configured to set the background patterns based on transparency of the first and second transparency-controllable layers.

3. The apparatus according to claim 2, wherein the foreground object is placed on a rotation stage and a silhouette is extracted at each rotation.

4. The apparatus according to claim 2, wherein the foreground object is glossy or diffuse, and the silhouette is extracted by the background pattern not being visible.

5. The apparatus according to claim 2, wherein the pattern is projected by a coherent light beam.

6. The apparatus according to claim 2, wherein the foreground object has specular or highly glossy surface, and the silhouette is extracted by both the background patterns not being visible and the camera rays being deflected.

7. The apparatus according to claim 2, wherein the foreground object is fully transparent and the silhouette is extracted by both the background patterns not being visible and the camera rays being refracted.

8. The apparatus according to claim 2, wherein the transparency-controllable layers can be set to either diffuse or transparent mode, and only one layer can be diffuse each time; and wherein the background is composed by a set of N images, where N is the number of transparency-controllable layers.

9. The apparatus according to claim 2, wherein the transparency-controllable layers are semi-transparent and a unique pattern is displayed at the background, wherein the unique pattern is composed by the combination of the E glass layers, forming a light-field; and wherein a single image is captured.

10. The apparatus according to claim 2, wherein all the transparency-controllable layers are set to transparent and the silhouette is extracted by considering only the areas of the image sensor of the camera that do not saturate.

11. The apparatus according to claim 2, wherein a visual hull is constructed from the extracted silhouette.

12. An apparatus comprising:
a first projector and a first set of first and second transparency-controllable layers positioned along a first optical axis across an inspection station opposite the first projector, such first and second layers being positioned in spaced-apart relation relative to each other, wherein both of the first and second layers are controllably switchable between a transparent mode in which the layer is transparent, and a diffuse mode in which the layer diffuses light;
a second projector and a second set of first and second transparency-controllable layers positioned along a second optical axis across the inspection station opposite the second projector, such first and second layers being positioned in spaced-apart relation relative to each other, wherein both of the first and second layers are controllably switchable between a transparent mode in which the layer is transparent, and a diffuse mode in which the layer diffuses light;
a first camera positioned along the first optical axis for projecting patterned light in a direction towards the first set of transparency-controllable layers and the inspection station; and
a second camera positioned along the second optical axis for projecting patterned light in a direction towards the second set of transparency-controllable layers and the inspection station;
wherein the first optical axis is oblique to the second optical axis.

13. The apparatus according to claim 12, further comprising a rotating stage for positioning an object at the inspection station.

14. The apparatus according to claim 12, wherein at least one set of transparency-controllable layers and its corresponding projector is comprised of plural LCD display layers.

15. The apparatus according to claim 12, further comprising a polarizer placed in front of a set of transparency-controllable layers and an analyzer placed in front of its corresponding projector.

16. The apparatus according to claim 12, wherein one capturing device is formed by an array of cameras or an arch of cameras.

17. An apparatus comprising:
first and second transparency-controllable layers, the first and second layers being positioned in spaced-apart relation relative to each other, wherein both of the first and second layers are controllably switchable between a transparent mode in which the layer is transparent, and a diffuse mode in which the layer diffuses light;
a first projector positioned along a first optical axis across an inspection station opposite the first and second transparency-controllable layers;
a second projector positioned along a second optical axis oblique to the first optical axis;
a camera positioned along the first optical axis for capturing images formed on the first and second transparency-controllable layers by reflection from the object of projections of patterns from the first projector, and for capturing shadows of the object formed on the first and second transparency-controllable layers by projection from the second projector; and
a controller configured to capture images of the shadows and coded light patterns caused by the projectors, and to reconstruct the 3D shape of an object positioned at the inspection station by using the captured images.

18. The apparatus according to claim 17, wherein to reconstruct the 3D shape of the object, the controller is further configured to extract silhouettes at each view by calculations using the images of the shadows; to reconstruct a visual hull of the object by calculations using the extracted silhouettes; to determine light paths in the images of the patterns reflected onto the layers by decoding the coded light patterns; to separate between light paths having direct single reflections and light paths having indirect multi-reflections in the images of the reflected patterns, by calculations using the visual hull; and to eliminate voxels from the visual hull only along light paths of direct reflections.

19. The apparatus according to claim 17, further comprising a polarizer placed in front of the first and second transparency-controllable layers and an analyzer placed in front of the second projector.

20. The apparatus according to claim 19, wherein the controller is further configured to capture images under varying states of polarization of the polarizer and the analyzer, and to separate diffuse and specular components of reflection by correlation of a variation in nature and intensity of light in the captured images to a variation in the polarization states.

* * * * *